US012724255B2

(12) United States Patent
Cao et al.

(10) Patent No.: US 12,724,255 B2
(45) Date of Patent: Sep. 1, 2026

(54) ANGULAR PTYCHOGRAPHIC IMAGING WITH CLOSED-FORM RECONSTRUCTION

(71) Applicant: California Institute of Technology, Pasadena, CA (US)

(72) Inventors: Ruizhi Cao, Berkeley, CA (US); Cheng Shen, Pasadena, CA (US); Changhuei Yang, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 39 days.

(21) Appl. No.: 18/622,740

(22) Filed: Mar. 29, 2024

(65) Prior Publication Data

US 2024/0353665 A1 Oct. 24, 2024

Related U.S. Application Data

(60) Provisional application No. 63/536,265, filed on Sep. 1, 2023, provisional application No. 63/455,878, filed on Mar. 30, 2023.

(51) Int. Cl.

| | |
|---|---|
| ***G02B 21/10*** | (2006.01) |
| ***G02B 21/16*** | (2006.01) |
| ***G02B 21/36*** | (2006.01) |
| ***H04N 23/56*** | (2023.01) |
| ***H04N 23/81*** | (2023.01) |

(52) U.S. Cl.

CPC ............ *G02B 21/10* (2013.01); *G02B 21/16* (2013.01); *G02B 21/365* (2013.01); *H04N 23/56* (2023.01); *H04N 23/81* (2023.01)

(58) Field of Classification Search

CPC ...... G02B 21/10; G02B 21/16; G02B 21/365; G02B 21/367; H04N 23/56; H04N 23/81

See application file for complete search history.

(56) References Cited

U.S. PATENT DOCUMENTS

| | | | |
|---|---|---|---|
| 4,873,653 | A | 10/1989 | Grosskopf |
| 4,917,494 | A | 4/1990 | Poole et al. |
| 5,475,527 | A | 12/1995 | Hackel et al. |
| 6,144,365 | A | 11/2000 | Young et al. |
| 6,154,196 | A | 11/2000 | Fleck et al. |
| 6,320,174 | B1 | 11/2001 | Tafas et al. |
| 6,320,648 | B1 | 11/2001 | Brueck et al. |
| 6,747,781 | B2 | 6/2004 | Trisnadi |

(Continued)

FOREIGN PATENT DOCUMENTS

| | | | |
|---|---|---|---|
| CA | 3210010 | A1 | 9/2022 |
| CN | 1688254 | A | 10/2005 |

(Continued)

OTHER PUBLICATIONS

Guoan (Wide-field, high-resolution Fourier ptychographic microscopy—Published Online: Jul. 28, 2013 | DOI: 10.1038/NPHOTON.2013.187; Nature Photonics | vol. 7 | Sep. 2013 | www.nature.com/naturephotonics) (Year: 2013).*

(Continued)

*Primary Examiner* — Nasim N Nirjhar

(74) *Attorney, Agent, or Firm* — Sheila Martinez-Lemke; Kwan & Olynick LLP

(57) ABSTRACT

Embodiments pertain to angular ptychographic imaging with closed-form imaging methods, computer products and imaging systems.

17 Claims, 26 Drawing Sheets

(56) References Cited

U.S. PATENT DOCUMENTS

| | | | |
|---|---|---|---|
| 6,759,949 | B2 | 7/2004 | Miyahara |
| 6,905,838 | B1 | 6/2005 | Bittner |
| 7,436,503 | B1 | 10/2008 | Chen et al. |
| 7,460,248 | B2 | 12/2008 | Kurtz et al. |
| 7,706,419 | B2 | 4/2010 | Wang et al. |
| 7,738,095 | B2 | 6/2010 | Gardner, Jr. et al. |
| 7,787,588 | B1 | 8/2010 | Yun et al. |
| 8,271,251 | B2 | 9/2012 | Schwartz et al. |
| 8,313,031 | B2 | 11/2012 | Vinogradov |
| 8,497,934 | B2 | 7/2013 | Milnes et al. |
| 8,624,968 | B1 | 1/2014 | Hersee et al. |
| 8,654,201 | B2 | 2/2014 | Lim et al. |
| 8,942,449 | B2 | 1/2015 | Maiden |
| 9,029,745 | B2 | 5/2015 | Maiden |
| 9,182,387 | B2 | 11/2015 | Goldkorn et al. |
| 9,343,494 | B2 | 5/2016 | Lee et al. |
| 9,426,455 | B2 | 8/2016 | Horstmeyer et al. |
| 9,497,379 | B2 | 11/2016 | Ou et al. |
| 9,739,783 | B1 | 8/2017 | Kumar et al. |
| 9,829,695 | B2 | 11/2017 | Kim et al. |
| 9,864,184 | B2 | 1/2018 | Ou et al. |
| 9,892,812 | B2 | 2/2018 | Zheng et al. |
| 9,983,397 | B2 | 5/2018 | Horstmeyer et al. |
| 9,993,149 | B2 | 6/2018 | Chung et al. |
| 9,998,658 | B2 | 6/2018 | Ou et al. |
| 10,162,161 | B2 | 12/2018 | Horstmeyer et al. |
| 10,168,525 | B2 | 1/2019 | Kim et al. |
| 10,222,605 | B2 | 3/2019 | Kim et al. |
| 10,228,550 | B2 | 3/2019 | Ou et al. |
| 10,401,609 | B2 | 9/2019 | Ou et al. |
| 10,419,665 | B2 | 9/2019 | Ou et al. |
| 10,568,507 | B2 | 2/2020 | Chung et al. |
| 10,572,996 | B2 | 2/2020 | Eurèn |
| 10,606,055 | B2 | 3/2020 | Horstmeyer et al. |
| 10,652,444 | B2 | 5/2020 | Horstmeyer et al. |
| 10,665,001 | B2 | 5/2020 | Horstmeyer et al. |
| 10,679,763 | B2 | 6/2020 | Zheng et al. |
| 10,684,458 | B2 | 6/2020 | Chung et al. |
| 10,718,934 | B2 | 7/2020 | Horstmeyer et al. |
| 10,732,396 | B2 | 8/2020 | Kim et al. |
| 10,740,896 | B2 | 8/2020 | Georgescu et al. |
| 10,754,138 | B2 | 8/2020 | Kim et al. |
| 10,754,140 | B2 | 8/2020 | Chan et al. |
| 11,092,795 | B2 | 8/2021 | Chung et al. |
| 11,385,450 | B2 | 7/2022 | Kwon et al. |
| 11,468,557 | B2 | 10/2022 | Ou et al. |
| 11,893,739 | B2 | 2/2024 | Ozcan et al. |
| 11,915,360 | B2 | 2/2024 | Ozcan et al. |
| 12,298,222 | B2 * | 5/2025 | Hegyi ................ G01N 15/1459 |
| 2001/0055062 | A1 | 12/2001 | Shioda et al. |
| 2002/0141051 | A1 | 10/2002 | Vogt et al. |
| 2003/0116436 | A1 | 6/2003 | Amirkhanian et al. |
| 2003/0118223 | A1 | 6/2003 | Rahn et al. |
| 2004/0057094 | A1 | 3/2004 | Olszak et al. |
| 2004/0146196 | A1 | 7/2004 | Van Heel |
| 2004/0190762 | A1 | 9/2004 | Dowski, Jr. et al. |
| 2005/0211912 | A1 | 9/2005 | Fox |
| 2006/0098293 | A1 | 5/2006 | Garoutte et al. |
| 2006/0158754 | A1 | 7/2006 | Tsukagoshi et al. |
| 2006/0173313 | A1 | 8/2006 | Liu et al. |
| 2006/0291707 | A1 | 12/2006 | Kothapalli et al. |
| 2007/0057184 | A1 | 3/2007 | Uto et al. |
| 2007/0133113 | A1 | 6/2007 | Minabe et al. |
| 2007/0159639 | A1 | 7/2007 | Teramura et al. |
| 2007/0171430 | A1 | 7/2007 | Tearney et al. |
| 2007/0189436 | A1 | 8/2007 | Goto et al. |
| 2007/0206200 | A1 | 9/2007 | Lindner et al. |
| 2007/0269826 | A1 | 11/2007 | Geddes |
| 2008/0101664 | A1 | 5/2008 | Perez |
| 2008/0182336 | A1 | 7/2008 | Zhuang et al. |
| 2008/0192343 | A1 | 8/2008 | Miyawaki et al. |
| 2008/0205833 | A1 | 8/2008 | Fu et al. |
| 2009/0008580 | A1 | 1/2009 | Luberek |
| 2009/0046164 | A1 | 2/2009 | Shroff et al. |
| 2009/0079987 | A1 | 3/2009 | Ben-Ezra et al. |
| 2009/0125242 | A1 | 5/2009 | Choi et al. |
| 2009/0284831 | A1 | 11/2009 | Schuster et al. |
| 2009/0316141 | A1 | 12/2009 | Feldkhun |
| 2010/0135547 | A1 | 6/2010 | Lee et al. |
| 2010/0271705 | A1 | 10/2010 | Hung |
| 2011/0075928 | A1 | 3/2011 | Jeong et al. |
| 2011/0181869 | A1 | 7/2011 | Yamaguchi et al. |
| 2011/0192976 | A1 | 8/2011 | Own et al. |
| 2011/0235863 | A1 | 9/2011 | Maiden |
| 2011/0255163 | A1 | 10/2011 | Merrill et al. |
| 2012/0069344 | A1 | 3/2012 | Liu |
| 2012/0099803 | A1 | 4/2012 | Ozcan et al. |
| 2012/0105618 | A1 | 5/2012 | Brueck et al. |
| 2012/0118967 | A1 | 5/2012 | Gerst, III et al. |
| 2012/0157160 | A1 | 6/2012 | Ozcan et al. |
| 2012/0176673 | A1 | 7/2012 | Cooper |
| 2012/0182541 | A1 | 7/2012 | Canham |
| 2012/0218379 | A1 | 8/2012 | Ozcan et al. |
| 2012/0248292 | A1 | 10/2012 | Ozcan et al. |
| 2012/0250032 | A1 | 10/2012 | Wilde et al. |
| 2012/0281929 | A1 | 11/2012 | Brand et al. |
| 2013/0057748 | A1 | 3/2013 | Duparre et al. |
| 2013/0083886 | A1 | 4/2013 | Carmi et al. |
| 2013/0093871 | A1 | 4/2013 | Nowatzyk et al. |
| 2013/0094077 | A1 | 4/2013 | Brueck et al. |
| 2013/0100525 | A1 | 4/2013 | Chiang et al. |
| 2013/0170767 | A1 | 7/2013 | Choudhury et al. |
| 2013/0182096 | A1 | 7/2013 | Boccara et al. |
| 2013/0223685 | A1 | 8/2013 | Maiden |
| 2013/0321908 | A1 | 12/2013 | Babacan et al. |
| 2014/0007307 | A1 | 1/2014 | Routh, Jr. et al. |
| 2014/0029824 | A1 | 1/2014 | Shi et al. |
| 2014/0043616 | A1 | 2/2014 | Maiden et al. |
| 2014/0049817 | A1 | 2/2014 | Yang |
| 2014/0050382 | A1 | 2/2014 | Adie et al. |
| 2014/0085629 | A1 | 3/2014 | Bodkin et al. |
| 2014/0118529 | A1 | 5/2014 | Zheng et al. |
| 2014/0126691 | A1 | 5/2014 | Zheng et al. |
| 2014/0133702 | A1 | 5/2014 | Zheng et al. |
| 2014/0139840 | A1 | 5/2014 | Judkewitz et al. |
| 2014/0152801 | A1 | 6/2014 | Fine et al. |
| 2014/0153692 | A1 | 6/2014 | Larkin et al. |
| 2014/0160236 | A1 | 6/2014 | Ozcan et al. |
| 2014/0160488 | A1 | 6/2014 | Zhou |
| 2014/0217268 | A1 | 8/2014 | Schleipen et al. |
| 2014/0267674 | A1 | 9/2014 | Mertz et al. |
| 2014/0347672 | A1 | 11/2014 | Pavillon et al. |
| 2014/0368812 | A1 | 12/2014 | Humphry et al. |
| 2015/0003714 | A1 | 1/2015 | McCarty et al. |
| 2015/0036038 | A1 | 2/2015 | Horstmeyer et al. |
| 2015/0044098 | A1 | 2/2015 | Smart et al. |
| 2015/0054979 | A1 | 2/2015 | Ou et al. |
| 2015/0160450 | A1 | 6/2015 | Ou et al. |
| 2015/0264250 | A1 | 9/2015 | Ou et al. |
| 2015/0286042 | A1 | 10/2015 | Hilbert et al. |
| 2015/0331228 | A1 | 11/2015 | Horstmeyer et al. |
| 2016/0088205 | A1 | 3/2016 | Horstmeyer et al. |
| 2016/0110584 | A1 | 4/2016 | Remiszewski et al. |
| 2016/0156880 | A1 | 6/2016 | Teich et al. |
| 2016/0178883 | A1 | 6/2016 | Horstmeyer et al. |
| 2016/0202460 | A1 * | 7/2016 | Zheng .................... G02B 21/16 348/79 |
| 2016/0210763 | A1 | 7/2016 | Horstmeyer et al. |
| 2016/0216208 | A1 * | 7/2016 | Kim ................... G01N 21/6452 |
| 2016/0216503 | A1 | 7/2016 | Kim et al. |
| 2016/0266366 | A1 | 9/2016 | Chung et al. |
| 2016/0320595 | A1 | 11/2016 | Horstmeyer et al. |
| 2016/0320605 | A1 | 11/2016 | Ou et al. |
| 2016/0341945 | A1 | 11/2016 | Ou et al. |
| 2017/0061599 | A1 | 3/2017 | Remiszewski et al. |
| 2017/0146788 | A1 * | 5/2017 | Waller .................... G06T 19/20 |
| 2017/0178317 | A1 | 6/2017 | Besley et al. |
| 2017/0186194 | A1 | 6/2017 | Koehler et al. |
| 2017/0188853 | A1 | 7/2017 | Nakao et al. |
| 2017/0273551 | A1 | 9/2017 | Chung et al. |
| 2017/0299854 | A1 | 10/2017 | Kim et al. |
| 2017/0354329 | A1 | 12/2017 | Chung et al. |
| 2017/0363853 | A1 | 12/2017 | Besley |
| 2017/0371141 | A1 | 12/2017 | Besley |

(56) References Cited

U.S. PATENT DOCUMENTS

| | | | |
|---|---|---|---|
| 2017/0372471 | A1 | 12/2017 | Eurèn |
| 2018/0045569 | A1 | 2/2018 | Nath et al. |
| 2018/0048811 | A1 | 2/2018 | Waller et al. |
| 2018/0073993 | A1* | 3/2018 | Zhao .................... G06T 7/0004 |
| 2018/0078447 | A1 | 3/2018 | Viner et al. |
| 2018/0078448 | A9 | 3/2018 | Shockley, Jr. et al. |
| 2018/0088309 | A1 | 3/2018 | Ou et al. |
| 2018/0120553 | A1 | 5/2018 | Leshem et al. |
| 2018/0191948 | A1 | 7/2018 | Zheng |
| 2018/0231761 | A1 | 8/2018 | Dai et al. |
| 2018/0307017 | A1 | 10/2018 | Horstmeyer et al. |
| 2018/0316855 | A1 | 11/2018 | Ou et al. |
| 2018/0329194 | A1 | 11/2018 | Small et al. |
| 2018/0348500 | A1 | 12/2018 | Naaman, III et al. |
| 2018/0373016 | A1 | 12/2018 | Leshem, III et al. |
| 2019/0049712 | A1 | 2/2019 | Kim et al. |
| 2019/0056578 | A1 | 2/2019 | Horstmeyer et al. |
| 2019/0077610 | A1 | 3/2019 | Flammann |
| 2019/0097523 | A1 | 3/2019 | Schaefer |
| 2019/0097524 | A1 | 3/2019 | Lin |
| 2019/0117177 | A1 | 4/2019 | Cuadros et al. |
| 2019/0137753 | A1 | 5/2019 | Chan et al. |
| 2019/0206056 | A1 | 7/2019 | Georgescu et al. |
| 2019/0290124 | A1* | 9/2019 | Laforest .................. A61B 3/14 |
| 2019/0317311 | A1 | 10/2019 | Kim et al. |
| 2019/0331902 | A1 | 10/2019 | Ou et al. |
| 2019/0391382 | A1 | 12/2019 | Chung et al. |
| 2020/0186705 | A1 | 6/2020 | Ou et al. |
| 2020/0351454 | A1 | 11/2020 | Wu et al. |
| 2020/0371335 | A1 | 11/2020 | Amthor et al. |
| 2021/0082595 | A1 | 3/2021 | Zheng et al. |
| 2021/0164883 | A1 | 6/2021 | Imakubo et al. |
| 2021/0164886 | A1 | 6/2021 | Shirai et al. |
| 2021/0181673 | A1 | 6/2021 | Ozcan |
| 2021/0272694 | A1 | 9/2021 | Madabhushi |
| 2021/0349075 | A1 | 11/2021 | Bronevetsky et al. |
| 2022/0028116 | A1 | 1/2022 | Sieckmann et al. |
| 2022/0042908 | A1* | 2/2022 | Scarcelli ............. G02B 21/361 |
| 2022/0058776 | A1 | 2/2022 | Ozcan et al. |
| 2022/0122313 | A1 | 4/2022 | Ozcan et al. |
| 2022/0155574 | A1 | 5/2022 | Fisch et al. |
| 2022/0254538 | A1 | 8/2022 | Zheng et al. |
| 2022/0260826 | A1 | 8/2022 | Moore |
| 2022/0413276 | A1* | 12/2022 | Anderson .......... G02B 21/0036 |
| 2023/0014453 | A1 | 1/2023 | Lee et al. |
| 2023/0030424 | A1* | 2/2023 | Ozcan .................. G06T 7/0012 |
| 2023/0085827 | A1 | 3/2023 | Ozcan et al. |
| 2023/0098031 | A1 | 3/2023 | Weissleder et al. |
| 2024/0052321 | A1* | 2/2024 | Wagner ................. C12M 23/40 |
| 2025/0342585 | A1 | 11/2025 | Zhou |

FOREIGN PATENT DOCUMENTS

| | | | |
|---|---|---|---|
| CN | 1932565 | A | 3/2007 |
| CN | 1311392 | C | 4/2007 |
| CN | 101372179 | A | 2/2009 |
| CN | 101408623 | A | 4/2009 |
| CN | 101680848 | A | 3/2010 |
| CN | 101726366 | A | 6/2010 |
| CN | 101743519 | A | 6/2010 |
| CN | 101868740 | A | 10/2010 |
| CN | 101872033 | A | 10/2010 |
| CN | 101957183 | A | 1/2011 |
| CN | 102292662 | A | 12/2011 |
| CN | 102608597 | A | 7/2012 |
| CN | 102629371 | A | 8/2012 |
| CN | 102652680 | A | 9/2012 |
| CN | 102753935 | A | 10/2012 |
| CN | 103096804 | A | 5/2013 |
| CN | 103154662 | A | 6/2013 |
| CN | 103201648 | A | 7/2013 |
| CN | 103377746 | A | 10/2013 |
| CN | 103842799 | A | 6/2014 |
| CN | 104101993 | A | 10/2014 |
| CN | 104181686 | A | 12/2014 |
| CN | 104200449 | A | 12/2014 |
| CN | 108169173 | A | 6/2018 |
| EP | 1640706 | A1 | 3/2006 |
| EP | 0760109 | B1 | 4/2007 |
| EP | 2703871 | A2 | 3/2014 |
| EP | 4293342 | A1 | 12/2023 |
| JP | H1123978 | A | 1/1999 |
| JP | 2002163660 | A | 6/2002 |
| JP | 2007299604 | A | 11/2007 |
| JP | 2008147629 | A | 6/2008 |
| JP | 2010012222 | A | 1/2010 |
| KR | 19980075050 | A | 11/1998 |
| TW | 201428339 | A | 7/2014 |
| WO | WO-9628751 | A1 | 9/1996 |
| WO | WO-9953469 | A1 | 10/1999 |
| WO | WO-02102128 | A1 | 12/2002 |
| WO | WO-03062744 | A1 | 7/2003 |
| WO | WO-2004034121 | A2 | 4/2004 |
| WO | WO-2008017076 | A2 | 2/2008 |
| WO | WO-2008116070 | A2 | 9/2008 |
| WO | WO-2009141467 | A1 | 11/2009 |
| WO | WO-2011093043 | A1 | 8/2011 |
| WO | WO-2012037182 | A1 | 3/2012 |
| WO | WO-2014033459 | A1 | 3/2014 |
| WO | WO-2014070656 | A1 | 5/2014 |
| WO | WO-2015017730 | A1 | 2/2015 |
| WO | WO-2015027188 | A1 | 2/2015 |
| WO | WO-2016090331 | A1 | 6/2016 |
| WO | WO-2016106379 | A1 | 6/2016 |
| WO | WO-2016118761 | A1 | 7/2016 |
| WO | WO-2016123156 | A1 | 8/2016 |
| WO | WO-2016123157 | A1 | 8/2016 |
| WO | WO-2016149120 | A1 | 9/2016 |
| WO | WO-2016187591 | A1 | 11/2016 |
| WO | WO-2017066198 | A1 | 4/2017 |
| WO | WO-2017081539 | A1 | 5/2017 |
| WO | WO-2017081540 | A1 | 5/2017 |
| WO | WO-2017081542 | A2 | 5/2017 |
| WO | 2021198279 | A1 | 10/2021 |
| WO | WO-2022132496 | A1 | 6/2022 |

OTHER PUBLICATIONS

Jaebum (Wide-field Fourier ptychographic microscopy using laser illumination source—vol. 7, No. 11 | Nov. 1, 2016 | Biomedical Optics Express) (Year: 2016).*

About Molemap, "About Us-Skin Cancer Mole Check NZ," pp. 1-2. [retrieved Oct. 23, 2015] URL: http://molemap.net.au/about-us.

Abrahamsson, S., et al., "Fast multicolor 3D imaging using aberration-corrected mulitfocus microscopy," Brief Communications: Nature Methods, vol. 10, No. 1, Jan. 2013, pp. 60-65. doi:10.1038/nmeth.2277.

Abramowitz, M., et al, "Field Curvature," Olympus Microscopy Resource Center, 2012 Olympus America Inc., pp. 1-3. [retrieved on Feb. 24, 2016] URL: http://www.olympusmicro.com/primer/anatomy/fieldcurvature.html.

Abramowitz, M. et al, "Immersion Media," Olympus Microscopy Resource Center: Microscope Optical Components, Published 2012, pp. 1-6. [retrieved on Feb. 6, 2012] URL: http://www.olympusmicro.com/primer/anatomy/immersion.html.

Adie, et al., "Computational adaptive optics for broadband optical interferometric tomography of biological tissue," Proc. Natl. Acad. Sci. USA 109, 7175-7180 (May 8, 2012).

Age-Related Macular Degeneration (AMD) | National Eye Institute, 2010 Table, pp. 1-8. [retrieved Apr. 5, 2016] URL: https://www.nei.nih.gov/eyedata/amd.

Alexandrov, S., et al., "Spatial information transmission beyond a system's diffraction limit using optical spectral encoding of the spatial frequency," Journal of Optics A: Pure and Applied Optics 10, Feb. 4, 2008, 025304, pp. 1-5. doi:10.1088/1464-4258/10/2/025304 [retrieved Dec. 2, 2015] URL: http://www.stacks.iop.org/JOptA/10/025304.

Alexandrov, S.A., et al., "Synthetic Aperture Fourier Holographic Optical Microscopy," Physical Review Letters, vol. 97, No. 16, Oct. 20, 2006, pp. 168102-1-168102-4. doi: 0.1103/PhysRevLett.97.168102.

(56) References Cited

OTHER PUBLICATIONS

Arimoto, H., et al, "Integral three-dimensional imaging with digital reconstruction," Optics Letters, Optical Society of America, Feb. 1, 2001, vol. 26, No. 3, pp. 157-159. doi: 10.1364/OL.26.000157.
Australian Examination Report No. 1, dated Jan. 18, 2018 issued in Application No. AU 2014308673.
Australian Office Action dated Sep. 18, 2017 issued in Application No. AU 2014296034.
Baek, Y., et al., Intensity-based holographic imaging via space-domain Kramers-Kronig relations, Nature Photonics, 2021, vol. 15, pp. 354-360.
Baek, Y., et al., "Kramers-kronig Holographic Imaging for High-space-bandwidth Product," Optica, 2019, vol. 6(1), pp. 45-51.
Balan, R., et al, "On signal reconstruction without phase," Applied and Computational Harmonic Analysis, vol. 20, Issue 3, May 2006, pp. 345-356. doi:10.1016/j.acha.2005.07.001.
Balan, R., et al, "Painless Reconstruction from Magnitudes of Frame Coefficients," Journal Fourier Analysis and Applications, vol. 15, Issue 4, Mar. 25, 2009, pp. 488-501. doi:10.1007/s00041-009-9065-1.
Bauschke, H., et al, "Phase retrieval, error reduction algorithm, and Fienup variants: a view from convex optimization," Journal of the Optical Society America, A., vol. 19, No. 7, Jul. 2002, pp. 1334-1345. doi: 10.1364/JOSAA.19.001334.
Becker, S.R., et al., "Templates for Convex Cone Problems with Applications to Sparse Signal Recovery," Mathematical Programming Computation, Sep. 2010, vol. 3, No. 3, pp. 1-49. doi: 10.1007/s12532-011-0029-5.
Betti, R., et al, "Observational study on the mitotic rate and other prognostic factors in cutaneous primary melanoma arising from naevi and from melanoma de novo," Journal of the European Academy of Dermatology and Venereology (JEADV), Dec. 2014, vol. 28, No. 12, pp. 1738-1741. doi: 10.1111/jdv.12395.
Betzig, E., et al., "Imaging Intracellular Fluorescent Proteins at Nanometer Resolution," Science, 2006, vol. 313(5793), pp. 1642-1645.
Bian, et al., "Content adaptive illumination for Fourier ptychography," Optics Letters, vol. 39, Aug. 2014, pp. 1-6.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. doi: 10.1038/srep27384.
Bian, L., et al., "Fourier ptychographic reconstruction using Wirtinger flow optimization," Optics Express, 2015, vol. 23(4), pp. 4856-4866.
Bian, Z., et al, "Adaptive system correction for robust Fourier ptychographic imaging," Optics express, Dec. 30, 2013, vol. 21, No. 26, pp. 32400-32410. doi: 10.1364/OE.21.032400.
BioTek Brochure: BioTek's Multi-Mode Microplate Reading Technologies, BioTek Instruments, Inc. pp. 2. [retrieved on Mar. 14, 2016] URL: http://www.biotek.com.
Bioucas-Dias, et al., "Total variation-based image deconvolution: a majorization-minimization approach," ICASSP (2), pp. 861-864 (May 14, 2006).
Bishara, W., et al, "Holographic pixel super-resolution in portable lensless on-chip microscopy using a fiber-optic array," NIH-PA, Lab Chip, Author manuscript; available in PMC Aug. 8, 2011, pp. 1-9. (Published in final edited form as: Lab Chip. Apr. 7, 2011; 11(7): 1276-1279. doi:10.1039/c01c00684j).
Bishara W., et al., "Lensfree On-Chip Microscopy Over a Wide Field-of-View using Pixel Super-Resolution," Optics Express, May 24, 2010, vol. 18(11), pp. 11181-11191.
Blum, A., et al, "Clear differences in hand-held dermoscopes," Journal der Deutschen Dermatologischen Gesellschaft (JDDG); Case Reports, Dec. 2006, vol. 4, No. 12, pp. 1054-1057. doi:10.1111/j.1610-0387.2006.06128.x.
Blum, A., et al, "Dermatoskopisch sichtbare Strukturen," Chapter 4.1 Grundlagen, Dermatoskopie von Hauttumoren: Auflichtmikroskopie; Dermoskopie; Digitale Bildanalyse; mit 28 Tabellen. Springer-Verlag Berlin Heidelberg 2003, pp. 15-66. (English Translation of Summary) doi: 10.1007/978-3-642-57446-7_4.
Booth, "Adaptive optical microscopy: the ongoing quest for a perfect image," Light Sci. Appl. 3, e165 (Apr. 25, 2014).
Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].
Brady, D. et al., "Multiscale gigapixel photography," Nature, vol. 486, Jun. 21, 2012, pp. 386-389. doi:10.1038/nature11150.
Bunk, O., et al, "Influence of the overlap parameter on the convergence of the ptychographical iterative engine," Ultramicroscopy, vol. 108, (2008), pp. 481-487. doi:10.1016/j.ultramic.2007.08.003.
Burer, S., et al, "A nonlinear programming algorithm for solving semidefinite programs via low-rank factorization," Mathematical Programming, Series B., vol. 95, No. 2, Feb. 2003, pp. 329-357. doi:10.1007/s10107-002-0352-8.
Burer, S., et al, "Local Minima and Convergence in Low-Rank Semidefinite Programming," Mathematical Programming, Series A., vol. 103, No. 3, Jul. 1, 2005, pp. 427-444. doi:10.1007/s10107-004-0564-1.
Candes, E., et al., "Phase Retrieval via Wirtinger Flow: Theory and Algorithms," IEEE Transaction On Information Theory, 2015, vol. 61(4), pp. 1985-2007.
Candes, E.J., et al, pre-published manuscript of "Phase Retrieval via Matrix Completion," ArXiv e-prints, 24 pages (Submitted on Sep. 2, 2011 (v1), last revised Sep. 20, 2011 (this version, v2)). [retrieved Nov. 9, 2015] URL: arXiv:1109.0573v2 [cs.IT] Sep. 20, 2011.
Candes, E.J., et al, pre-published Manuscript of "PhaseLift: Exact and Stable Signal Recovery from Magnitude Measurements via Convex Programming," ArXiv e-prints, 31 pages (Submitted Sep. 2011 (v1)). [retrieved Nov. 9, 2015] URL: arXiv:1109.4499v1 [cs.IT] Sep. 21, 2011.
Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] doi:10.1001/archopht.126.6.857.
Chai, A., et al, "Array imaging using intensity-only measurements," IOP Publishing: Inverse Problems, vol. 27, No. 1, Jan. 2011, pp. 1-16. doi:10.1088/0266-5611/27/1/015005.
Chao, W. et al, "Soft X-ray microscopy at a spatial resolution better than 15 nm," Nature Letters, vol. 435, Jun. 30, 2005, pp. 1210-1213. doi:10.1038/nature03719.
Chen, T., et al, "Polarization and Phase-Shifting for 3D Scanning of Translucent Objects," 2007 IEEE Conference on Computer Vision and Pattern Recognition; on Jun. 17-22, 2007, pp. 1-8. doi:10.1109/CVPR.2007.383209.
Chin, L., et al, "Malignant melanoma: genetics and therapeutics in the genomic era," CSH Press: Genes & Development, Aug. 15, 2006, vol. 20, pp. 2149-2182. doi: 10.1101/gad.1437206 [retrieved Sep. 9, 2015] URL: http://genesdev.cshlp.org/content/20/16/2149.
Chinese First Office Action dated Apr. 16, 2020 issued in Application No. CN 201810576437.8.
Chinese First Office Action dated Apr. 19, 2019 issued in Application No. CN 201680006738.6.
Chinese First Office Action dated Apr. 19, 2019 issued in Application No. CN 201680014898.5.
Chinese First Office Action dated Aug. 2, 2017 issued in Application No. CN 201480054301.0.
Chinese First Office Action dated Dec. 13, 2016 issued in Application No. CN201480057911.6.
Chinese First Office Action dated Dec. 26, 2018 issued in Application No. CN 201580067354.0.
Chinese First Office Action dated Dec. 28, 2018 issued in Application No. CN 201680005491.6.
Chinese First Office Action dated Feb. 24, 2018 issued in CN 201680003937.1.
Chinese First Office Action dated Jan. 28, 2019 issued in CN 201580072950.8.
Chinese First Office Action dated Jan. 28, 2021 issued in Application No. CN 201910181199.5.
Chinese First Office Action dated Jan. 4, 2021 issued in Application No. CN 201811585066.6.

(56) References Cited

OTHER PUBLICATIONS

Chinese First Office Action dated Oct. 11, 2020 issued in CN 201811184731.0.
Chinese Office Action [Description in English] dated May 31, 2016 issued in Application No. CN 201380068831.6.
Chinese Second Office Action dated Dec. 31, 2019 issued in CN 201580072950.8.
Chinese Second Office Action dated Jul. 3, 2018 issued in Application No. CN 201480054301.0.
Chinese Second Office Action dated Mar. 19, 2020 issued in Application No. CN 201680014898.5.
Chinese Second Office Action dated Nov. 12, 2019 issued in Application No. CN 201680005491.6.
Chinese Second Office Action dated Nov. 28, 2019 issued in Application No. CN 201680006738.6.
Chinese Second Office Action dated Oct. 26, 2017 issued in Application No. CN 201480057911.6.
Chinese Second Office Action dated Oct. 8, 2021 issued in Application No. CN 201811585066.6.
Chinese Second Office Action [Description in English] dated Jan. 22, 2017 issued in Application No. CN201380068831.6.
Chinese Third Office Action dated Jul. 13, 2018 issued in Application No. CN 201480057911.6.
Chinese Third Office Action dated May 15, 2020 issued in Application No. CN 201680005491.6.
Chinese Third Office Action [Summary in English] dated Jul. 24, 2017 issued in Application No. 201380068831.6.
Choi, W., et al, "Tomographic phase microscopy," NPG: Nature Methods | Advance Online Publication, Aug. 12, 2007, pp. 1-3. doi:10.1038/NMETH1078.
Chung, et al., "Computational aberration compensation by coded-aperture-based correction of aberration obtained from optical Fourier coding and blur estimation," Optica, vol. 6, May 10, 2019, pp. 647-661.
Chung, J., et al, "Counting White Blood Cells from a Blood Smear Using Fourier Ptychographic Microscopy," PLoS ONE, vol. 10, No. 7, Jul. 17, 2015, pp. 1-10. doi:10.1371/journal.pone.0133489.
Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] URL:arXiv:1602.02901v2 [physics. Optics] Mar. 23, 2016.
Chung, J., et al, "Wide field-of-view fluorescence image deconvolution with aberration-estimation from Fourier ptychography," Biomedical Optics Express, vol. 7, No. 2, Feb. 1, 2016, pp. 352-368. doi: 10.1364/BOE.7.000352.
CN Office Action dated Oct. 8, 2021, in application No. CN201811585067 with English translation.
CN Office Action dated Oct. 11, 2021, in Application No. CN201910181199.5 with English translation.
Colomb, T., et al, "Automatic procedure for aberration compensation in digital holographic microscopy and applications to specimen shape compensation," Applied Optics, vol. 45, No. 5, Feb. 10, 2006, pp. 851-863. doi: 10.1364/AO.45.000851.
Cuche, E., et al., "Digital Holography for Quantitative Phase-contrast Imaging," Optics letters, 1999, vol. 24(5), pp. 291-293.
De Sa, C., et al, "Global Convergence of Stochastic Gradient Descent for Some Non-convex Matrix Problems," Proceedings of the 32nd International Conference on Machine Learning, Lille, France, 2015. JMLR: W&CP, vol. 37, pp. 10. [retrieved on Nov. 9, 2015] URL: https://arxiv.org/abs/1411.1134.
Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. doi: 10.1364/OL.34.000079.
Denis, L., et al, "Inline hologram reconstruction with sparsity constraints," Optics Letters, Optical Society of America, vol. 34, No. 22, Oct. 12, 2009, pp. 3475-3477. doi:10.1364/OL.34.003475 ujm-00397994v2.
Desjardins, et al., "Angle-resolved Optical Coherence Tomography with sequential selectivity for speckle reduction" Optics Express, vol. 15, No. 10, May 14, 2007, pp. 6200-6209.
Di, J., et al, "High resolution digital holographic microscopy with a wide field of view based on a synthetic aperture technique and use of linear CCD scanning," Applied Optics, vol. 47, No. 30, Oct. 20, 2008, pp. 5654-5659. doi: 10.1364/AO.47.005654.
Dierolf, M., et al, "Ptychographic coherent diffractive imaging of weakly scattering specimens," New Journal of Physics, vol. 12, Mar. 31, 2010, 035017, pp. 14. doi:10.1088/1367-2630/12/3/035017.
Dierolf, M., et al, "Ptychographic X-ray computed tomography at the nanoscale," Nature Letter, vol. 467, Sep. 23, 2010, pp. 436-439. doi:10.1038/nature09419.
Doctor Mole—Skin Cancer App, App to check skin cancer by Dr. Mole, p. 1. (Webpage) [retrieved on Oct. 23, 2015] URL: http://www.doctormole.com.
Dong, S., et al, "Aperture-scanning Fourier ptychography for 3D refocusing and super-resolution macroscopic imaging," Optics Express, vol. 22, No. 11, Jun. 2, 2014, pp. 13586-13599. doi:10.1364/OE.22.013586.
Dong, S., et al, "FPscope: a field-portable high-resolution microscope using a cellphone lens," Biomedical Optics Express, vol. 5, No. 10, Oct. 1, 2014, pp. 3305-3310. doi:10.1364/BOE.5.003305.
Dong, S., et al, "High-resolution fluorescence imaging via pattern-illuminated Fourier ptychography," Optics Express, vol. 22, No. 17, Aug. 25, 2014, pp. 20856-20870. doi:10.1364/OE.22.020856.
Dowski, et al., "Extended depth of field through wavefront coding," Applied Optics, vol. 34, No. 11, Apr. 10, 1995, pp. 1859-1866.
EcKert, R., et al., "Efficient Illumination Angle Self-calibration in Fourier Ptychography," Applied optics, 2018, vol. 57(19), pp. 5434-5442.
Eldar, Y.C., et al, "Sparse Phase Retrieval from Short-Time Fourier Measurements," IEEE Signal Processing Letters, vol. 22, No. 5, May 2015, pp. 638-642. doi:10.1109/LSP.2014.2364225.
Emile, O., et al, "Rotating polarization imaging in turbid media," Optics Letters, vol. 21, No. 20, Oct. 15, 1996, pp. 1706-1708. doi: 10.1364/OL.21.001706.
English Translated document of JP-2002163660-A (Year: 2002).
EP Examination report dated Aug. 16, 2022 in Application No. EP20160744003.
Essen BioScience, "Real-time, quantitative live-cell analysis, IncuCyte® ZOOM System," IncuCyte Zoom System Brochure 2016, pp. 1-4. [retrieved Feb. 25, 2016] [URL: http://www.essenbioscience.com/IncuCyte].
European Extended Search Report dated Aug. 14, 2018 issued in EP 16744003.1.
European Extended Search Report dated Jun. 6, 2018 issued in Application No. 15865492.1.
European Extended Search Report dated Mar. 31, 2016 in EP Application No. 13851670.3.
European First Examination Report dated Jan. 21, 2021 issued in Application No. EP 16744002.3.
European First Examination Report dated Jan. 27, 2021 issued in EP 16744003.1.
European First Examination Report dated Sep. 28, 2020 issued in Application No. 14837844.1.
European Office Action dated Feb. 22, 2022 in Application No. EP16765505.9.
European Office Action dated May 16, 2017 issued in European Patent Application No. 13851670.3.
European Third-Party Observations, dated Jan. 20, 2016 in EP Application No. 13851670.3.
Evered, et al., "Accuracy and perceptions of virtual microscopy compared with glass slide microscopy in cervical cytology," Cytopathology, vol. 22, Feb. 2, 2010, pp. 82-87.
Extended European Search Report dated Aug. 8, 2018 issued in Application No. EP 16744002.3.
Extended European Search Report dated Feb. 15, 2017 issued in Application No. 14832857.8.
Extended European Search Report dated Feb. 16, 2017 issued in Application No. 14837844.1.

(56) References Cited

OTHER PUBLICATIONS

Extended European Search Report dated Jul. 3, 2018 issued in Application No. EP 15874344.3.
Extended European Search Report dated Oct. 25, 2018 issued in Application No. EP 16765505.9.
Extended European Search Report dated Sep. 12, 2018 issued in Application No. EP 16740769.1.
Faulkner, H.M.L., et al, "Error tolerance of an iterative phase retrieval algorithm for moveable illumination microscopy," Ultramicroscopy, vol. 103, No. 2, May 2005, pp. 153-164. doi:10.1016/j.ultramic.2004.11.006.
Faulkner, H.M.L., et al., "Movable Aperture Lensless Transmission Microscopy: A Novel Phase Retrieval Algorithm," Physical Review Letters, vol. 93, No. 2, Jul. 9, 2004, pp. 023903-1-023903-4. doi:10.1103/PhysRevLett.93.023903.
Fazel, M., "Matrix rank minimization with applications," PhD dissertation submitted to the Dept. of Electrical Engineering and Committee on Graduate Studies of Stanford University, Mar. 2002, pp. 1-117. [retrieved on Nov. 9, 2015] URL: http://faculty.washington.edu/mfazel/thesis-final.pdf.
Feng, P., et al, "Long-working-distance synthetic aperture Fresnel off-axis digital holography," Optics Express, vol. 17, No. 7, Mar. 30, 2009, pp. 5473-5480. doi: 10.1364/OE.17.005473.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fienup, J., et al., "Phase retrieval algorithms: a comparison," Applied Optics, 1982, vol. 21(5), pp. 2758-2769.
Fienup, J. R., "Invariant error metrics for image reconstruction," Applied Optics, vol. 36, No. 32, Nov. 10, 1997, pp. 8352-8357. doi: 10.1364/AO.36.008352.
Fienup, J. R., "Lensless coherent imaging by phase retrieval with an illumination pattern constraint," Optics Express, vol. 14, No. 2, Jan. 23, 2006, pp. 498-508. doi: 10.1364/OPEX.14.000498.
Fienup, J. R., "Reconstruction of a complex-valued object from the modulus of its Fourier transform using a support constraint," Journal of the Optical Society of America A, vol. 4, No. 1, Jan. 1987, pp. 118-123. doi: 10.1364/JOSAA.4.000118.
Fienup, J. R., "Reconstruction of an object from the modulus of its Fourier transform," Optics Letter, vol. 3, No. 1, Jul. 1978, pp. 27-29. doi: 10.1364/OL.3.000027.
Fried, D.L., "Anisoplanatism in adaptive optics," J. Opt. Soc. Am. vol. 72, No. 1, Jan. 1982, pp. 52-61.
Gan, X., et al, "Image enhancement through turbid media under a microscope by use of polarization gating methods," Journal of the Optical Society of America A, vol. 16, No. 9, Sep. 1999, pp. 2177-2184. doi: 10.1364/JOSAA.16.002177.
Gerke T.D., et al, "Aperiodic volume optics," Nature Photonics, vol. 4, Feb. 7, 2010, pp. 188-193. doi:10.1038/nphoton.2009.290.
Ghiglia, D., et al., "Robust two-dimensional weighted and unweighted phase unwrapping that uses fast transforms and iterative methods," Optical Society of America, 1994, vol. 11(1), pp. 107-117.
Ghosh, A., et al, pre-published manuscript of "Multiview Face Capture using Polarized Spherical Gradient Illumination," via USC Institute for Creative Technologies; To appear in ACM Transactions on Graphics (TOG), vol. 30, No. 6, Dec. 2011, pp. 1-10. [Retrieved Sep. 28, 2011] URL: http://doi.acm.org/10.1145/2024156.2024163.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Godara, P., et al, "Adaptive Optics Retinal Imaging: Emerging Clinical Applications," NIH-PA Author Manuscript; available in PMC Dec. 1, 2011. Published in final edited form as: Optom. Vis. Sci.. Dec. 2010; 87(12): 930-941. doi: 10.1097/OPX.0b013e3181ff9a8b.
Godden, T.M. et al., "Ptychographic microscope for three-dimensional imaging," Optics Express, vol. 22, No. 10, May 19, 2014, pp. 12513-12523.
Goodman, J.W., "Introduction to Fourier Optics," Third Ed., Roberts & Company Publishers (Englewood, Colorado 2005) pp. 1-172. ISBN 0-9747077-2-4.
Goodson, A.G., et al, "Comparative analysis of total body vs. dermatoscopic photographic monitoring of nevi in similar patient populations at risk for cutaneous melanoma," NIH-PA Author Manuscript; available in PMC Jul. 1, 2011. Published in final edited form as: Dermatol. Surg. Jul. 2010; 36(7): 1087-1098. doi: 10.1111/j.1524-4725.2010.01589.x.
Granero, L., et al, "Synthetic aperture superresolved microscopy in digital lensless Fourier holography by time and angular multiplexing of the object information," Applied Optics, vol. 49, No. 5, Feb. 10, 2010, pp. 845-857. doi: 10.1364/AO.49.000845.
Grant, M., et al, "CVX: Matlab Software for Disciplined Convex Programming," CVX Research Inc., pp. 1-3. [Webpage] [retrieved on Dec. 18, 2015] URL: http://cvxr.com/cvx.
Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] URL: http://dx.doi.org/10.1039/C2LC21072J.
Greenbaum, A., et al, "Increased space-bandwidth product in pixel super-resolved lensfree on-chip microscopy," Scientific Reports, vol. 3, No. 1717, Apr. 24, 2013, pp. 1-8. [doi: 10.1038/srep01717].
Gruev, V., et al, "Dual-tier thin film polymer polarization imaging sensor," Optics Express, vol. 18, No. 18, Aug. 30, 2010, pp. 19292-19303. doi: 10.1364/OE.18.019292.
Guizar-Sicairos, M., and Fienup, J.R., "Phase retrieval with transverse translation diversity: a nonlinear optimization approach," Optics Express, vol. 16, No. 10, May 12, 2008, pp. 7264-7278. doi: 10.1364/OE.16.007264.
Gunjala, et al., "Aberration recovery by imaging a weak diffuser," Optics Express vol. 26, No. 16, Aug. 6, 2018, pp. 21054-21068.
Gunturk, B.K., et al, "Restoration in the Presence of Unknown Spatially Varying Blur," Image Restoration: Fundamentals and Advances (CRC Press 2012), vol. 7, Chapter 3, Sep. 11, 2012, pp. 63-68. ISBN 978-1-4398-6955-0.
Guo, K., et al, "Optimization of sampling pattern and the design of Fourier ptychographic illuminator," Optics Express, vol. 23, No. 5, Mar. 9, 2015, pp. 6171-6180. doi: 10.1364/OE.23.006171.
Gustafsson, M., et al., "Surpassing the lateral resolution limit by a factor of two using structured illumination microscopy," Journal of Microscopy, 2000, vol. 198(2), pp. 82-87.
Gustafsson, M., "Nonlinear structured-illumination microscopy: wide-field fluorescence imaging with theoretically unlimited resolution," Proc. Natl. Acad. Sci. USA 102, 13081-13086 (Sep. 13, 2005).
Gutzler, T., et al, "Coherent aperture-synthesis, wide-field, high-resolution holographic microscopy of biological tissue," Optics Letters, vol. 35, No. 8, Apr. 15, 2010, pp. 1136-1138. doi: 10.1364/OL.35.001136.
Haigh, S. J., et al, "Atomic Structure Imaging beyond Conventional Resolution Limits in the Transmission Electron Microscope," Physical Review Letters, vol. 103, Issue 12, Sep. 18, 2009, pp. 126101.1-126101.4. doi:10.1103/PhysRevLett.103.126101.
Han, C., et al, "Wide Field-of-View On-Chip Talbot Fluorescence Microscopy for Longitudinal Cell Culture Monitoring from within the Incubator" Analytical Chemistry, vol. 85, No. 4, Jan. 28, 2013, pp. 2356-2360. doi:10.1021/ac303356v.
Havlicek, J., et al., "The analytic image," Proceedings of International Conference on Image Processing, 1997, pp. 446-449.
Hüe, F., et al, "Wave-front phase retrieval in transmission electron microscopy via ptychography," Rapid Communications: Physical Review B, vol. 82, No. 12, Sep. 15, 2010, pp. 121415-1-121415-4. doi:10.1103/PhysRevB.82.121415.
Hell, S., et al., "Breaking the Diffraction Resolution Limit by Stimulated Emission: Stimulated-emission-depletion Fluorescence Microscopy," Optics letters, 1994, vol. 19(11), pp. 780-782.
Hillman, T.R., et al, "High-resolution, wide-field object reconstruction with synthetic aperture Fourier holographic optical micros-

(56) References Cited

OTHER PUBLICATIONS copy," Optics Express, vol. 17, No. 10, May 11, 2009, pp. 7873-7892. doi:10.1364/OE.17.007873.
Hillmann, et al., "Aberration-free volumetric high-speed imaging of in vivo retina," Sci. Rep. 6, 35209 (Oct. 20, 2016).
Hofer, et al., "Improvement in retinal image quality with dynamic correction of the eye's aberrations," Opt. Express 8, May 21, 2001, pp. 631-643.
Hofer, H., et al, "Dynamics of the eye's wave aberration," Journal of Optical Society of America A., vol. 18, No. 3, Mar. 2001, pp. 497-506. doi: 10.1364/JOSAA.18.000497.
Hofer, H., et al, "Organization of the Human Trichromatic Cone Mosaic," The Journal of Neuroscience, vol. 25, No. 42, Oct. 19, 2005, pp. 9669-9679. doi: 10.1523/JNEUROSCI.2414-05.2005.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. doi:10.1126/sciadv.1602564 [retrieved on Nov. 28, 2017] URL: http://advances.sciencemag.org/.
Hong, S-H., et al, "Three-dimensional volumetric object reconstruction using computational integral imaging," OSA Publishing: Optics Express, vol. 12, No. 3, Feb. 9, 2004, pp. 483-491. doi:10.1364/OPEX.12.000483.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).
Horstmeyer, R., et al, "A phase space model of Fourier ptychographic microscopy," Optics Express, vol. 22, No. 1, Jan. 13, 2014, pp. 338-358. doi:10.1364/OE.22.000338.
Horstmeyer, R., et al, "Diffraction tomography with Fourier ptychography," Optica, Optical Society of America, vol. 3, No. 8, Aug. 2016, pp. 827-835. doi:10.1364/OPTICA.3.000827.
Horstmeyer, R., et al, "Digital pathology with Fourier Ptychography," Computerized Medical Imaging and Graphics, vol. 42, Jun. 2015, pp. 38-43. doi:10.1016/j.compmedimag.2014.11.005.
Horstmeyer, R., et al, "Solving ptychography with a convex relaxation," New Journal of Physics, vol. 17, May 27, 2015, pp. 1-14. doi: 10.1088/1367-2630/17/5/053044 [URL: http://iopscience.iop.org/1367-2630/17/5/053044].
Horstmeyer, R., et al, "Overlapped Fourier coding for optical aberration removal," Optics Express, vol. 22, No. 20, Oct. 6, 2014, pp. 24062-24080. doi: 10.1364/OE.22.024062.
Horstmeyer, R., et al, "Standardizing the resolution claims for coherent microscopy," Nature Photonics | Commentary, vol. 10, No. 2, Feb. 2016, pp. 68-71. doi:10.1038/nphoton.2015.279 [URL: http://dx.doi.org/10.1038/nphoton.2015.279].
Humphry, M., et al, "Ptychographic electron microscopy using high-angle dark-field scattering for sub-nanometre resolution imaging," Nature Communications, vol. 3, Mar. 6, 2012, pp. 1-7. doi: 10.1038/ncomms1733.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
International Preliminary Report on Patentability dated Aug. 3, 2017 issued in Application No. PCT/US2016/014343.
International Preliminary Report on Patentability dated Feb. 11, 2016 issued in PCT/US2014/049297.
International Preliminary Report on Patentability dated Jul. 6, 2017 issued in Application No. PCT/US2015/067498.
International Preliminary Report on Patentability dated Jun. 15, 2017 issued in Application No. PCT/US2015/064126.
International Preliminary Report on Patentability dated Mar. 3, 2016 issued in PCT/US2014/052351.
International Preliminary Report on Patentability dated May 14, 2015 in PCT/US2013/067068.
International Preliminary Report on Patentability dated May 14, 2020 issued in PCT/US2018/059059.
International Preliminary Report on Patentability dated Nov. 30, 2017 issued in PCT/US2016/033638.
International Preliminary Report on Patentability dated Sep. 28, 2017 issued in Application No. PCT/US2016/022116.
International Search Report and Written Opinion dated Apr. 19, 2016 issued in PCT/US2015/067498.
International Search Report and Written Opinion dated Dec. 5, 2014 issued in Application No. PCT/US2014/052351.
International Search Report and Written Opinion dated Feb. 21, 2014 in PCT/US2013/067068.
International Search Report and Written Opinion dated Feb. 22, 2016 issued in PCT/US2015/064126.
International Search Report and Written Opinion dated Feb. 22, 2019 issued in PCT/US2018/059059.
International Search Report and Written Opinion dated Jul. 22, 2024 in PCT Application No. PCT/US2024/022410.
International Search Report and Written Opinion dated Jun. 27, 2016 issued in PCT/US2016/022116.
International Search Report and Written Opinion dated Jun. 30, 2016 issued in PCT/US2016/014343.
International Search Report and Written Opinion dated May 11, 2016 issued in PCT/US2016/015002.
International Search Report and Written Opinion dated May 4, 2016 issued in PCT/US2016/015001.
International Search Report and Written Opinion dated Nov. 13, 2014 issued in PCT/US2014/049297.
International Search Report and Written Opinion dated Sep. 5, 2016 issued in PCT/US2016/033638.
Jacques, et al., "Imaging Superficial Tissues With Polarized Light," Lasers in Surgery and Medicine, vol. 26, No. 2, Apr. 25, 2000, pp. 119-129.
Jaganathan, K., et al, "Phase retrieval with masks using convex optimization," 2015 IEEE International Symposium on Information Theory (ISIT), Hong Kong, 2015, pp. 1655-1659. doi: 10.1109/ISIT.2015.7282737.
Jaganathan, K., et al, pre-published manuscript of "STFT Phase retrieval: uniqueness guarantees and recovery algorithms," ArXiv e-prints, 10 pages, (Submitted on Aug. 12, 2015 (v1). doi: 10.1109/JSTSP.2016.2549507 [retrieved Nov. 9, 2015] URL: https://arxiv.org/abs/1508.02820v1.
Jaganathan, K., et al, "Recovery of sparse 1-D signals from the magnitudes of their Fourier transform," 2012 IEEE International Symposium on Information Theory Proceedings, Cambridge, MA, 2012, pp. 1473-1477. doi: 10.1109/ISIT.2012.6283508.
Japanese First Office Action dated Aug. 7, 2018 issued in Application No. JP 2016-531919.
Japanese Office Action dated Oct. 17, 2017 issued in Application No. 2015-539884.
Jensen, et al. "Types of imaging, Part 2: An Overview of Fluorescence Microscopy." The Anatomical Record, vol. 295, No. 10, Oct. 1, 2012, pp. 1621-1627.
Jiang, S., et al., "Solving Fourier Ptychographic Imaging Problems via Neural Network Modeling and Tensorflow," Biomedical Optics Express, 2018, vol. 9(7), pp. 3306-3319.
Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL: http://archopht.jamanetwork.com/].
Jung, J.H., et al, Author Manuscript of "Microfluidic-integrated laser-controlled microactuators with on-chip microscopy imaging functionality," Published in final edited form as: Lab Chip, Oct. 7, 2014, vol. 14, No. 19, pp. 3781-3789. doi: 10.1039/c4lc00790e.
Kamal, et al., "In situ retrieval and correction of aberrations in moldless lenses using Fourier ptychography," Opt. Express, vol. 26, No. 3, pp. 2708-2719 (Feb. 5, 2018).
Kawata, S. et al, "Optical microscope tomography. I. Support constraint," Journal Optical Society America A, vol. 4, No. 1, Jan. 1987, pp. 292-297. doi:10.1364/JOSAA.4.000292.
Kay, D. B., et al, Author Manuscript of "Outer Retinal Structure in Best Vitelliform Macular Dystrophy," Published in final edited form as: JAMA Ophthalmol., Sep. 2013, vol. 131, No. 9, pp. 1207-1215. doi: 10.1001/jamaophthalmol.2013.387.

(56) References Cited

OTHER PUBLICATIONS

Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. doi: 10.1364/BOE.7.003097.
Kim, M., et al, "High-speed synthetic aperture microscopy for live cell imaging," NIH-PA, Author Manuscript available in PMC Mar. 30, 2011. Published in final edited form as: Opt Lett. Jan. 15, 2011; 36(2): pp. 148-150. PMCID: PMC3068016.
Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro.a023486].
Kirkland, A.I., et al, "Super-resolution by aperture synthesis: tilt series reconstruction in CTEM," Elsevier Science B.V., Ultramicroscopy 57, Mar. 1995, pp. 355-374. doi:10.1016/0304-3991(94)00191-O.
Kittler, H., et al, "Morphologic changes of pigmented skin lesions: A useful extension of the ABCD rule for dermatoscopy," Journal of the American Academy of Dermatology (JAAD), Apr. 1999. vol. 40, No. 4, pp. 558-562. doi: 10.1016/S0190-9622(99)70437-8.
Kner, P., "Phase diversity for three-dimensional imaging," Journal of the Optical Society of America A, vol. 30, No. 10, Oct. 1, 2013, pp. 1980-1987. doi:10.1364/JOSAA.30.001980.
Konda, P., et al., "Fourier Ptychography: Current Applications and Future Promises," Optics express, 2020, vol. 28(7), pp. 9603-9630.
Kozak, I., "Retinal imaging using adaptive optics technology," Saudi Journal of Ophthalmology, vol. 28, No. 2, Feb. 25, 2014, pp. 117-122. doi:10.1016/j.sjopt.2014.02.005.
Kuang, et al., "Digital micromirror device-based laserillumination Fourier ptychographic microscopy," Optics Express, vol. 23, Oct. 5, 2015, pp. 26999-27010.
Kubala, et al., "Reducing complexity in computational imaging systems," Optics Express vol. 11, Sep. 8, 2003, pp. 2102-2108.
Kumar, et al., "Subaperture correlation based digital adaptive optics for full field optical coherence tomography," Optics Express, vol. 21, May 6, 2013, pp. 10850-10866.
Kundur, et al., "Blind Image Deconvolution," IEEE Signal Processing Magazine, vol. 13, No. 3, May 1996, pp. 43-64.
Lauer, V., "New Approach to optical diffraction tomography yielding a vector equation of diffraction tomography and a novel tomographic microscope," Journal of Microscopy, Feb. 2002, vol. 205, No. 2, pp. 165-176. doi: 10.1046/j.0022-2720.2001.00980.x.
Lee, K., et al, "Synthetic Fourier transform light scattering," Optics Express, vol. 21, No. 19, Sep. 23, 2013, pp. 22453-22463. doi:10.1364/OE.21.022453.
Levin et al., "Image and depth from a conventional camera with a coded aperture," ACM Transactions on Graphics, vol. 26, No. 3, Article 70, Jul. 2007, pp. 70-71-70-9.
Levin, et al., "Understanding blind deconvolution algorithms," IEEE Trans. Pattern Anal. Mach. Intell., vol. 33, No. 12, Dec. 2011, pp. 2354-2367.
Levoy, M., et al, "Light field microscopy," ACM Transactions Graphics, vol. 25, No. 3, proceedings of ACM SIGGRAPH Jul. 2006, pp. 1-11. [doi: 10.1145/1141911.1141976].
Levoy, M., et al, "Recording and controlling the 4D light field in a microscope using microlens arrays," Journal of Microscopy, vol. 235, Pt. 2, Aug. 2009, pp. 144-162. doi:10.1111/j.1365-2818.2009.03195.x.
Li, E., et al., "Exceeding the limits of algorithmic self-calibrated aberration recovery in Fourier ptychographym," Optics Continuum, 2023, vol. 2(1), pp. 119-130.
Li, et al., "Separation of three dimensional scattering effects in tilt-series Fourier ptychography," Ultramicroscopy 158, 1-7 (Jun. 14, 2015).
Li, et al., "GPU accelerated parallel FFT processing for Fourier transform hyperspectral imaging," Applied Optics, vol. 54, No. 13, May 1, 2015, pp. D91-D98.
Li, X, et al., "Sparse Signal Recovery from Quadratic Measurements via Convex Programming," SIAM Journal on Mathematical Analysis, vol. 45, No. 5, Sep. 26, 2013, pp. 3019-3033. [doi:10.1137/120893707] [retrieved Feb. 13, 2014] URL: http://dx.doi.org/10.1137/120893707.
Lohmann, A. W., et al, "Space-bandwidth product of optical signals and systems," Journal of the Optical Society of America A, vol. 13, No. 3, Mar. 1996, pp. 470-473. doi: 10.1364/JOSAA.13.000470.
Lu, H., et al, "Quantitative phase imaging and complex field reconstruction by pupil modulation differential phase contrast," Optics Express, vol. 24, No. 22, Oct. 31, 2016, pp. 25345-25361. doi:10.1364/OE.24.025345.
Lue, N., et al, "Live Cell Refractometry Using Hilbert Phase Microscopy and Confocal Reflectance Microscopy," NIH-PA Author Manuscript, available in PMC Apr. 22, 2010. Published in final edited form as: J Phys Chem A. Nov. 26, 2009; 113(47); 13327-13330. PMCID: PMC2858636.
Luo Y. et al., "Single-shot Autofocusing of Microscopy Images Using Deep Learning," ACS Photonics, vol. (8)2, 2021, pp. 625-638.
LUXEXCEL® Brochure, "LUXEXCEL: 3D Printing Service Description" pp. 1-5. [retrieved on Mar. 7, 2016] URL: http://www.luxexcel.com.
LYTRO | ILLUM, Lytro-Products [webpages], pp. 1-6. [Online] [retrieved Oct. 23, 2015] URL:https://www.lytro.com/.
Ma, W., et al, "Rapid Acquisition of Specular and Diffuse Normal Maps from Polarized Spherical Gradient Illumination," EGSR'07 Proceedings of the 18th Eurographics conference on Rendering Techniques, Eurographics Association, Aire-la-Ville, Switzerland 2007, pp. 183-194. doi: 10.2312/EGWR/EGSR07/183-194.
Mahajan, V.N., "Zernike Circle Polynomials and Optical Aberrations of Systems with Circular Pupils," Engineering Laboratory Notes: Supplemental to Applied Optics, vol. 33 No. 34, Dec. 1, 1994, pp. 8121-8124. doi:10.1364/AO.33.008121.
Maiden, A.M., et al, "A new method of high resolution, quantitative phase scanning microscopy," in Proceedings of SPIE, Jun. 2, 2010, vol. 7729, pp. 77291I-1-77291I-8. doi: 10.1117/12.853339 [retrieved on Dec. 16, 2015] URL: proceedings.spiedigitallibrary.org.
Maiden, A.M., et al, "An improved ptychographical phase retrieval algorithm for diffractive imaging," Ultramicroscopy, vol. 109, No. 10, Sep. 2009, pp. 1256-1262. doi:10.1016/j.ultramic.2009.05.012.
Maiden, A.M., et al, "Optical ptychography: a practical implementation with useful resolution," Optics Letters, vol. 35, No. 15, Aug. 1, 2010, pp. 2585-2587. doi: 10.1364/OL.35.002585.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Maiden, A.M., et al, "Superresolution imaging via ptychography," Journal of the Optical Society of America A. (JOSAA), vol. 28, No. 4, Apr. 1, 2011, pp. 604-612. doi: 10.1364/JOSAA.28.000604.
Marchesini S., et al, pre-published manuscript of "Augmented projections for ptychographic imaging," (Submitted on Sep. 21, 2012 (v1), last revised Aug. 29, 2013 (this version, v5)) pp. 1-18. Published in Inverse Problems vol. 29, No. 11 (2013). [retrieved on Nov. 9, 2015] URL: https://arxiv.org/pdf/1209.4924.
Marchesini S., "Invited Article: A unified evaluation of iterative projection algorithms for phase retrieval," Review of Scientific Instruments, vol. 78, No. 1, Apr. 19, 2007, pp. 011301-1-011301-10. doi: 10.1063/1.2403783 [retrieved May 7, 2014] URL: http://dx.doi.org/10.1063/1.2403783.
Marcos, et al., "Vision science and adaptive optics, the state of the field," Vision Research, vol. 132, Feb. 27, 2017, pp. 3-33.
Marrison, J., et al, "Ptychography—a label free, high-contrast imaging technique for live cells using quantitative phase information," Scientific Reports, vol. 3, No. 2369, Aug. 6, 2013, pp. 1-7. doi: 10.1038/srep02369.
Martins da Silva et al., "Photosensitivity and epilepsy: current concepts and perspectives—a narrative review," Seizure, vol. 50, Apr. 4, 2017, pp. 209-218.
McConnell, et al., "A novel optical microscope for imaging large embryos and tissue vols. with sub-cellular resolution throughout," eLife 5, e18659, Sep. 23, 2016, pp. 1-15.
Medoff, B.P., et al, "Iterative convolution back-projection algorithms for image reconstruction from limited data," Journal of the

(56) References Cited

OTHER PUBLICATIONS

Optical Society of America, vol. 73, No. 11, Nov. 1, 1983, pp. 1493-1500. doi: 10.1364/JOSA.73.001493.

Melafind, Optics by Carl Zeiss, MELA Sciences 2015, pp. 1-4. [Webpage] [retrieved Oct. 23, 2015] URL: http://www.melafind.com/.

Meyer, R.R., et al, "A new method for the determination of the wave aberration function of high-resolution TEM. 2. Measurement of the antisymmetric aberrations," Ultramicroscopy, vol. 99, No. 2-3, May 2004, pp. 115-123. doi: 10.1016/j.ultramic.2003.11.001.

Miao, J., et al, "High Resolution 3D X-Ray Diffraction Microscopy," Physical Review Letters, vol. 89, No. 8, Aug. 19, 2002, pp. 088303-1-088303-4. doi: 10.1103/PhysRevLett.89.088303.

Mico, V., et al, "Synthetic aperture microscopy using off-axis illumination and polarization coding," Optics Communications, vol. 276, No. 2, Aug. 15, 2007, pp. 209-217. doi:10.1016/j.optcom.2007.04.020.

Mico, V., et al., "Synthetic aperture superresolution with multiple off-axis holograms," Journal of the Optical Society of America A, vol. 23, No. 12, Dec. 1, 2006, pp. 3162-3170. doi:10.1364/JOSAA.23.003162.

Mir, M., et al, "Blood screening using diffraction phase cytometry," Journal of Biomedical Optics: vol. 15, No. 2, Mar./Apr. 2010, pp. 027016-1-027014-4. doi:10.1117/1.3369965 [retrieved on Feb. 6, 2015] URL: http://dx.doi.org/10.1117/1.3369965.

Mir, M. et al, "Optical measurement of cycle-dependent cell growth," Proceedings of the National Academy of Sciences (PNAS) vol. 108, No. 32, Aug. 9, 2011, pp. 13124-13129. doi:10.1073/pnas.1100506108.

Moreno, I., "Creating a desired lighting pattern with an LED array," Proceedings of SPIE, Eighth International Conference on Solid State Lighting, vol. 705811, Sep. 2, 2008, pp. 9. doi:10.1117/12.795673.

Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. doi:10.3928/23258160-20141118-12.

Muyo, et al., "Infrared imaging with a wavefront-coded singlet lens," Optics Express, vol. 17, Nov. 5, 2009, pp. 21118-21123.

Muyo, et al., "Wavefront coding for athermalization of infrared imaging systems," Proc. SPIE 5612, Dec. 6, 2004, pp. 227-235.

Nayar, S. K., et al, pre-published manuscript of "Fast separation of direct and global components of a scene using high frequency illumination," (Submitted 2006, this one (v.1)), Published in: ACM SIGGRAPH 2006 Papers, Boston, Massachusetts Jul.-Aug. 3, 2006, pp. 935-944. doi: http://dx.doi.org/10.1145/1179352.1141977.

Neumaier, "Solving ill-conditioned and singular linear systems: a tutorial on regularization," SIAM Rev. 40, (1998), pp. 636-666.

Ng, R., et al, "Light Field Photography with a Hand-held Plenoptic Camera," Stanford Tech Report, Computer Science Technical Report (CSTR) Apr. 20, 2005, vol. 2, No. 11, pp. 1-11. URL: https://classes.soe.ucsc.edu/cmps290b/Fall05/readings/lfcamera-150dpi.pdf.

Nguyen, T., et al., "Deep Learning Approach for Fourier Ptychography Microscopy," Optics express, 2018, vol. 26(20), pp. 26470-26484.

Nomura, H., et al., "Techniques for measuring aberrations in lenses used in photolithography with printed patterns," Applied Optics, vol. 38, No. 13, May 1, 1999, pp. 2800-2807. doi:10.1364/AO.38.002800.

Ohlsson, H., et al, "Compressive Phase Retrieval From Squared Output Measurements Via Semidefinite Programming," arXiv:1111.6323, Technical Report; Nov. 28, 2011, pp. 6. URL: http://cds.cern.ch/record/1402765.

Ou, X., et al, "Aperture scanning Fourier ptychographic microscopy," Biomedical Optics Express, vol. 7, No. 8, Aug. 1, 2016, pp. 3140-3150. doi:10.1364/BOE.7.003140.

Ou, X., et al., "Embedded pupil function recovery for Fourier ptychographic microscopy," Optics Express, 2014, vol. 22(5), pp. 4960-4972.

Ou, X., et al, "High numerical aperture Fourier ptychography: principle, implementation and characterization," Optics Express, vol. 23, No. 3, Feb. 9, 2015, pp. 3472-3491. doi: 10.1364/oe.23.003472.

Ou. X., et al, pre-published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. doi: 10.1364/OE.22.004960.

Ou, X., et al, "Quantitative phase imaging via Fourier ptychographic microscopy," NIH-PA Author Manuscript; available in PMC Dec. 26, 2014. Published in final edited form as: Opt Lett. Nov. 15, 2013; 38(22): 4845-4848. doi: 10.1364/OL.38.004845.

Pacheco, S., et al, "Reflective Fourier Ptychography," Journal of Biomedical Optics, vol. 21, No. 2, Feb. 18, 2016, pp. 026010-1-026010-7. doi:10.1117/1.JBO.21.2.026010 [retrieved on Mar. 8, 2016] URL: http://biomedicaloptics.spiedigitallibrary.org.

Pan, et al., "Three-dimensional space optimization for near-field ptychography," Opt. Express 27, 5433-5446 (Feb. 18, 2019).

Pan, et al., "Subwavelength resolution Fourier ptychography with hemispherical digital condensers," Opt. Express 26, 23119-23131 (Sep. 3, 2018).

Pan, et al., "System calibration method for Fourier ptychographic microscopy," J. Biomed. Opt. 22, 096005 (Sep. 12, 2017).

Pankajakshan, P., "Blind Deconvolution for Confocal Laser Scanning Microscopy," Doctoral dissertation, Universite Nice Sophia Antipolis, 2009. URL: https://tel.archives-ouvertes.fr/tel-00474264.

Phillips, et al., "Multi-Contrast Imaging and Digital Refocusing on a Mobile Microscope with a Domed LED Array," PLoS One, vol. 10, No. 5, May 13, 2015, pp. 1-13. doi:10.1371/journal.pone.0124938.

Qian, et al., "Large-scale 3D imaging of insects with natural color," Opt. Express 27, 4845-4857 (Feb. 18, 2019).

Recht, B., et al, "Guaranteed Minimum-Rank Solutions of Linear Matrix Equations via Nuclear Norm Minimization," SIAM Review, vol. 52, No. 3, Aug. 5, 2010, pp. 471-501. doi: 10.1137/070697835 [retrieved on Nov. 20, 2015] URL:https://doi.org/10.1137/070697835.

Reinhard, et al, "High Dynamic Range Imaging: Acquisition, Display, and Image-based Lighting" Second Edition 5.2 HDR Image Capture: Morgan Kaufmann, May 28, 2010, pp. 148-151. ISBN: 9780123749147.

Reinig, et al., "Adaptative optics microscopy enhances image quality in deep layers of CLARITY processed brains of YFP-H mice" Proc., of SPIE, vol. 9690, (Mar. 9, 2016) pp. 969008-1-969008-12. doi:10.1117/12.2213283.

Rha, et al., "Adaptive optics flood-illumination camera for high speed retinal imaging," Opt. Express vol. 14, May 15, 2006, pp. 4552-4569.

Rodenburg, J. M., et al, "A phase retrieval algorithm for shifting illumination," Applied Physics Letters, vol. 85, No. 20, Nov. 15, 2004, pp. 4795-4797. doi: 10.1063/1.1823034.

Rodenburg, J. M., et al, "Hard-X-ray Lensless Imaging of Extended Objects," Physical Review Letters, vol. 98, No. 3, Jan. 19, 2007, pp. 034801-1-034801-4. doi: 10.1103/PhysRevLett.98.034801.

Rodenburg, J. M., et al, "The Theory of Super-Resolution Electron Microscopy Via Wigner-Distribution Deconvolution," Philosophical Transactions of the Royal Society A, vol. 339, No. 1655, Jun. 15, 1992, pp. 521-553. doi: 10.1098/rsta.1992.0050.

Rodenburg, J.M., "Ptychography and related Diffractive Imaging Methods," Adv. Imaging Electron Phys., vol. 150, Dec. 31, 2008, pp. 87-184. doi: 10.1016/S1076-5670(07)00003-1.

Rossi, E.A., et al, "In vivo imaging of retinal pigment epithelium cells in age related macular degeneration," Biomedical Optics Express, vol. 4, No. 11, Nov. 1, 2013, pp. 2527-2539. doi: 10./1364/BOE.4.002527].

Rowe, M., et al, "Polarization-difference imaging: a biologically inspired technique for observation through scattering media," Optics Letters, vol. 20, No. 6, Mar. 15, 1995, pp. 608-610. doi:10.1364/OL.20.000608.

Rust, M., et al., "Sub-diffraction-limit Imaging by Stochastic Optical Reconstruction Microscopy (Storm)," Nature methods, 2006, vol. 3(10), pp. 793-795.

(56) References Cited

OTHER PUBLICATIONS

Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. doi:10.1109/ICCPhot.2012.6215212.
Sarder, et al. "Deconvolution Methods for 3-D Fluorescence Microscopy Images," IEEE Signal Processing Magazine, vol. 23, No. 3, May 2006, pp. 32-45.
Schechner, Y., "Multiplexing for Optimal Lighting," IEEE Transactions on Pattern Analysis and Machine Intelligence, vol. 29, No. 8, Aug. 2007, pp. 1339-1354. doi: 10.1109/TPAMI.2007.1151.
Schnars, U., et al, "Digital recording and numerical reconstruction of holograms," Measurement Science and Technology, vol. 13, No. 9, Aug. 7, 2002, pp. R85-R101. doi: 10.1088/0957-0233/13/9/201.
Schwarz, C., et al, "Imaging interferometric microscopy," Optics letters, vol. 28, No. 16, Aug. 15, 2003, pp. 1424-1426. doi: 10.1364/OL.28.001424.
Shechner, Y., et al, "Polarization-based vision through haze," Applied Optics, vol. 42, No. 3, Jan. 20, 2003, pp. 511-525. doi: 10.1364/AO.42.000511.
Shechtman, Y., et al, "Sparsity based sub-wavelength imaging with partially incoherent light via quadratic compressed sensing," Optics Express, vol. 19, No. 16, Aug. 1, 2011, pp. 14807-14822. doi:10.1364/OE.19.014807.
Shemonski, et al., "Computational high-resolution optical imaging of the living human retina," Nat. Photonics, vol. 9, Jul. 2015, pp. 440-443.
Shen, C., et al., "Computational aberration correction of VIS-NIR multispectral imaging microscopy based on Fourier ptychography" Optics Express, 2019. 27(18): 24923-24937.
Shen, C., et al., "Non-iterative complex wave-field reconstruction based on Kramers-Kronig relations," Photonics Research, 2021, vol. 9(6), pp. 1003-1012.
Siegel, R., et al, "Cancer Statistics 2013," CA: A Cancer Journal for Clinicians, vol. 63, No. 1, Jan. 1, 2013, pp. 11-30. doi:10.3322/caac.21166.
Soulez, et al., "Blind deconvolution of 3D data in wide field fluorescence microscopy" In 2012 9th IEEE International Symposium on Biomedical Imaging (ISBI) May 2, 2012, pp. 1735-1738.
Stoecker, W., et al, "Diagnostic Inaccuracy of Smartphone Applications for Melanoma Detection: Representative Lesion Sets and the Role for Adjunctive Technologies," JAMA Dermatology, vol. 149, No. 7, Jul. 1, 2013, pp. 884-884. doi: 10.1001/jamadermatol.2013.4334.
Sun, D., et al, "Estimating a signal from a magnitude spectrogram via convex optimization," arXiv preprint arXiv:1209.2076, Sep. 10, 2012, pp. 1-7. [retrieved Nov. 9, 2015] URL: https://arxiv.org/abs/1209.2076.
Sun, et al., "Sampling criteria for Fourier ptychographic microscopy in object space and frequency space," Optics Express vol. 24, No. 14, Jul. 11, 2016, pp. 15765-15781.
Sun, et al., "Efficient positional misalignment correction method for Fourier ptychographic microscopy," Biomedical Optics Express vol. 7, No. 4, Mar. 17, 2016, pp. 1336-1350.
Sun, et al., "Resolution-enhanced Fourier ptychographic microscopy based on high-numerical-aperture illuminations," Scientific Reports, vol. 7, No. 1187, Apr. 26, 2017, pp. 1-11.
Sun, J., "Coded multi-angular illumination for Fourier ptychography based on Hadamard codes," In Proc. SPIE, vol. 9524, Jul. 17, 2015, pp. 95242C-1-94242C-5. doi:10.1117/12.2189655 [retrieved Jul. 23, 2015] URL: http://proceedings.spiedigitallibrary.org.
Sun, M., et al., Neural Network Model Combined With Pupil Recovery for Fourier Ptychographic Microscopy, Optics express, 2019, vol. 27(17), pp. 24161-24174.
Tam, K., et al, "Tomographical imaging with limited-angle input," Journal of the Optical Society of America, vol. 71, No. 5, May 1981, pp. 582-592. doi:doi.org/10.1364/JOSA.71.000582.
Thibault, P., et al, "High-resolution scanning X-ray diffraction microscopy," Science AAAS, vol. 321, No. 5887, Jul. 18, 2008, pp. 379-382. doi:10.1126/science.1158573.
Thibault, P. et al, "Probe retrieval in ptychographic coherent diffractive imaging," Ultramicroscopy, vol. 109, No. 4, Mar. 2009, pp. 338-343. doi:10.1016/j.ultramic.2008.12.011.
Thiébaut and Conan, "Strict a priori constraints for maximumlikelihood blind deconvolution," J. Opt. Soc. Am. A, vol. 12, No. 3, Mar. 1995, pp. 485-492.
Thomas, L., et al, "Semiological Value of ABCDE Criteria in the Diagnosis of Cutaneous Pigmented Tumors," Dermatology, vol. 197, No. 1, Jul. 13, 1998, p. 11-17. doi:10.1159/000017969.
Tian and Waller, "3D intensity and phase imaging from light field measurements in an LED array microscope," Optica vol. 2, No. 2, Feb. 2015, pp. 104-111.
Tian, L., et al, "3D differential phase-contrast microscopy with computational illumination using an LED array," Optics Letters, vol. 39, No. 5, Mar. 1, 2014, pp. 1326-1329. doi:10.1364/OL39.001326.
Tian, L., et al., "Computational illumination for high-speed in vitro Fourier ptychographic microscopy," Optica: Research Article, 2015, vol. 2(10), pp. 904-911.
Tian, L., et al., Multiplexed Coded Illumination for Fourier Ptychography with an LED Array Microscope, Biomedical Optics Express, 2014, vol. 5(7), pp. 1-14.
Tippie, A.E., et al, "High-resolution synthetic-aperture digital holography with digital phase and pupil correction," Optics Express, vol. 19, No. 13, Jun. 20, 2011, pp. 12027-12038. doi:10.1364/OE.19.012027.
Tomer et al., "Advanced CLARITY for rapid and high-resolution imaging of intact tissues," Nat. Protoc., vol. 9, No. 7, Jul. 2014, pp. 1682-1697.
Turpin, T., et al, "Theory of the synthetic aperture microscope," SPIE Proceedings, vol. 2566: Advanced Imaging Technologies and Commercial Applications, Aug. 23, 1995, pp. 230-240. [retrieved Mar. 16, 2015] URL: http://dx.doi.org/10.1117/12.217378.
Tyson, R., "Principles of Adaptive Optics" Third Ed., Series In Optics and Optoelectronics, CRC Press, Sep. 14, 2010, pp. 1-299. ISBN: 13: 978-1-4398-0859-7.
U.S. Corrected Notice of Allowance dated Aug. 4, 2022 in U.S. Appl. No. 14/658,019.
US Ex Parte Quayle Action dated Aug. 8, 2019 issued in U.S. Appl. No. 16/242,934.
U.S. Final Office Action dated Apr. 1, 2024 in U.S. Appl. No. 17/455,640.
U.S. Final Office Action dated Apr. 18, 2023 in U.S. Appl. No. 17/455,640.
U.S. Final Office Action dated Apr. 3, 2017 in U.S. Appl. No. 14/065,280.
U.S. Final Office Action dated Dec. 10, 2018 issued in U.S. Appl. No. 15/003,559.
U.S. Final Office Action dated Dec. 14, 2017 in U.S. Appl. No. 14/960,252.
U.S Final Office Action dated Dec. 28, 2017 in U.S. Appl. No. 14/710,947.
U.S. Final Office Action dated Jan. 17, 2018 in U.S. Appl. No. 14/658,019.
U.S. Final Office Action dated Jan. 23, 2017 in U.S. Appl. No. 15/007,196.
U.S. Final Office Action dated Jul. 27, 2017 in U.S. Appl. No. 15/003,559.
U.S. Final Office Action dated Jun. 19, 2019 issued in U.S. Appl. No. 15/068,389.
U.S. Final Office Action dated Jun. 3, 2019 in U.S. Appl. No. 15/959,050.
U.S. Final Office Action dated Jun. 6, 2018 issued in U.S. Appl. No. 15/068,389.
U.S. Final Office Action dated May 1, 2020 issued in U.S. Appl. No. 16/252,465.
U.S. Final Office Action dated May 30, 2019 in U.S. Appl. No. 14/658,019.
U.S. Final Office Action dated May 30, 2019 in U.S. Appl. No. 14/979,154.
U.S. Final Office Action dated Nov. 29, 2018 in U.S. Appl. No. 14/065,280.

(56) References Cited

OTHER PUBLICATIONS

U.S. Final Office Action dated Oct. 29, 2020 in U.S. Appl. No. 14/658,019.
U.S. Non-Final Office Action dated Apr. 30, 2024 in U.S. Appl. No. 17/652,667.
U.S. Non-Final Office Action dated Oct. 12, 2023, in U.S. Appl. No. 17/455,640.
U.S. Non-Final Office Action dated Oct. 20, 2022, in U.S. Appl. No. 17/455,640.
U.S. Notice of Allowance dated Apr. 13, 2016 in U.S. Appl. No. 14/448,850.
U.S. Notice of Allowance dated Apr. 13, 2022 in U.S. Appl. No. 14/658,019.
U.S. Notice of Allowance dated Apr. 16, 2019 in U.S. Appl. No. 15/820,295.
U.S. Notice of Allowance dated Apr. 19, 2019 in U.S. Appl. No. 15/963,966.
U.S. Notice of Allowance dated Apr. 22, 2016 in U.S. Appl. No. 14/466,481.
U.S. Notice of Allowance dated Apr. 29, 2019 issued in U.S. Appl. No. 15/620,674.
U.S. Notice of Allowance dated Apr. 3, 2020 in U.S. Appl. No. 16/162,271.
U.S. Notice of Allowance dated Apr. 6, 2021 issued in U.S. Appl. No. 16/552,948.
U.S. Notice of Allowance dated Apr. 7, 2020 issued in U.S. Appl. No. 16/179,688.
U.S. Notice of Allowance dated Aug. 12, 2019 in U.S. Appl. No. 14/960,252.
U.S. Notice of Allowance dated Aug. 14, 2019 issued in U.S. Appl. No. 15/620,674.
U.S. Notice of Allowance dated Aug. 16, 2017 in U.S. Appl. No. 15/209,604.
U.S. Notice of Allowance dated Aug. 23, 2016 in U.S. Appl. No. 14/466,481.
U.S. Notice of Allowance dated Dec. 4, 2015 in U.S. Appl. No. 14/065,305.
U.S. Notice of Allowance dated Dec. 4, 2017 in U.S. Appl. No. 14/065,305.
U.S. Notice of Allowance dated Dec. 9, 2019 in U.S. Appl. No. 16/162,271.
US Notice of Allowance dated Feb. 18, 2020 issued in U.S. Appl. No. 16/242,934.
U.S. Notice of Allowance dated Feb. 9, 2018 in U.S. Appl. No. 15/081,659.
U.S. Notice of Allowance dated Jan. 13, 2017 in U.S. Appl. No. 14/065,305.
U.S. Notice of Allowance dated Jan. 14, 2016 in U.S. Appl. No. 14/448,850.
U.S. Notice of Allowance dated Jan. 14, 2019 in U.S. Appl. No. 15/820,295.
U.S. Notice of Allowance dated Jan. 15, 2019 issued in U.S. Appl. No. 15/620,674.
U.S. Notice of Allowance dated Jan. 17, 2020 issued in U.S. Appl. No. 15/003,559.
U.S. Notice of Allowance dated Jan. 22, 2016 in U.S. Appl. No. 14/466,481.
U.S. Notice of Allowance dated Jan. 23, 2018 in U.S. Appl. No. 15/206,859.
U.S. Notice of Allowance dated Jan. 24, 2020 issued in U.S. Appl. No. 15/068,389.
U.S. Notice of Allowance dated Jan. 26, 2018 in U.S. Appl. No. 15/209,604.
U.S. Notice of Allowance dated Jan. 29, 2020 issued in U.S. Appl. No. 14/065,280.
U.S. Notice of Allowance dated Jan. 6, 2020 in U.S. Appl. No. 14/960,252.
U.S. Notice of Allowance dated Jul. 16, 2018 in U.S. Appl. No. 15/007,159.
U.S. Notice of Allowance dated Jul. 25, 2018 in U.S. Appl. No. 14/710,947.
U.S. Notice of Allowance dated Jun. 20, 2017 in U.S. Appl. No. 14/572,493.
U.S. Notice of Allowance dated Jun. 27, 2018 in U.S. Appl. No. 15/636,494.
U.S. Notice of Allowance dated Jun. 9, 2017 in U.S. Appl. No. 15/007,196.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Mar. 2, 2020 in U.S. Appl. No. 14/979,154.
U.S. Notice of Allowance dated Mar. 22, 2017 in U.S. Appl. No. 15/007,196.
U.S. Notice of Allowance dated Mar. 31, 2017 in U.S. Appl. No. 14/572,493.
U.S. Notice of Allowance dated Mar. 8, 2017 in U.S. Appl. No. 14/572,493.
U.S. Notice of Allowance dated Nov. 2, 2016 in U.S. Appl. No. 14/572,493.
U.S. Notice of Allowance dated Nov. 20, 2019 in U.S. Appl. No. 15/959,050.
US Notice of Allowance dated Nov. 4, 2019 issued in U.S. Appl. No. 16/242,934.
U.S. Notice of Allowance dated Oct. 11, 2017 in U.S. Appl. No. 14/572,493.
U.S. Notice of Allowance dated Oct. 19, 2018 issued in U.S. Appl. No. 15/160,941.
U.S. Notice of Allowance dated Oct. 20, 2017 in U.S. Appl. No. 15/081,659.
U.S. Notice of Allowance dated Oct. 5, 2018 in U.S. Appl. No. 15/636,494.
U.S. Notice of Allowance dated Sep. 1, 2017 in U.S. Appl. No. 15/206,859.
U.S. Notice of Allowance dated Sep. 16, 2019 issued in U.S. Appl. No. 15/068,389.
U.S. Notice of Allowance dated Sep. 17, 2018 in U.S. Appl. No. 15/820,295.
U.S. Notice of Allowance dated Sep. 17, 2019 in U.S. Appl. No. 14/960,252.
U.S. Notice of Allowance dated Sep. 20, 2017 in U.S. Appl. No. 15/007,196.
U.S. Notice of Allowance dated Sep. 25, 2019 issued in U.S. Appl. No. 15/620,674.
U.S Office Action dated Apr. 13, 2018 issued in U.S. Appl. No. 15/160,941.
U.S. Office Action dated Apr. 4, 2018 issued in U.S. Appl. No. 15/003,559.
U.S. Office Action dated Apr. 4, 2019 in U.S. Appl. No. 16/162,271.
U.S. Office Action dated Aug. 16, 2016 in U.S. Appl. No. 14/065,280.
U.S. Office Action dated Aug. 28, 2020 in U.S. Appl. No. 16/572,497.
U.S. Office Action dated Aug. 31, 2017 in U.S. Appl. No. 15/636,494.
U.S. Office Action dated Aug. 7, 2020 issued in U.S. Appl. No. 16/552,948.
U.S. Office Action dated Dec. 13, 2018 in U.S. Appl. No. 14/960,252.
U.S. Office Action dated Dec. 26, 2018 in U.S. Appl. No. 15/959,050.
U.S. Office Action dated Dec. 26, 2018 in U.S. Appl. No. 15/963,966.
U.S. Office Action dated Feb. 21, 2017 in U.S. Appl. No. 14/960,252.
U.S. Office Action dated Jan. 17, 2019 issued in U.S. Appl. No. 15/068,389.
U.S. Office Action dated Jan. 25, 2018 in U.S. Appl. No. 14/065,280.
U.S. Office Action dated Jan. 9, 2020 in U.S. Appl. No. 14/658,019.
U.S. Office Action dated Jul. 14, 2016 in U.S. Appl. No. 15/007,196.
U.S. Office Action dated Jun. 10, 2021 in U.S. Appl. No. 14/658,019.
U.S. Office Action dated Jun. 26, 2019 issued in U.S. Appl. No. 14/065,280.
U.S. Office Action dated Jun. 26, 2019 issued in U.S. Appl. No. 15/003,559.
U.S. Office Action dated Mar. 13, 2017 in U.S. Appl. No. 14/658,019.
U.S. Office Action dated Mar. 24, 2017 in U.S. Appl. No. 14/710,947.
U.S. Office Action dated Mar. 8, 2019 in U.S. Appl. No. 16/171,270.

(56) References Cited

OTHER PUBLICATIONS

U.S. Office Action dated May 19, 2017 in U.S. Appl. No. 15/081,659.
U.S. Office Action dated May 25, 2021 issued in U.S. Appl. No. 16/864,618.
U.S. Office Action dated Nov. 22, 2016 in U.S. Appl. No. 15/003,559.
U.S. Office Action dated Nov. 3, 2017 in U.S. Appl. No. 15/068,389.
U.S. Office Action dated Nov. 30, 2017 in U.S. Appl. No. 15/007,159.
U.S. Office Action dated Oct. 11, 2019 issued in U.S. Appl. No. 16/179,688.
U.S. Office Action dated Oct. 4, 2018 in U.S. Appl. No. 14/658,019.
U.S. Office Action dated Oct. 5, 2015 in U.S. Appl. No. 14/065,305.
U.S. Office Action dated Sep. 16, 2016 in U.S. Appl. No. 14/065,305.
U.S. Office Action dated Sep. 23, 2019 issued in U.S. Appl. No. 16/252,465.
U.S. Office Action dated Sep. 7, 2018 in U.S. Appl. No. 14/979,154.
U.S. Office Action Interview Summary dated May 3, 2018 in U.S. Appl. No. 15/068,389.
Vulovic, M., et al, "When to use the projection assumption and the weak-phase object approximation in phase contrast cryo-EM," Ultramicroscopy, vol. 136, Jan. 2014, pp. 61-66. doi:10.1016/j.ultramic.2013.08.002.
Wade, et al., "A fast, robust pattern recognition system for low light level image registration and its application to retinal imaging," Optics Express vol. 3, No. 5, Aug. 31, 1998, pp. 190-197.
Waldspurger, I., et al, "Phase recovery, MaxCut and complex semidefinite programming," Mathematical Programming, vol. 149, No. 1-2, Feb. 2015, pp. 47-81. doi:10.1007/s10107-013-0738-9.
Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. doi:10.1167/iovs.14-15576 [retrieved on Apr. 5, 2016] [URL: http://iovs.arvojournals.org].
Wang, Z., et al, "Tissue refractive index as marker of disease," Journal of Biomedical Optics, vol. 16, No. 11, Nov. 2011, pp. 116017-1-16017-7. doi:10.1117/1.3656732.
Watanabe, M., et al, "Telecentric optics for focus analysis," IEEE Transactions on Pattern Analysis and Machine Intelligence: Short Papers, vol. 19, No. 12, Dec. 1997, pp. 1360-1365. doi:10.1109/34.643894.
Weigert, Martin, et al, "Content-aware image restoration: pushing the limits of fluorescence microscopy" Nature methods, 2018. 15(12): 1090-1097.
Wesner, J., et al, "Reconstructing the pupil function of microscope objectives from the intensity PSF," Proc. SPIE 4767, Current Developments in Lens Design and Optical Engineering III, 32 (Oct. 1, 2002), pp. 32-43. doi:10.1117/12.451320 [retrieved Dec. 16, 2015] URL: http://proceedings.spiedigitallibrary.org.
Williams. A et al, "Fourier ptychographic microscopy for filtration-based circulating tumor cell enumeration and analysis," Journal of Biomedical Optics, vol. 19, No. 6, Jun. 20, 2014, pp. 066007.1-66007.8.< doi:10.1117 1.jbo. 19.6.066007=""> [retrieved Feb. 10, 2016]< url: http://biomedicaloptics.spiedigitallibrary.org</url:.</doi:10.1117>.
Williams, D., "Imaging Single Cells in the Living Retina," Vis. Res. 51, pp. 1379-1396 (Jul. 1, 2011).
Wills, S., "Synthetic Apertures for the Optical Domain," Optics & Photonics News Article [webpage], The Optical Society (OSA), Apr. 18, 2017, pp. 2. URL:https://www.osa-opn.org/home/newsroom/2017/april/synthetic_apertures_for_the_optical_domain/.
Wolf, J., et al, "Diagnostic Inaccuracy of Smartphone Applications for Melanoma Detection," JAMA Dermatol. Author Manuscript; available in PMC May 13, 2014. Published in final edited form as: JAMA Dermatol. Apr. 2013; 149(4): 422-426. doi:10.1001/jamadermatol.2013.2382.
Wu, J., et al, "Focal plane tuning in wide-field-of-view microscope with Talbot pattern illumination," Optics Letters, vol. 36, No. 12, Jun. 15, 2011, pp. 2179-2181. doi:145985.
Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. doi:10.1364/OE.15.018141.
Wu, J., et al, "Paired-angle-rotation scanning optical coherence tomography forward-imaging probe," Optics Letters, vol. 31, No. 9, May 1, 2006, pp. 1265-1267. doi:10.1364/OL.31.001265.
Wu, J., et al, "Wide field-of-view microscope based on holographic focus grid illumination," Optics Letters, vol. 35, No. 13, Jul. 1, 2010, pp. 2188-2190. doi:10.1364/OL.35.002188.
Wu, Yichen, et al, "Three-dimensional virtual refocusing of fluorescence microscopy images using deep learning" Nature methods, 2019. 16(12): 1323-1331.
Xu, W., et al, "Digital in-line holography for biological applications," Proceedings of the National Academy of Sciences of the USA (PNAS), vol. 98, No. 20, Sep. 25, 2001, pp. 11301-11305. doi:10.1073/pnas.191361398.
Yaroslavsky, "Image Resampling and Building Continuous Image Models", Chapter 6, Theoretical Foundations of Digital Imaging Using MATLAB , pp. 293-342 (CRC Press, 1 edition, Nov. 26, 2012).
Yeh, L., et al., "Experimental robustness of Fourier ptychography phase retrieval algorithms," Optics Express, 2015, vol. 23(26), pp. 33214-33240.
Yuan, C., et al, "Angular multiplexing in pulsed digital holography for aperture synthesis," Optics Letters, vol. 33, No. 20, Oct. 15, 2008, pp. 2356-2358. doi:10.1364/OL.33.002356.
Yuan, et al., "Image deblurring with blurred/noisy image pairs," ACM Trans. Graph. 26, Jul. 29, 2007, pp. 1-10.
Zeiss, C., "Microscopy: Cells Need The Perfect Climate. System Solutions for Live Cell Imaging under Physiological Conditions," ZEISS Product Brochure, Carl Zeiss Microscopy GmbH Co., Feb. 2008, pp. 42. URL: http://www.zeiss.de/incubation.
Zhang, Y., et al, "Self-learning based Fourier ptychographic microscopy," Optics Express, vol. 23, No. 14, Jul. 13, 2015, pp. 18471-18486. doi: 10.1364/OE.23.018471.
Zhang, Y., et al, "Photoreceptor perturbation around subretinal drusenoid deposits as revealed by adaptive optics scanning laser ophthalmoscopy," HHS Public Access, Am J Ophthalmol. Author Manuscript, Sep. 1, 2015, pp. 22. (Published in final edited form as: Am J Ophthalmol. Sep. 2014; 158(3): 584-96.e1.).
Zheng, G., et al, "0.5 gigapixel microscopy using a flatbed scanner," Biomedical Optics Express, vol. 5, No. 1, Jan. 1, 2014, pp. 1-8. doi: 10.1364/BOE.5.000001.
Zheng, G., et al, "Characterization of spatially varying aberrations for wide field-of-view microscopy," Optics Express, vol. 21, No. 13, Jul. 1, 2013, pp. 15131-15143. doi:10.1364/OE.21.015131.
Zheng, G., et al., "Concept, Implementations and Applications of Fourier Ptychography," Nature Review Physics, 2021, vol. 3, pp. 207-223.
Zheng, G., et al, "Microscopy refocusing and dark-field imaging by using a simple LED array," Optics Letters, vol. 36, No. 20, Oct. 15, 2011, pp. 3987-3989. doi: 10.1364/OL.36.003987.
Zheng, G., et al, "Sub-pixel resolving optofluidic microscope for on-chip cell imaging," Lab Chip, vol. 10, Sep. 29, 2010, pp. 3125-3129. doi:10.1039/c0Lc00213e [retrieved on Oct. 4, 2010] URL: http://pubs.rsc.org.
Zheng, G., et al., "Wide-field, high-resolution Fourier ptychographic microscopy," Nature photonics, 2013, vol. 7(9), pp. 739-745.
Zheng, G., "Fourier Ptychographic Imaging: A MATLAB tutorial," IOP Concise Physics, Morgan & Claypool Publication, San Rafael, CA., May 2016, pp. 96. ISBN: 978-1-6817-4272-4 (ebook) doi: 10.1088/978-1-6817-4273-1.
Zheng, G. "The ePetri dish, an on-chip cell imaging platform based on subpixel perspective sweeping microscopy (SPSM)," PNAS Early Edition, Published online before print Oct. 3, 2011, pp. 6. doi:10.1073/pnas.1110681108.
Zhou, et al., "What are Good Apertures for Defocus Deblurring," in 2009 IEEE International Conference on Computational Photography (IEEE, Apr. 16-17, 2009), pp. 1-8.
Zhou, K., et al., "Diffraction Tomography With a Deep Image Prior," Optics express, 2020, vol. 28(9), pp. 12872-12896.

(56) References Cited

OTHER PUBLICATIONS

International Search Report and Written Opinion dated Aug. 12, 2025, issued in PCT/US2025/027351.

* cited by examiner

ANGULAR PTYCHOGRAPHIC IMAGING WITH CLOSED-FORM RECONSTRUCTION

CROSS-REFERENCES TO RELATED APPLICATIONS

This application claims benefit of and priority to U.S. Provisional Patent Application No. 63/455,878, titled "High-Resolution, Large Field-Of-View Label-Free Imaging Via Aberration-Corrected, Closed-Form Complex Field Reconstruction," and filed on Mar. 30, 2023 and to U.S. Provisional Patent Application No. 63/536,265, titled "High-Resolution, Large Field-Of-View Label-Free Imaging Via Aberration-Corrected, Closed-Form Complex Field Reconstruction," and filed on Sep. 1, 2023, which are incorporated by reference herein in their entireties and for all purposes.

FIELD

Certain aspects generally pertain to computational imaging and, more specifically, to ptychographic imaging.

BACKGROUND

Computational imaging empowers modern microscopy with the ability to produce high-resolution, large field-of-view, aberration-free images that improve digital pathology and broadly apply to other high throughput imaging fields. One dominant computational label-free imaging method, Fourier ptychographic microscopy (FPM), effectively increases the spatial-bandwidth product of conventional microscopy using multiple tilted illuminations to achieve high-throughput imaging. However, its iterative reconstruction is subject to convergence criteria. Kramers-Kronig methods have shown the potential to analytically reconstruct a complex field from intensity measurements but these methods do not address aberrations.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

Certain embodiments pertain to an imaging method comprising (a) reconstructing a plurality of complex field spectrums from a respective plurality of NA-matching intensity measurements, (b) combining the complex field spectrums to determine a reconstructed sample spectrum, and (c) using a plurality of darkfield intensity measurements to extend the reconstructed sample spectrum to obtain an image with higher resolution than the NA-matching intensity measurements. In some embodiments, the imaging method further comprises (i) extracting a system aberration from the plurality of complex field spectrums and (ii) removing the system aberration from each of the complex field spectrums prior to (b).

Certain embodiments pertain to a computer program product comprising a non-transitory computer readable medium having computer-executable instructions for performing (a) reconstructing a plurality of complex field spectrums from a respective plurality of NA-matching intensity measurements, (b) combining the complex field spectrums to determine a reconstructed sample spectrum, and (c) using a plurality of darkfield intensity measurements to extend the reconstructed sample spectrum to obtain an image with higher resolution than the NA-matching intensity measurements. In some embodiments, the computer program product comprises additional computer-executable instructions for (i) extracting a system aberration from the plurality of complex field spectrums and (ii) removing the system aberration from each of the complex field spectrums prior to (b).

Certain embodiments pertain an imaging system comprising an optical system having collection optics, an illumination device configured to provide illumination at a plurality of NA-matching illumination angles at a first sequence of sample times and provide illumination at a plurality of darkfield illumination angles at a second sequence of sample times, at least one radiation detector configured to receive light from the optical system and acquire a plurality of NA-matching intensity measurements and a plurality of darkfield intensity measurements, and a computing device. The computing device is configured to: (a) reconstruct a plurality of complex field spectrums from the plurality of NA-matching intensity measurements, (b) combine the complex field spectrums to determine a reconstructed sample spectrum, and (c) use the plurality of darkfield intensity measurements to extend the reconstructed sample spectrum to obtain an image with higher resolution than the NA-matching intensity measurements. In some embodiments, the computing device is further configured to (i) extract a system aberration from the plurality of complex field spectrums and (ii) remove the system aberration from each of the complex field spectrums prior to (b).

These and other features and embodiments will be described in more detail with reference to the drawings.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

Figure 1A:
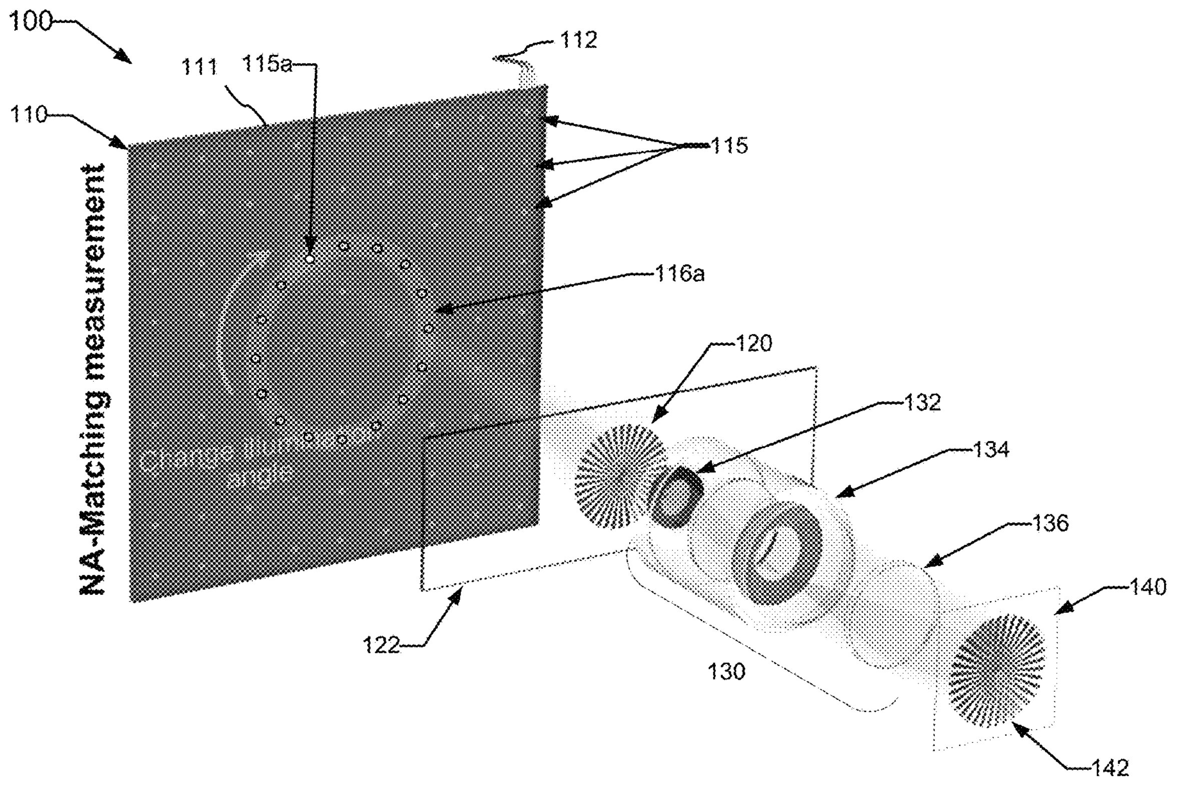
FIG. 1A depicts a schematic diagram of an angular ptychographic imaging with closed-form (APIC) system during acquisition of an NA-matching intensity measurement, according to embodiments.

The figures and components therein may not be drawn to scale.

DETAILED DESCRIPTION

Different aspects are described below with reference to the accompanying drawings. In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments. While the disclosed embodiments will be described in conjunction with the specific embodiments, it will be understood that it is not intended to limit the disclosed embodiments.

I. Introduction

Over the past few decades, remarkable progress has been made in both fluorescence and label-free imaging. One such representative label-free technique, Fourier ptychographic microscopy (FPM), leverages the power of computation to provide high-resolution and aberration correction abilities to low numerical aperture objectives. Conventional FPM operates by collecting a series of low-resolution images under tilted illumination and applies an iterative phase retrieval algorithm to reconstruct sample's high spatial-frequency features and optical aberration, resulting in high-resolution aberration-free imaging that preserves the inherently large FOV associated with the low numerical aperture (NA) objectives. However, its iterative algorithm can pose challenges. First, its iterative reconstruction is typically a non-convex optimization, which means it is not guaranteed to converge. As a result, FPM does not guarantee that the global optimal solution is ever reached. This may be problematic for exacting applications, such as digital pathology, where even small errors in the image are not tolerable. Furthermore, the joint optimization of aberration and sample spectrum of conventional FPM can sometimes fail when the system's aberrations are sufficiently severe, which may lead to poor reconstructions.

Spatial-domain Kramers-Kronig relations have shown that a complex field can be non-iteratively reconstructed in one specific varied illumination microscopy scenario by matching the illumination angle to the objective's maximal acceptance angle and exploiting the signal analyticity. However, this approach does not possess the ability to correct for hybrid aberrations or provide resolution enhancement beyond the diffraction limit of the objective NA.

Certain embodiments pertain to angular ptychographic imaging with closed-form (APIC) techniques that can recover complex fields, retrieve aberrations, and/or reconstruct the darkfield associated high spatial frequency spectrum to expand the sample spectrum in a purely analytical way. By avoiding iterative algorithms, APIC techniques are advantageous in that they do not require convergence metrics and have been demonstrated to consistently obtain a closed-form solution. This may enable faster computational time over existing techniques that use iterative algorithms. APIC techniques have also demonstrated robustness against aberrations, including complex aberrations, where existing iterative techniques have failed. Using NA-matching and darkfield measurements, APIC techniques can be used to reconstruct high-resolution aberration-free complex fields when a low magnification, large FOV objective is used for data acquisition. Due to its analytical nature. APIC techniques are inherently insensitive to optimization parameters such as convergence metrics and consistently provide an analytical closed-form solution.

As used herein, an "NA-matching measurement" (also sometimes referred to as a "NA-matching intensity measurement") refers to an intensity measurement (also sometimes referred to herein as "intensity image" or "raw image,") acquired while incident illumination is at an NA-matching illumination angle. As used herein, an "NA-matching illumination angle" refers to an illumination angle that is equal to, or nearly equal to (e.g., within 1 degree, within 2 degrees, or within 3 degrees), the maximum acceptance angle of the collection optics (e.g., objective) of the imaging system acquiring the image. In various embodiments, a plurality of NA-matching intensity measurements is acquired at a sequence of exposure times during which incident illumination sequentially shifts to each one of the NA-matching angles. In these examples, each NA-matching intensity measurement is acquired while incident illumination is at one of the NA-matching illumination angles. In alternate embodiments, multiplexing illumination may be employed where incident illumination is cycled through a sequence of illumination patterns. Each illumination pattern includes simultaneous incident illumination from multiple NA-matching illumination angles. In these multiplexing embodiments, each NA-matching intensity measurement is acquired during an exposure time during which incident illumination is at one of the illumination patterns.

As used herein, a "darkfield measurement" (also sometimes referred to as a "darkfield intensity measurement") refers to an intensity measurement acquired while incident illumination is at a darkfield illumination angle. As used herein, a "darkfield illumination angle" refers to an illumination angle that is greater than the maximum acceptance angle of the collection optics. Each darkfield measurement is acquired during an exposure time while the specimen is illuminated at one of the darkfield illumination angles in the sequence. In one example, the darkfield illumination angles may be in a range of 1 degree to 5 degrees greater than the maximum acceptance angle. In another example, the darkfield illumination angles may be in a range of 3 degrees to 5 degrees greater than the maximum acceptance angle. In another example, the darkfield illumination angles may be in a range of 1 degree to 5 degrees greater than the maximum acceptance angle. In another example, the darkfield illumination angles may be more than 1 degree greater than the maximum acceptance angle.

As used herein, an "NA-matching illumination source" refers to an illumination source that is configured to provide incident illumination that is equal to, or nearly equal to (e.g., within 1 degree, within 2 degrees, or within 3 degrees), the maximum acceptance angle of the collection optics (e.g., objective) of the imaging system acquiring the image.

As used herein, a "darkfield illumination source" refers to an illumination source that is configured to provide incident illumination that is greater than the maximum acceptance angle of the collection optics of the imaging system acquiring the image.

As used herein, a "spectrum" (also sometimes referred to as a "complex field spectrum") generally refers to a spatial frequency spectrum, which is the Fourier transform of the sample's complex field. The spectrum is different from the Fourier transform of an acquired intensity image, which is the Fourier transform of a purely intensity measurement.

As used herein, a "known sample spectrum," refers to a prior reconstructed spectrum. The reconstructed spectrum expands as more images are used in the reconstruction and this known sample spectrum also grows during this process. Thus, the known sample spectrum at step i can be a subset of the known spectrum at step i+1.

II. Angular Ptychographic Imaging with Closed-Form (APIC) Imaging Systems and Methods

A. Example APIC Imaging System

Figure 1B:
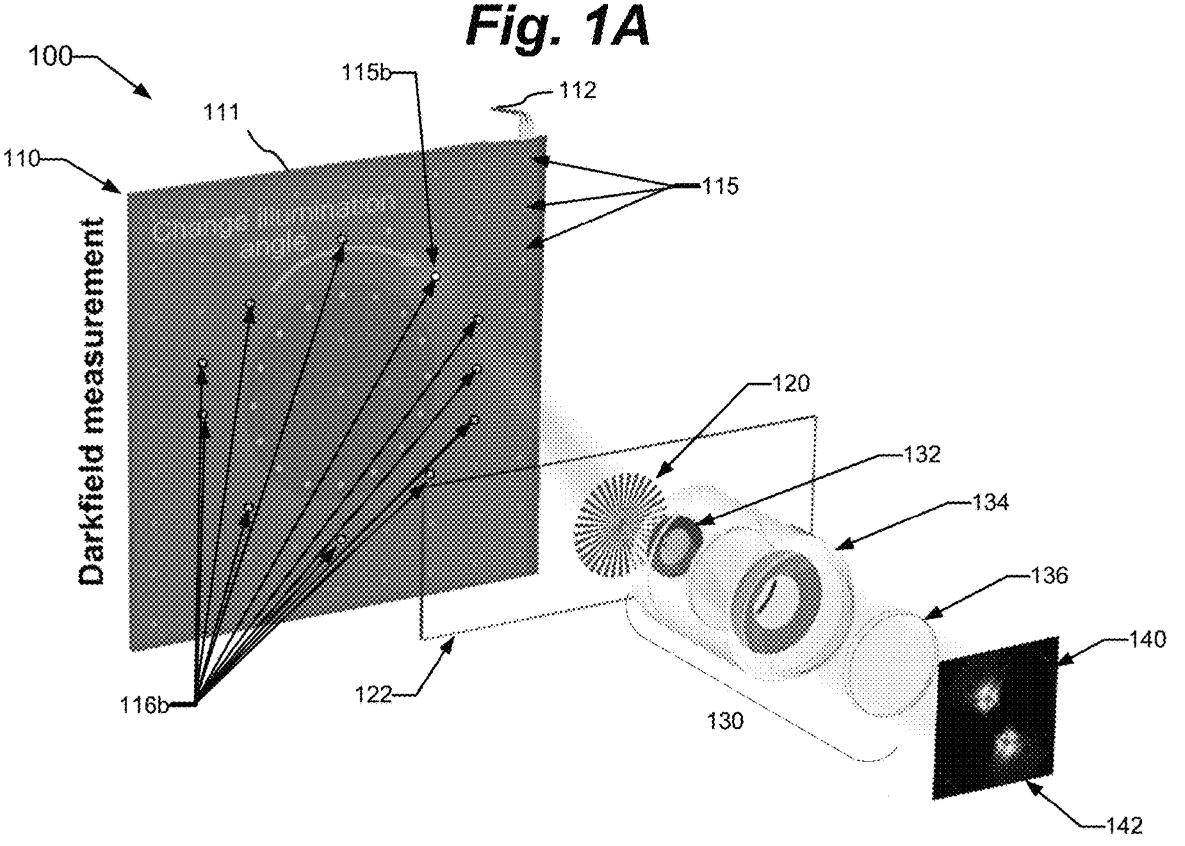
FIG. 1B depicts a schematic diagram of the APIC system of FIG. 1A during acquisition of a darkfield intensity measurement.

FIG. 1A depicts a schematic diagram of an APIC system 100 during acquisition of an NA-matching intensity measurement, according to embodiments. FIG. 1B depicts a schematic diagram of APIC system 100 of FIG. 1A during acquisition of a darkfield intensity measurement. At the instant in time depicted in the illustrated example, a specimen 120 being imaged is located on a transparent receptacle 122 (e.g., transparent slide). FIG. 1A depicts APIC system 100 at an instant in time during data acquisition of one of a plurality of NA-matching intensity measurements. FIG. 1B depicts APIC system 100 at an instant in time during data acquisition of one of a plurality of darkfield intensity measurements.

APIC system 100 includes an illumination device 110, an optical system 130, and a radiation detector 170. Optical system 130 includes an aperture 132, an objective 134 in optical communication with the aperture 132, and a lens 136 in optical communication with the objective 134, and a radiation detector 140 configured to acquire intensity images based on light passing from lens 136. In one implementation, the objective is a low magnification objective such as, e.g., a 10× magnification, NA 0.25 objective (e.g., 10× magnification, NA 0.25 objective sold by Olympus).

Illumination device 110 includes a rectangular light emitting diode (LED) array 111 having 81 illumination sources (e.g., LEDs) 115 and a ring of NA-matching illumination sources **116*a* (e.g., Neopixel ring 16 made by Adafruit) disposed on the LED array 111. The ring of 16 NA-matching illumination sources 116*a* has a diameter (defined along a circle at the centerline of the illumination sources) that is configured to be able to change illumination angle through a plurality of NA-matching illumination angles as different illumination sources 115 along the circumference of the circle are illuminated in sequence in the clockwise direction as depicted by an arrow. The NA-matching illumination angles are equal to, or nearly equal to, the acceptance angle of objective 134. Additional or fewer illumination sources may be included in the LED array 111 or the ring 116*a*** in other implementations. Also, in another implementation, the illumination sources may be illuminated in a different order.

In FIG. 1A, the ring of NA-matching illumination sources 116*a* includes an illumination source 115*a* that is illuminated at the instant in time depicted in the illustrated example. The illumination device 110 also includes an electrical connector 112 that can electrically connect to, e.g., a computing device (e.g., computing device 780 in FIG. 7 or computing device 1280 in FIG. 12) to receive trigger signals to activate different illumination sources at different exposure times. The ring of NA-matching illumination sources 116*a* includes illumination sources (e.g., LEDs) that when activated have illumination that matches up with the maximum acceptance angle of the objective 134 and that may be lit (activated) sequentially while the radiation detector 140 obtains a plurality of NA-matching measurements.

As depicted in FIG. 1B, illumination device 110 also includes a plurality of darkfield illumination sources 116*b*. The darkfield illumination sources 116*b* are configured for darkfield illumination where the illumination angles are larger than the maximum acceptance angle of objective 134. The illumination sources 116*b* are arranged to be able to change the illumination angle through a plurality of darkfield illumination angles as different darkfield illumination sources in the plurality of darkfield illumination sources 116*b* are illuminated in sequence in the clockwise direction as depicted by an arrow. The plurality of darkfield illumination sources 116*b* includes an illumination source 115*b* that is illuminated at the instant in time depicted in the illustrated example during which radiation detector 140 may take a darkfield measurement.

In FIGS. 1A and 1B, APIC system 100 has components arranged in a transmission mode where light transmitted through specimen 120 is received at the optical system 130. In another implementation, APIC system 100 may have components arranged in reflection mode where light reflected from specimen 120 is received at optical system 130, which may be advantageous for use in imaging thick specimens. For example, illumination source 110 may be located on the opposite side of transparent receptacle 122.

Figure 7:
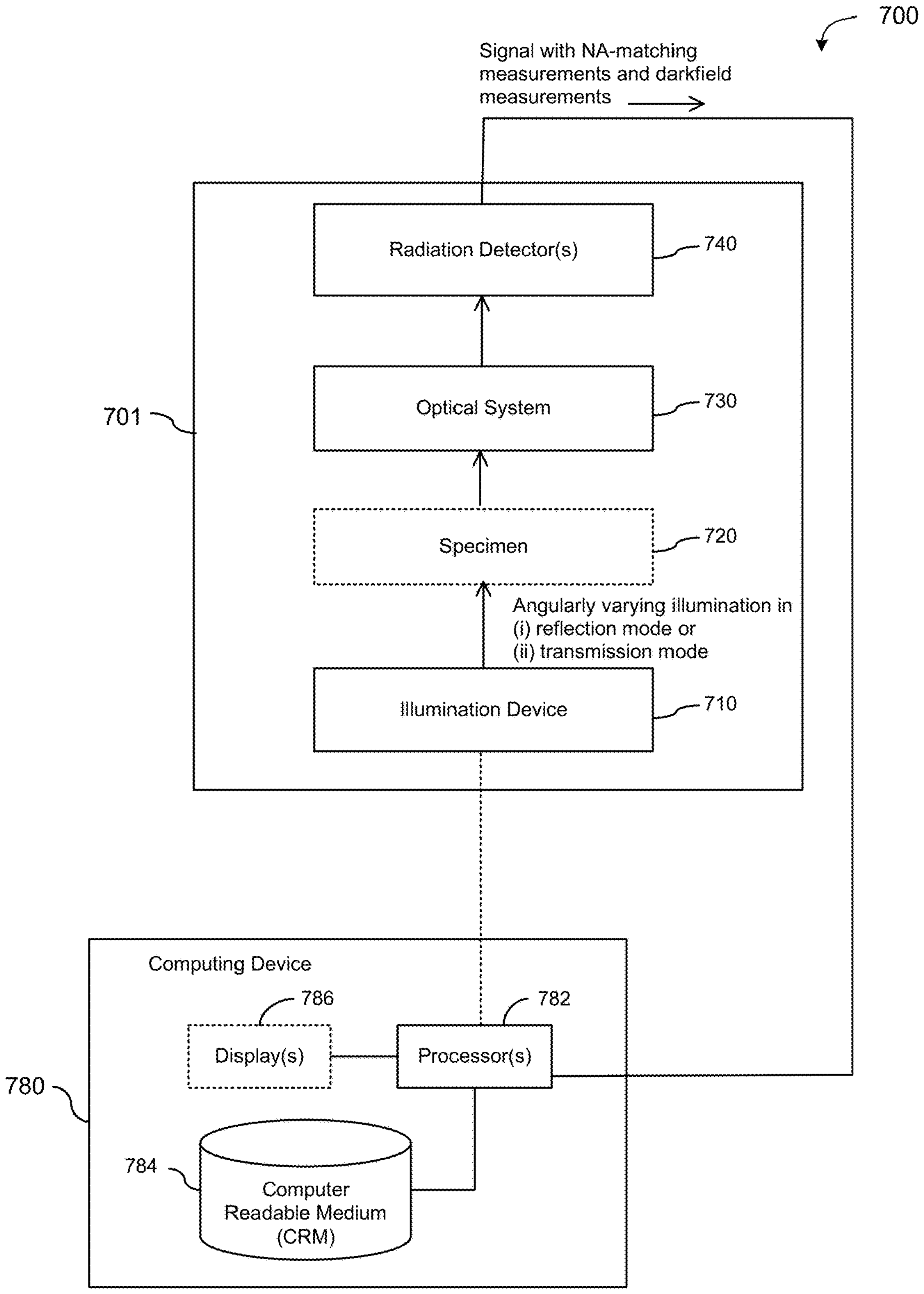
FIG. 7 depicts a block diagram of an APIC system, according to various embodiments.
Figure 12:
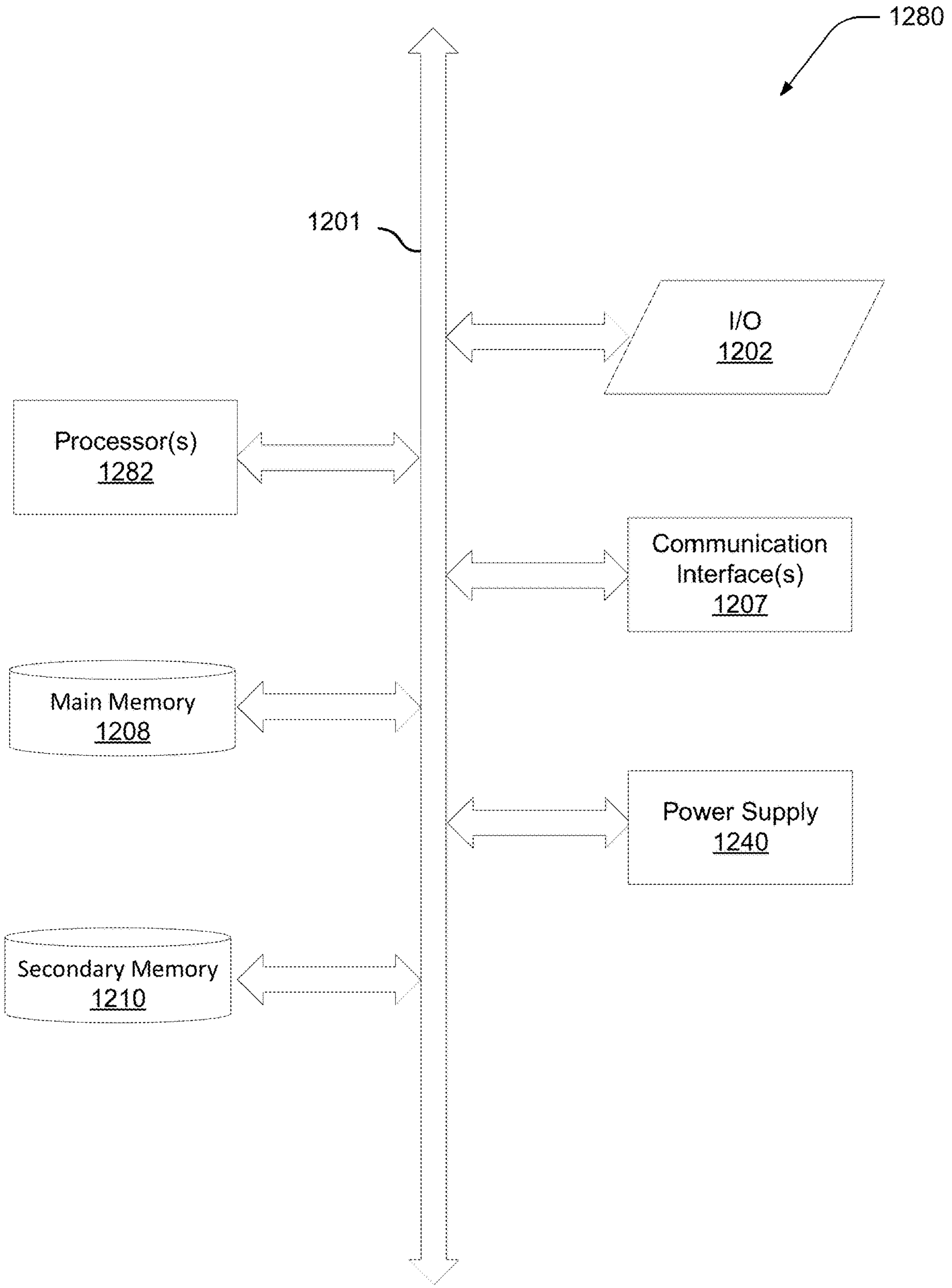
FIG. 12 depicts block diagram of a computing device of an APIC system, according to various embodiments.

Although not shown, APIC system 100 may also include a computing device (e.g., computing device 780 in FIG. 7 or computing device 1280 in FIG. 12). The computing device may be in communication with radiation detector 140 and/or the illumination device 110. The computing device may send control signals to the radiation detector 140 to trigger acquisition of intensity measurements and/or send control signals to illumination device 110 to activate different illumination sources to change illumination angle. In one implementation, the control signals synchronize image acquisition with activation of different illumination sources. The computing device may also receive signals with intensity measurement data from radiation detector 140 and/or perform other functions of the APIC system such as reconstruction process.

In one implementation, APIC system 100 may also include at least one motorized stage upon which the illumination device 110 is mounted. The at least one motorized stage may be configured to adjust the position of the illumination device 110.

B. Reconstruction Process

In certain embodiments, an APIC imaging method includes a reconstruction process that analytically solves for a sample's spatial frequency spectrum and system aberration with NA-matching intensity measurements. In addition or in alternate embodiments, the reconstruction process may use one or more darkfield intensity measurements to extend the sample's spatial frequency spectrum, which may advantageously enhance resolution of a NA-limited imaging system.

Figure 2:
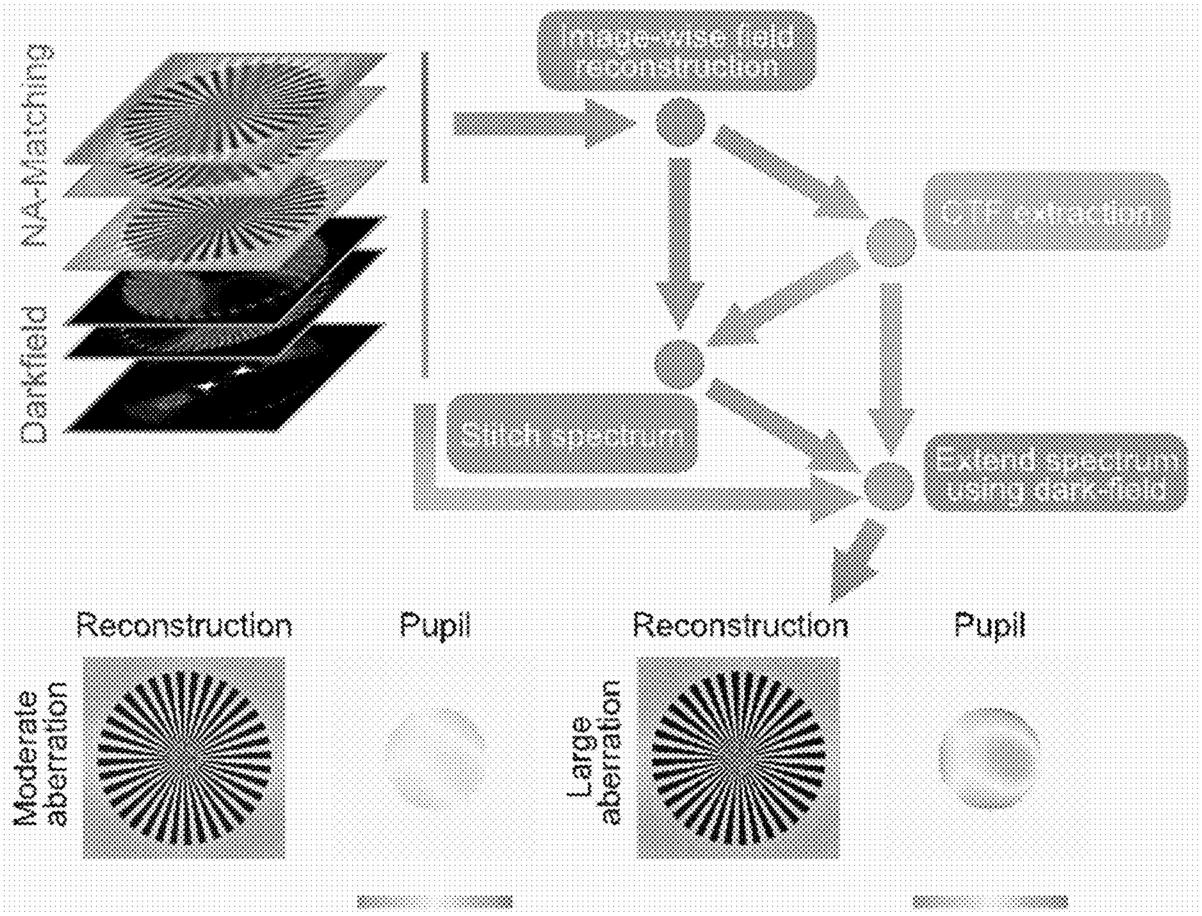
FIG. 2 depicts example operations of a reconstruction process of an APIC imaging method, according to embodiments.

FIG. 2 depicts example operations of a reconstruction process of an APIC imaging method, according to embodiments. In FIG. 2, the reconstruction process of the APIC imaging method includes obtaining a plurality of darkfield intensity images and a plurality of NA-matching intensity images. Image-wise field reconstruction is performed to reconstruct complex spectrums from the NA-matching intensity images. The system aberration is extracted from the reconstructed complex spectrums and the extracted aberration is used to correct the aberration in the reconstructed complex spectrums of the image-wise field reconstruction. The aberration-corrected spectrums are then stitched together to form a known sample spectrum that serves as a prior knowledge in the spectrum extension. Using darkfield measurements the sample spectrum is extended in a closed form solution to obtain a higher-resolution, aberration-free reconstruction.

The reconstruction process of the FPM imaging method includes iteratively updating the sample spectrum and the aberration to minimize the differences in the measurements and the reconstruction output. This iterative process is terminated upon convergence to obtain the sample spectrum and the coherent transfer function (CTF) estimate. The illustrated pupil the reconstructed aberrations. FPM reconstruction treat darkfield and brightfield indifferently. All the data are given to the FPM algorithm for optimization. APIC reconstruction, on the contrary, handles the NA-matching measurements and darkfield measurements in different ways.

Figure 3:
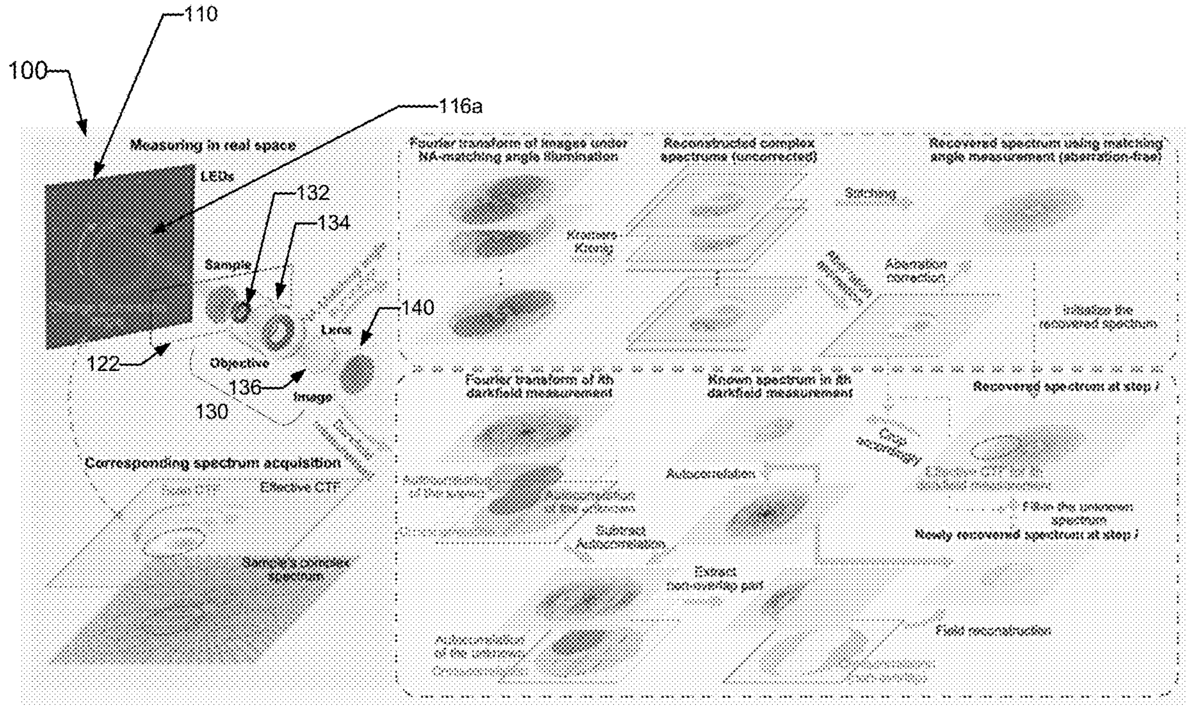
FIG. 3 depicts a schematic diagram depicting example operations of an APIC imaging method, according to various embodiments.

FIG. 3 is a schematic diagram depicting example operations of an APIC imaging method, according to various embodiments. The system 100 shown in FIG. 3 is analogous to elements shown in FIG. 1. For the sake of brevity, the prior discussion of such elements with regard to FIG. 3 may be assumed to be equally applicable, unless indicated otherwise in the following discussion. During image acquisition, the illuminating (illumination) angle is changed. By changing the illuminating angle, the coherent transfer function (CTF) is effectively shifted to different positions in the spatial frequency domain, and the radiation detector samples different regions of sample's spectrum. During acquisition of a plurality of NA-matching intensity measurements, the illuminating angle is changed to a plurality of NA-matching illumination angles. During acquisition of a plurality of darkfield intensity measurements, the illuminating angle is changed to a plurality of darkfield illumination angles. The APIC imaging method recovers the complex field spectrums for the intensity measurements under NA-matching angle illumination (NA-matching intensity measurements). The APIC imaging method recovers the corresponding spectrums from the NA-matching intensity measurements using, e.g., Kramers-Kronig relations. The APIC imaging method extracts the imaging system's aberration using the phase differences of pairs of spectrums with overlaps in their sampled spectrum. The APIC imaging method corrects reconstructed spectrums for aberration and stiches the corrected reconstructed spectrums together to form a priori knowledge for the reconstruction process involving using darkfield measurements to extend the known sample spectrum. The APIC method extends the sample spectrum using darkfield measurements, by using the known spectrum of a selected darkfield measurement to isolate a portion of a cross-correlation term from the other auto-correlation terms. The APIC method solves a linear equation involving the isolated cross-correlation term to determine a correlation operator. The APIC method analytically obtains an unknown spectrum using the correlation operator. The APIC method extends the original reconstructed sample spectrum by adding the unknown spectrum.

C. Example APIC Reconstruction Process

Figure 9:
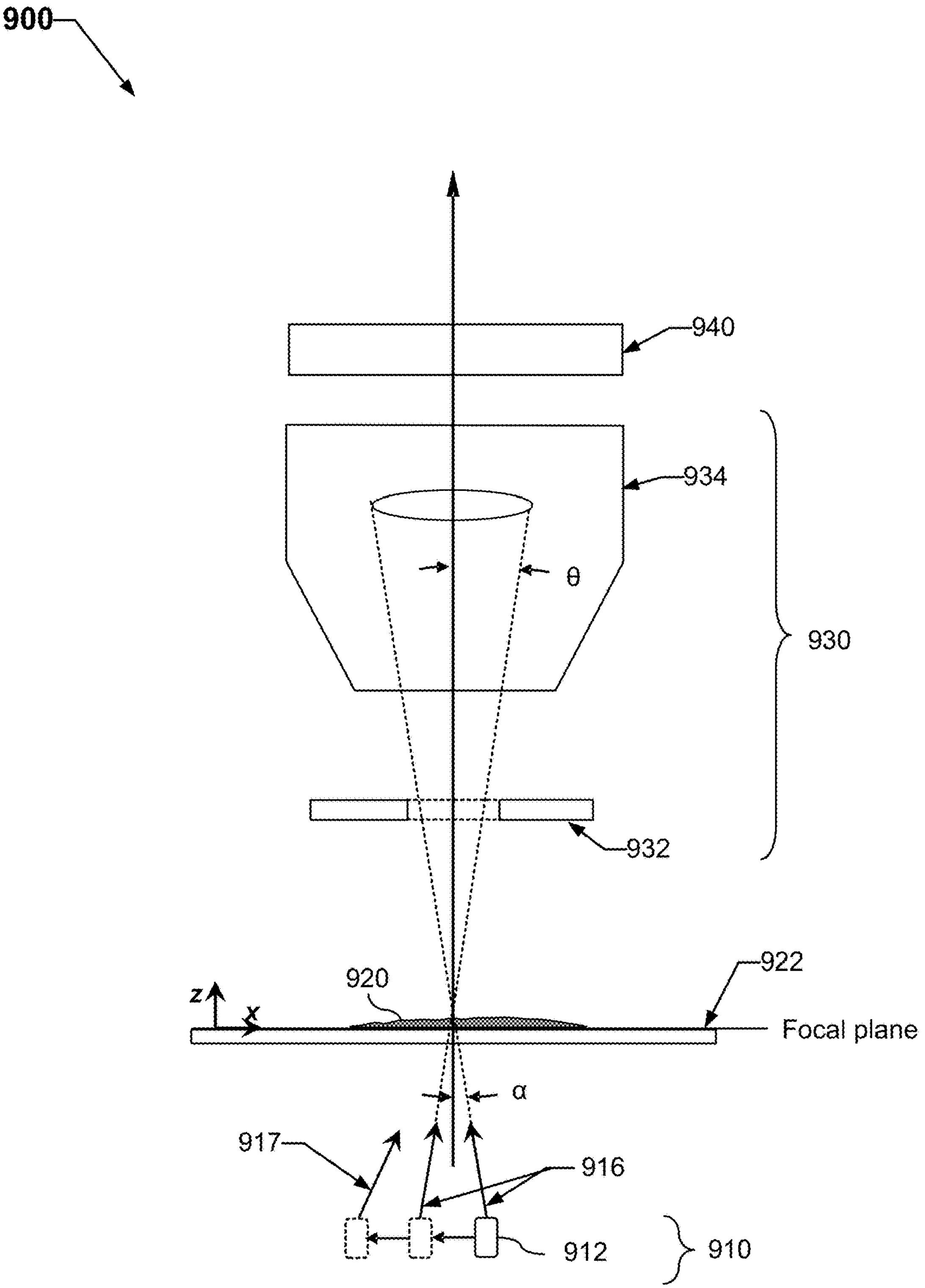
FIG. 9 depicts a side view of an APIC system, according to an embodiment.
Figure 10:
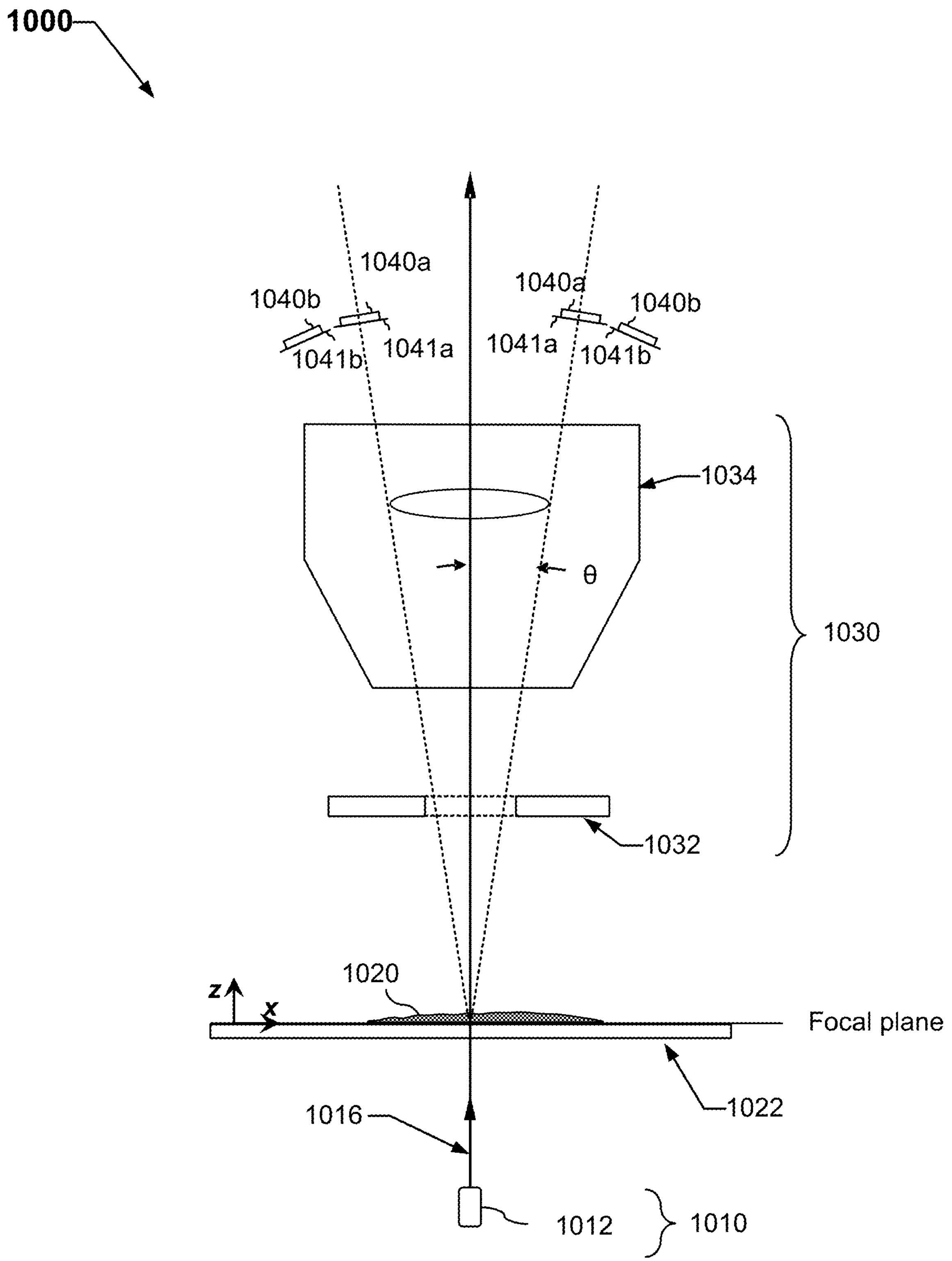
FIG. 10 depicts a side view of an APIC system with multiple detectors, according to an embodiment.
Figure 11:
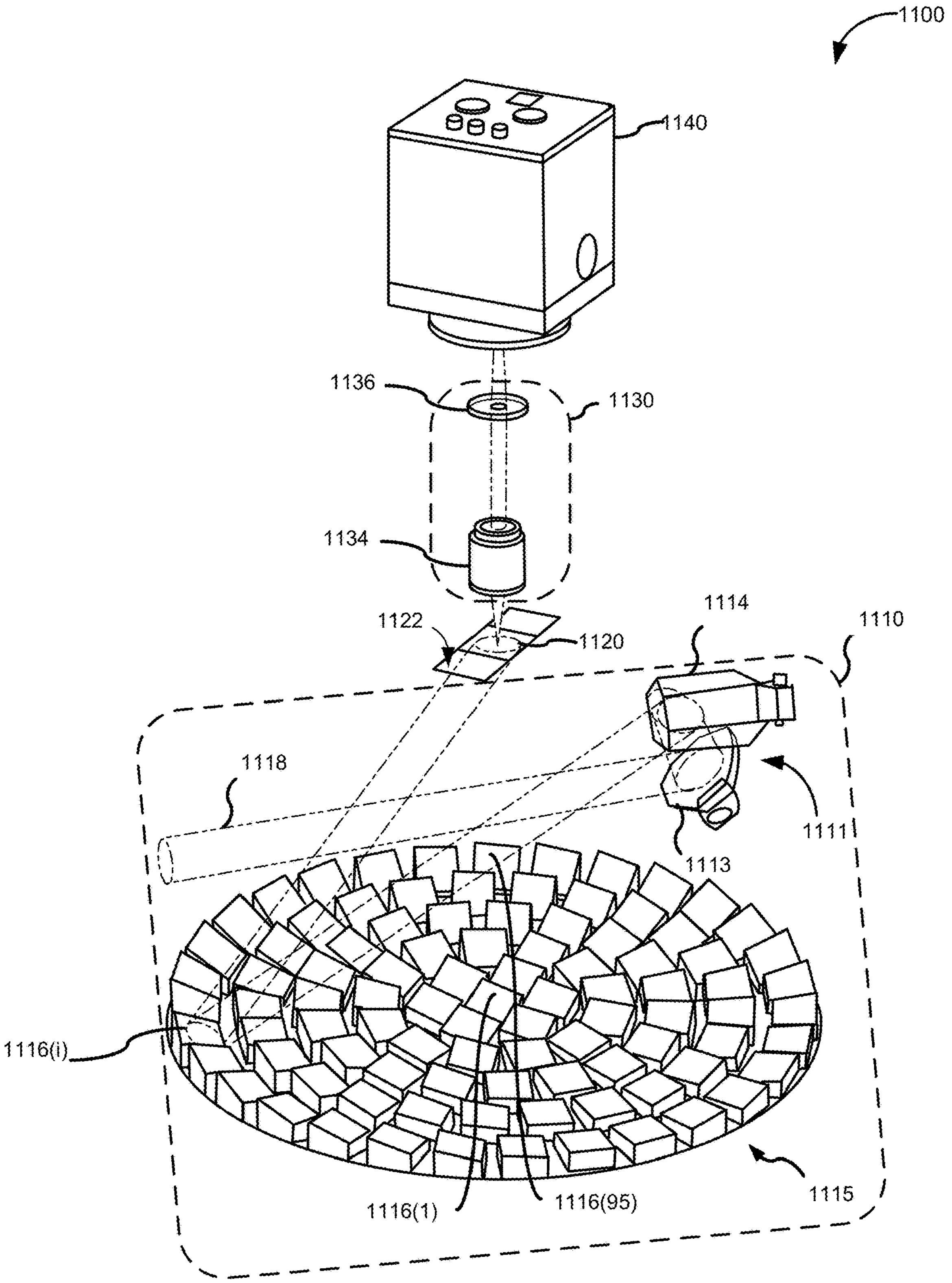
FIG. 11 depicts side view of an APIC system with laser illumination, according to an embodiment.

In certain embodiments, an APIC imaging method includes reconstructing the complex field spectrums corresponding to a plurality of NA-matching measurements acquired by an APIC system (e.g., APIC system 100 in FIGS. 1A and 1B, APIC system 700 in FIG. 7, APIC system 900 in FIG. 9, APIC system 1000 in FIG. 10, and APIC system 1100 in FIG. 11). A complex field spectrum may be reconstructed for each NA-matching measurement in an image-wise field reconstruction. In some implementations, Kramers-Kronig relations may be employed to reconstruct the complex field spectrums from the NA-matching measurements. An example of Kramers-Kronig relations can be found in Baek, Y. & Park, Y., "Intensity-based holographic imaging via space-domain Kramers-Kronig relations," *Nat. Photonics* 15, 354-360 (2021), which is hereby incorporated by reference for the Kramers-Kronig relations. The NA-matching measurements may be taken at exposure times when illumination angles match the maximum acceptance angle of the collection optics (e.g., objective) of the optical system of the APIC imaging system.

The APIC imaging method may use various numbers of NA-matching measurements to reconstruct the complex field spectrums. In some embodiments, an APIC imaging method uses at least 6 NA-matching measurements. In some embodiments, an APIC imaging method uses at least 8 NA-matching measurements. In some embodiments, an APIC imaging method uses between 6 NA-matching measurements and 8 NA-matching measurements. In some embodiments, an APIC imaging method uses at least 7 NA-matching measurements. In some embodiments, an APIC imaging method uses at least 9 NA-matching measurements. In some embodiments, an APIC imaging method uses more than 10 NA-matching measurements.

Figure 17:
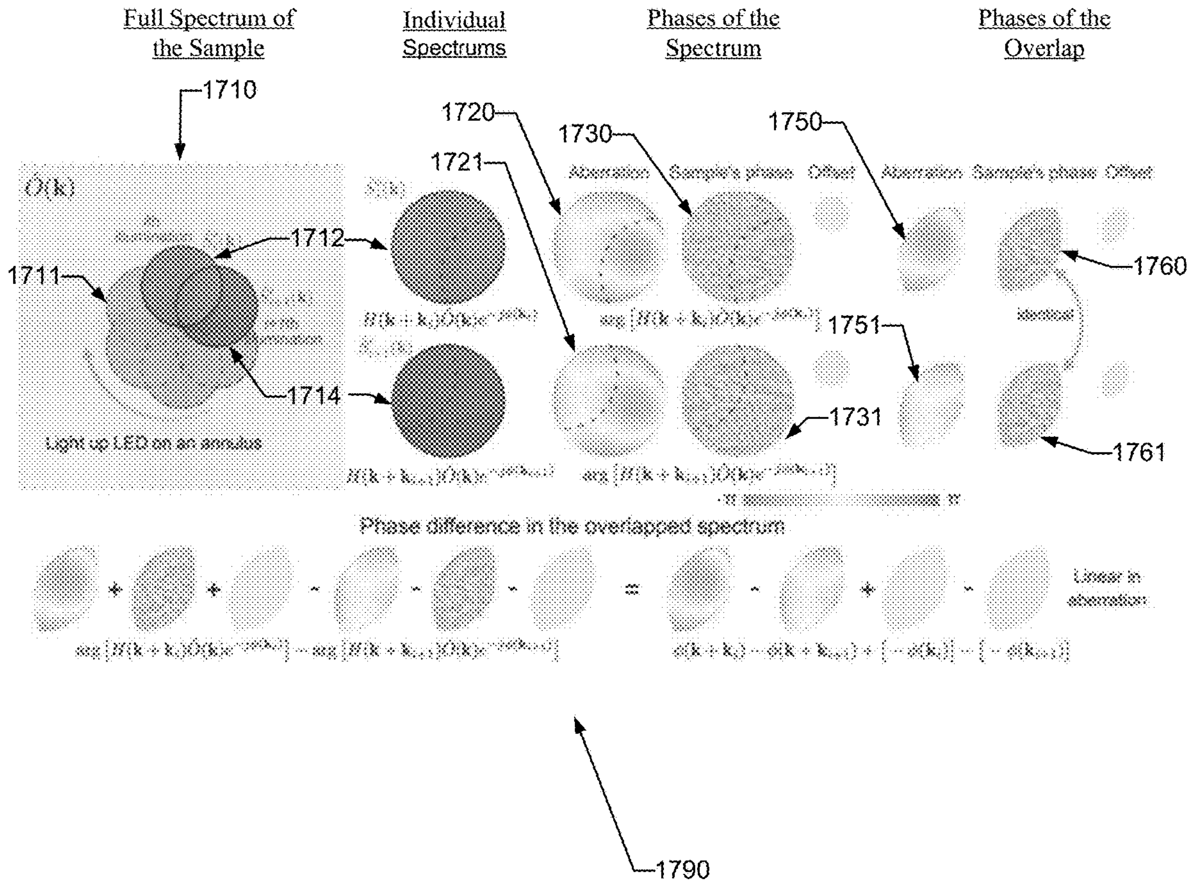
FIG. 17 is a diagram depicting an original spectrum of a sample a phase difference between two individual spectrums with overlap, according to an implementation.

For realistic imaging systems, aberrations may be superimposed on the sample spectrum's phase. As discussed in some detail in Section V (C), the overlapping region in sample dependent phases are identical in the overlapped region of two spectrums, and subtracting their phases cancels out the sample dependent phase term, leaving only the phase differences between different parts of the pupil function (the aberrations). Referring to FIG. 17, for example, illustration 1761 depicts the sample's phase of second constructed spectrum 1714 at the overlap between the first constructed spectrum 1712 and second constructed spectrum 1714. As shown, in the overlapping region between individual spectrums 1712 and 1714, the phase of the sample cancels out and the phase difference of the shifted CTF solely contributes to the measured phase difference. Consequently, the phase differences in the overlapping regions provides a linear relationship with respect to the aberration term. By solving the linear equation, the aberration of the imaging system can be extracted, which can in turn be used to correct the reconstructed complex field spectrums. The corrected spectrums can then be stitched together to obtain an aberration-free, resolution enhanced sample image.

Figure 4:
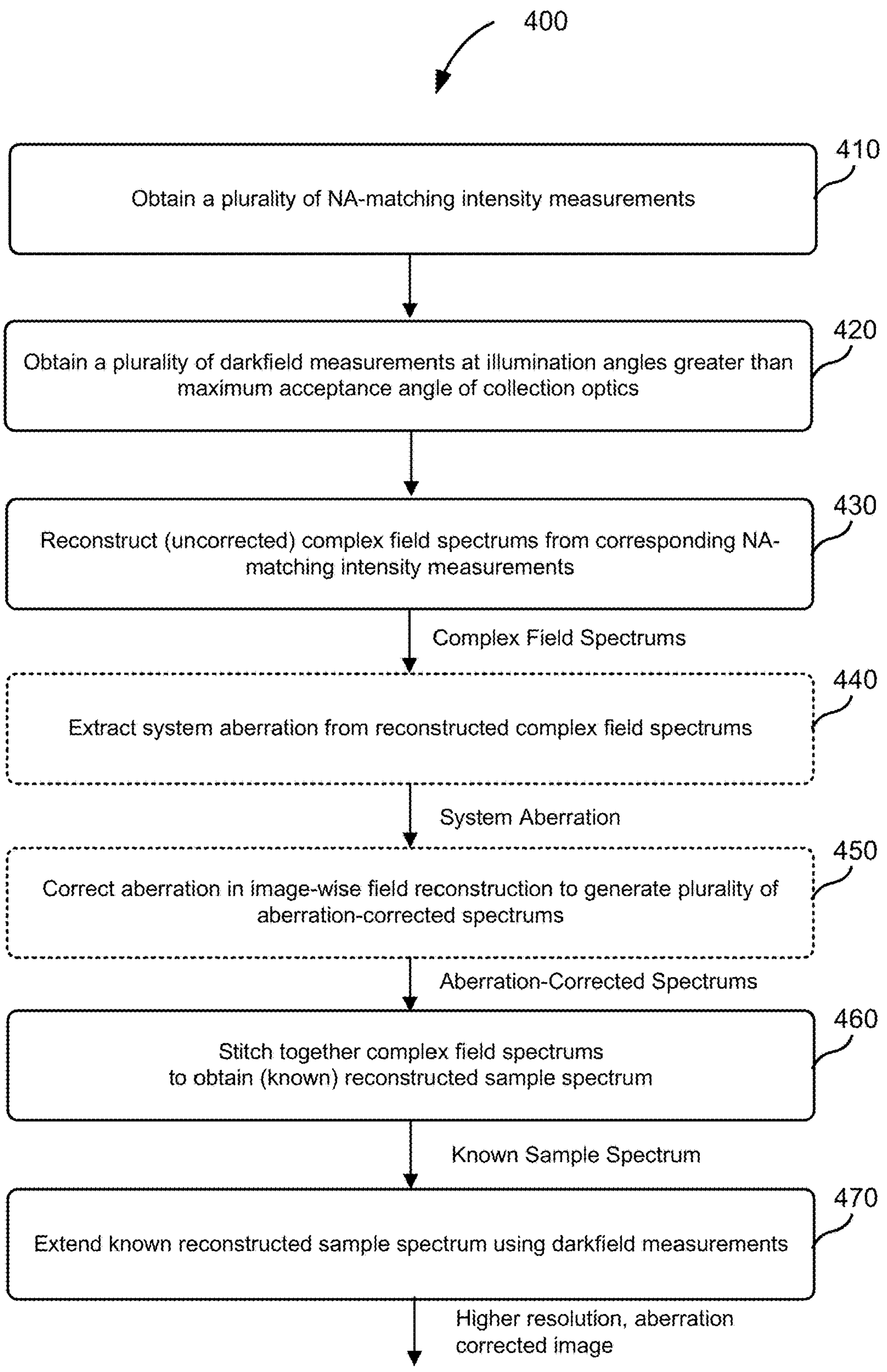
FIG. 4 depicts a flow diagram depicting an APIC imaging method 400, according to various embodiments.

In one implementation, an APIC imaging method includes extracting an aberration such as an aberration introduced by an objective (e.g., objective 134). In this example, the APIC imaging method determines a phase difference in each overlapping portion of the reconstructed complex field spectrums and uses the phase differences to extract the aberration. The APIC imaging method uses the extracted aberration to correct the reconstructed complex field spectrums and stitches (sums) the corrected spectrums together to obtain a reconstructed sample spectrum (also sometimes referred to herein as a "known sample spectrum"). FIG. 4 shows an example of suboperations that may be used to extract a system aberration. Once the aberration-free sample spectrum is reconstructed, an aberration-free sample image can be obtained (e.g., via reverse Fourier transform).

Figure 6:
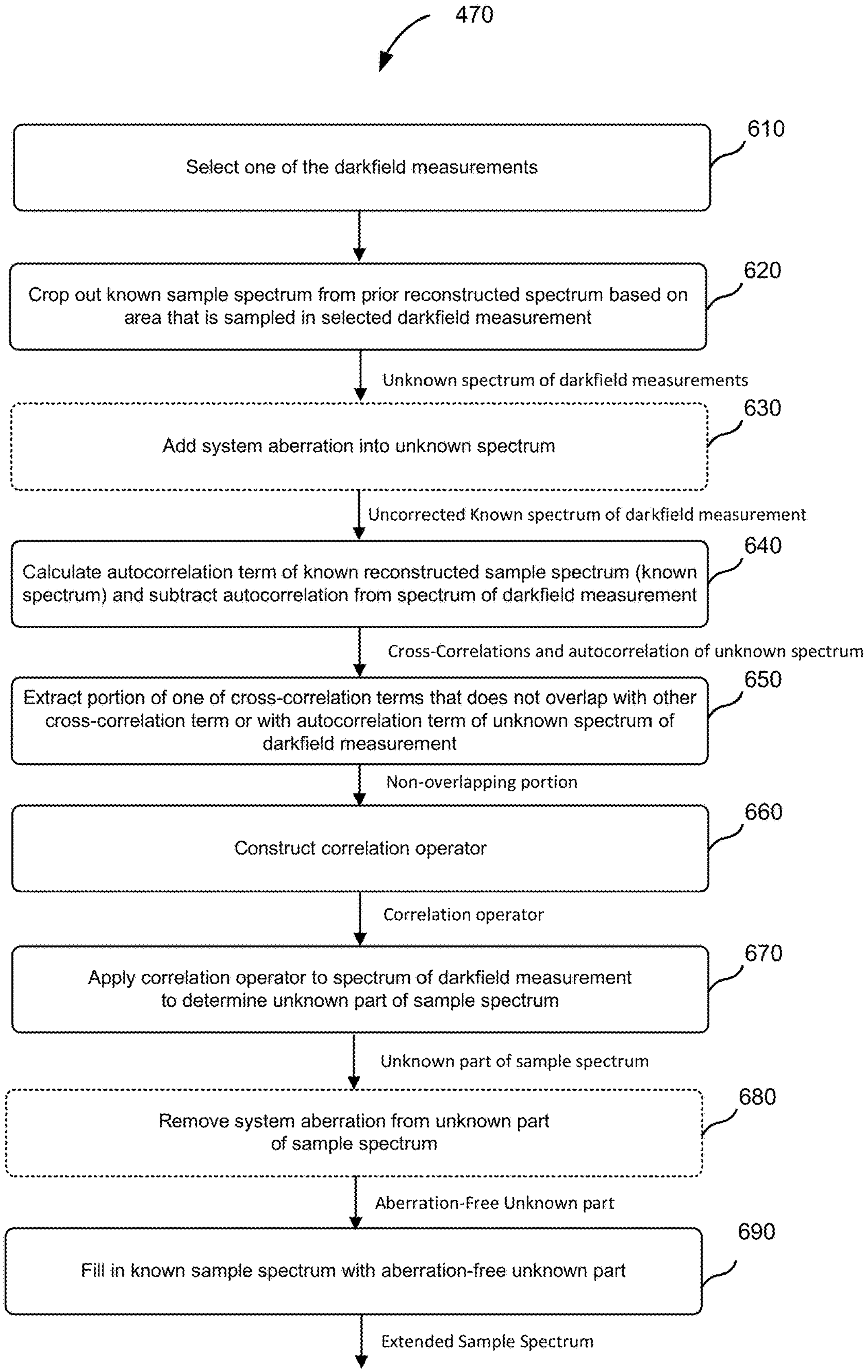
FIG. 6 depicts a flow diagram depicting examples of suboperations of an operation of FIG. 4.
Figure 18:
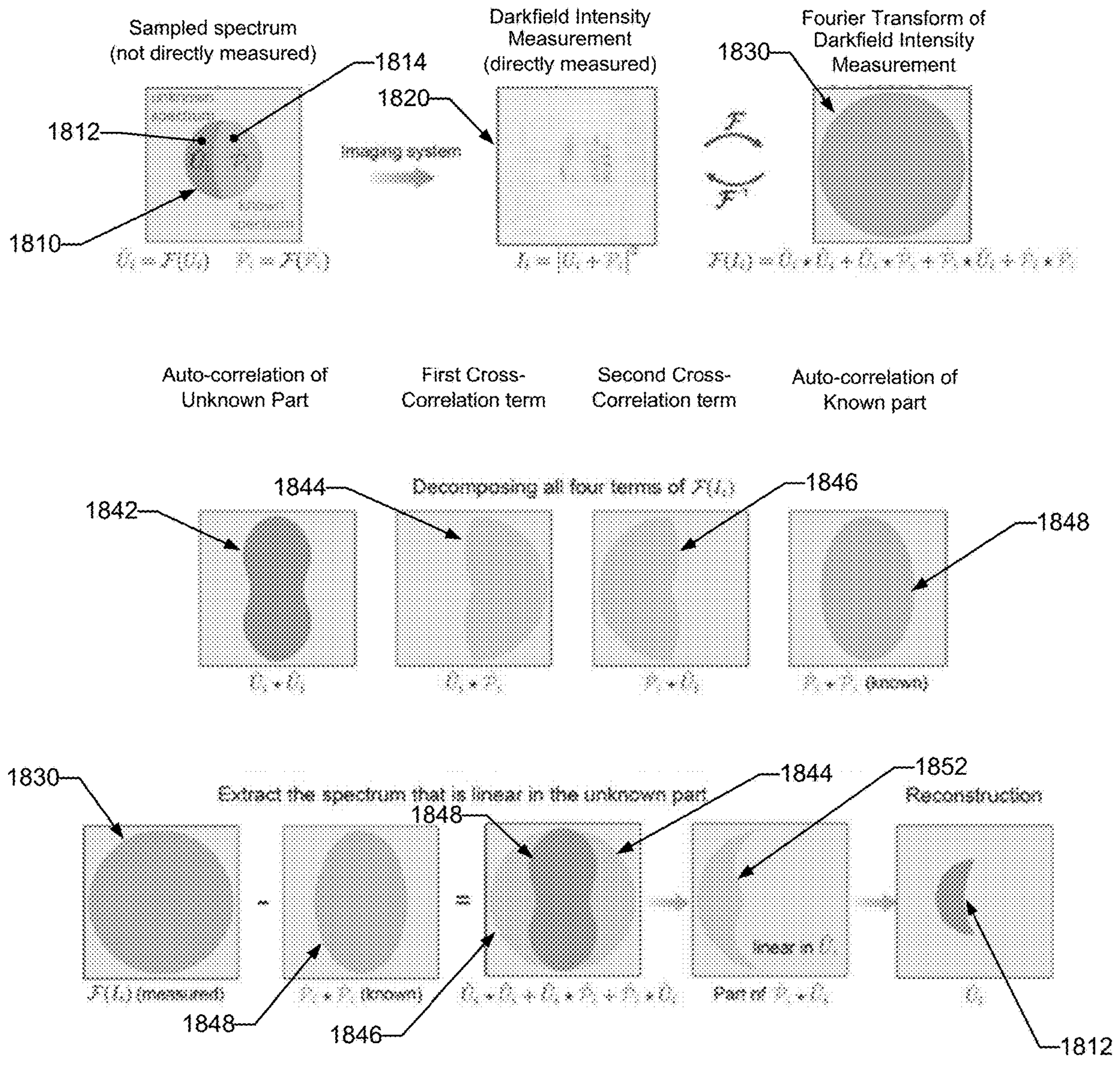
FIG. 18 depicts a schematic diagram of APIC reconstruction using darkfield measurements to extend known sample spectrum, according to embodiments.

In addition or in alternate embodiment, the APIC imaging method may include extending the reconstructed sample spectrum using one or more darkfield measurements. FIG. 6 shows an example of suboperations that may be used to extend a reconstructed sample spectrum using a darkfield measurement. In some cases, the reconstructed sample spectrum (also referred to as a "known sample spectrum") and/or a system aberration may serve as a priori knowledge. The APIC imaging method may select a spectrum of one of the darkfield measurement measurements for reconstruction. In one example, the spectrum closest to the known spectrum is selected. The APIC method crops out (subtracts from the signal) the known sample spectrum from what is sampled in this selected darkfield measurement as shown, e.g., in FIG. 3. This cropped portion only contains the unknown part of the darkfield measurement. The APIC method includes operations that recover the unknown spectrum so that it can be filled in for spectrum spanning. The Fourier transform of the darkfield measurement consists of crosscorrelation terms of the known and unknown spectrum and their autocorrelations. Using the known sample spectrum, a linear relationship can be constructed with respect to the unknown spectrum. The correlation coefficient relating the unknown part of the darkfield measurement to the known sample spectrum may be determined by analytically solving this linear relationship. To construct the linear relationship, the APIC method calculates the autocorrelation of the known part (e.g., autocorrelation of known part 1848 in FIG. 18) and subtracts the autocorrelation from the spectrum of the darkfield measurement (e.g., spectrum of darkfield measurement 1830 in FIG. 18). After subtraction, the autocorrelation of the unknown part (e.g., autocorrelation of the unknown part 1842 in FIG. 18) and the two crosscorrelations (e.g., crosscorrelations 1844, 1846 in FIG. 18) remain. As shown in FIG. 3 and FIG. 18, these terms are do not fully coincided in the special frequency domain. In a non-overlapping region of the cross-correlation terms, only cross correlation contributes to the signal. When calculating a cross-correlation of the known sample spectrum and the unknown part of the darkfield measurement, one of the signals is shifted and gets multiplied with the other signal. The correlation coefficient is the summation of this product. Since one of the two signals (the known sample spectrum) is known, the known signal can be considered a weight. The summation of the two signals is a weighted version of the unknown signal (unknown part of darkfield measurement). This is the linear operation. Thus, by applying the known spectrum to this summed signal, a linear operator is applied to the unknown spectrum and produces a cross correlation. By extracting a non-overlapping portion of the cross-correlation term, a linear relationship between the known spectrum and the unknown spectrum can be analytically determined to obtain a closed-form solution for the unknown spectrum. The APIC method then determines an unknown spectrum for the darkfield measurement. The unknown spectrum is filled back into the reconstructed spectrum. This process may continue until all darkfield measurements have been reconstructed. Once the reconstructed spectrum is filled in with the unknown spectrum of one or more darkfield measurements, an increased resolution free sample image can be obtained (e.g., via reverse Fourier transform).

In some embodiments, an APIC imaging method that extends the sample spectrum using one or more darkfield measurements may also correct for system aberration. In these embodiments, to be able to match up the known spectrum with the spectrum of the darkfield measurement, a system aberration (e.g., a recovered aberration) may be introduced to the cropped out known spectrum. After recovering the unknown spectrum, the aberration may be corrected and the corrected unknown spectrum filled back into the reconstructed spectrum. Once the reconstructed spectrum is filled in with the corrected unknown spectrum of one or more darkfield measurements, an increased resolution, aberration-free sample image can be obtained (e.g., via reverse Fourier transform).

The theoretical optical resolution of APIC methods is determined by the sum of the illumination NA and the objective NA. Since APIC techniques analytically recover the actual sample spectrum, these techniques may be advantageous over existing iterative techniques that rely on optimization parameters.

In certain embodiments, an APIC imaging method includes a data acquisition procedure for acquiring a plurality of NA-matching intensity measurements and a plurality of darkfield intensity measurements. In some cases, control signals are communicated to the radiation detector to trigger taking the intensity measurements and/or control signals are communicated to the illumination device to activate different illumination sources to change the illumination angle. For example, different illumination sources 115 in the ring of NA-matching illumination sources may be activated to change illumination angle. In other implementations, multiplexing illumination may be employed to illuminate with a series of illumination patterns.

D. Examples of APIC Imaging Methods

Figure 5:
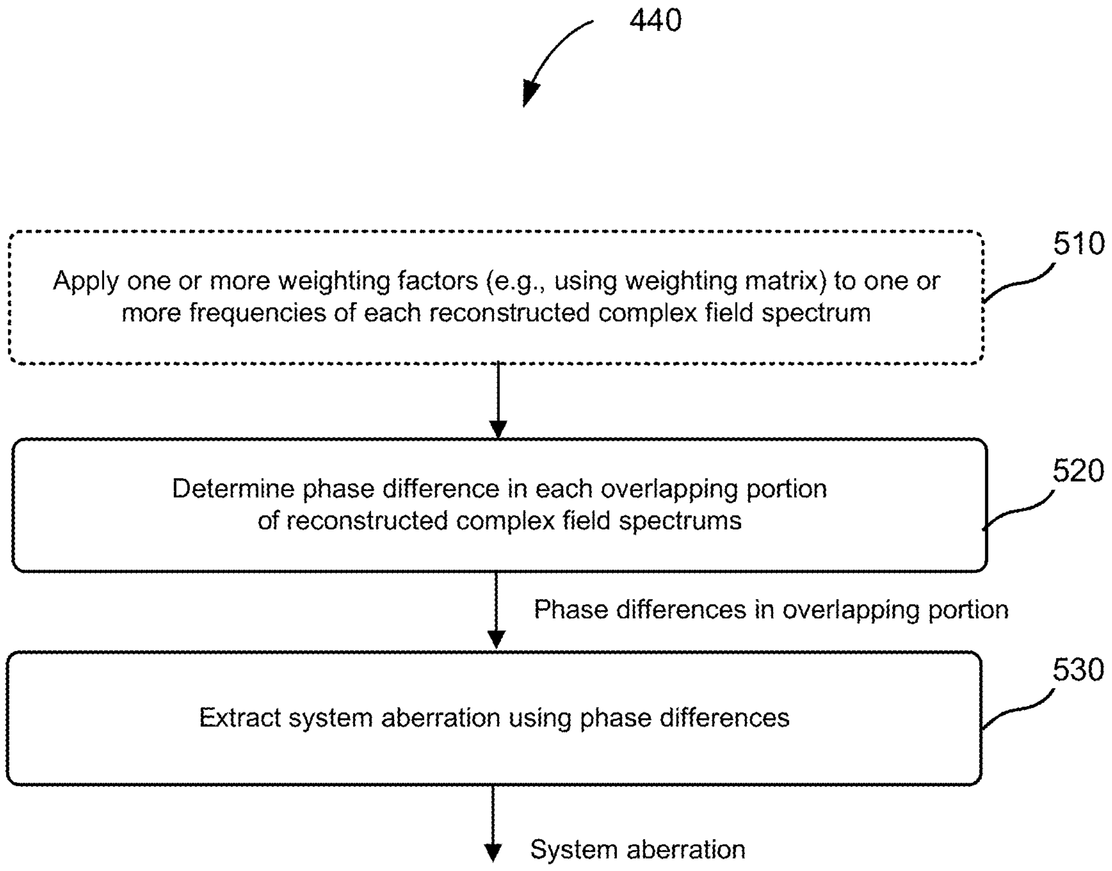
FIG. 5 depicts a flow diagram depicting examples of suboperations of an operation of FIG. 4.

FIG. 4 is a flow diagram depicting an APIC imaging method 400, according to various embodiments. FIG. 5 is a flow diagram depicting examples of suboperations of operation 440 of FIG. 4. FIG. 6 is a flow diagram depicting examples of suboperations of operation 470 of FIG. 4. One or more of the functions of the APIC imaging method may be performed by a computing device (e.g., computing device 780 in FIG. 7 or computing device 1200 of FIG. 12). Means for performing the functionality illustrated in one or more of the operations shown in FIG. 4 and suboperations shown in FIGS. 5 and 6 may include hardware and/or software components of a computing device, such as, for example, a controller apparatus, or a computer-readable apparatus including a storage medium storing computer-readable and/or computer-executable instructions that are configured to, when executed by at least one processor, cause the at least one processor or another apparatus to perform the functions.

It should also be noted that the operations of the APIC imaging method may be performed in any suitable order, not necessarily the order depicted in FIGS. 4-6. For example, operation 420 may be performed before operation 410 or after operation 430, operation 440, operation 450, or operation 460. Further, the APIC imaging method of other implementations may include additional or fewer operations/suboperations than those depicted in FIGS. 4-6. For example, in one implementation, an APIC imaging method performs operations 410, 420, 430, 460, and 470 and omits the aberration correction operations 440 and 450. As another example, in one implementation, an APIC imaging method performs operations 410, 420, 430, 440, and 460 to determine, and correct for, the system aberration and omits operation 470. As another example, in one implementation, the APIC imaging method in FIG. 4 omits operations 410 and 420.

At operation 410, a plurality of NA-matching intensity measurements of a specimen is retrieved from memory or received directly in a signal from a radiation detector (e.g., radiation detector 740 in FIG. 7, radiation detector 140 in FIGS. 1A, 1B, and 3), radiation detector 940 in FIG. 9, or cameras 1040*a-d* in FIG. 10) of an APIC imaging system (e.g., APIC system 100 in FIGS. 1A and 1B or APIC system 700 in FIG. 7). The NA-matching intensity measurements are acquired while varying illumination angles that are equal to, or nearly equal to, a maximum acceptance angle of the collection optics (e.g., objective 134 in FIGS. 1A, 1B, and 3) of the APIC imaging system. In some embodiments, each NA-matching intensity measurement is acquired during an exposure duration during which the specimen is illuminated at one of the NA-matching illumination angles. In an alternate embodiment, multiplexing illumination may be employed where the specimen is illuminated by a sequence of illumination patterns where each illumination pattern includes simultaneous illumination from multiple NA-matching illumination angles. In some embodiments, a computing device (e.g., a controller) may send trigger signals to an illumination device (e.g., illumination device 110 (e.g., an LED array) in FIGS. 1A, 1B, and 3, illumination device 710 in FIG. 7, illumination device 810A in FIG. 8A, illumination device 810B in FIG. 8B, illumination device 910 in FIG. 9, illumination device 1010 in FIG. 10, or illumination device 1110 in FIG. 11) to activate different illumination sources to provide illumination at the NA-matching illumination angles sequentially. Alternatively or in addition, the computing device may send trigger signals to the radiation detector to take the NA-matching intensity measurements.

At operation 420, a plurality of darkfield measurements is retrieved from memory or received directly in a signal from the radiation detector. The darkfield measurements are acquired while varying illumination angles that are greater than a maximum acceptance angle of the collection optics of the imaging system. In one implementation, the illumination angles may be in a range of 1 degree to 5 degrees greater than the maximum acceptance angle. In another example, the illumination angles may be in a range of 3 degrees to 5 degrees greater than the maximum acceptance angle. In another implementation, the illumination angles may be in a range of 1 degree to 5 degrees greater than the maximum acceptance angle. In another implementation, the illumination angles may be more than 1 degree greater than the maximum acceptance angle. In some embodiments, the darkfield measurements are acquired while a specimen is being illuminated by a sequence of darkfield illumination angles. Each darkfield illumination angle is greater in than the maximum acceptance angle of the collection optics of the APIC imaging system. In some embodiments, each darkfield measurement is acquired during an exposure time while the specimen is illuminated at one of the darkfield illumination angles in the sequence. In an alternate embodiment, multiplexing illumination may be employed where the specimen is illuminated by a sequence of illumination patterns where each illumination pattern includes simultaneous illumination from multiple darkfield illumination angles. In some embodiments, a computing device may send trigger signals to the illumination device to activate different illumination sources to provide illumination at the darkfield illumination angles sequentially. Alternatively or in addition, the computing device may send trigger signals to the radiation detector to take the darkfield intensity measurements.

At operation 430, a new signal with a complex field spectrum is reconstructed from each of the NA-matching intensity measurements to obtain a plurality of complex field spectrums. In some embodiments, a transformed signal of each complex field spectrum is reconstructed from a corresponding NA-matching intensity measurement using Eqn. 32. The complex field spectrum may be restored in real space with inverse Fourier transform and applying an exponential function to each point of the inverse transform as provided in Eqn. 33. In some cases, Kramers-Kronig relations may be used to reconstruct complex field spectrums from NA-matching measurements.

At operation 440, a system aberration is extracted from the plurality of complex field spectrums reconstructed from the NA-matching intensity measurements. As discussed in more detail in Section V (C) with reference to FIG. 17, at an overlapping portion of two reconstructed spectrums, the phase difference due to the sample spectrum cancels out and the phase difference depends (linearly) on the system aberration. The system aberration is determined by multiplying the signal by a linear operator. The linear operator maps the phase differences of the overlapping portions of the complex field spectrums to the system aberration. An example of a linear operator is provided by Eqn. 41. Another example of a linear operator is provided in Eqn. 48. A discussion of a process of solving for the linear operator is provided in Section V (C). An example of a 2D aberration of an imaging system is represented in Eqn. 51. Details regarding an example of an operation for extracting a system aberration are provided in Section V (C). FIG. 5 illustrates an example of suboperations that may be included in operation 440, according to some embodiments.

At operation 450, aberration is corrected in each of the complex field spectrums to generate a plurality of aberration-corrected spectrums. To remove the system aberration from each reconstructed spectrum, the conjugate of the system aberration is subtracted from the reconstructed spectrum to generate a corresponding aberration-corrected spectrum.

At operation 460, the aberration-corrected spectrums are stitched together to generate a reconstructed sample spectrum (also referred to herein as a "(initial) known sample spectrum" or a "calculated sample spectrum"). For example, the aberration-corrected spectrums may be summed together by the weighted average.

At operation 470, the reconstructed (known) sample spectrum is extended using the plurality of darkfield measurements. Inverse Fourier transform is applied to the extended sample spectrum to obtain an extended-resolution, aberration-free reconstructed image with higher resolution than the NA-matching intensity measurements or the darkfield measurements. In certain implementations, an unknown parts of the sample spectrum are recovered from the darkfield measurements and a spectrum spanning procedure is used to fill in the sample spectrum with the recovered unknown parts. Details regarding an example of an operation for extending the known sample spectrum are provided in Section V (D). FIG. 5 illustrates an example of suboperations that may be included in operation 470, according to some embodiments.

In some embodiments, the APIC imaging method discussed with respect to FIG. 5 may further includes a calibration procedure. An example of a calibration procedure is discussed in Section V Aberration Extraction FIG. 5 is a flow diagram depicting an example of suboperations that may be included in operation 440 of FIG. 4, according to some embodiments. At optional (denoted by dashed line) suboperation 510, one or more weighting factors (e.g., weighting factors in a weighting matrix as discussed, for example, with reference to Eqn. 52) may be applied to one more spatial frequencies in each reconstructed complex field spectrum reconstructed from a corresponding NA-matching measurement. In one aspect, the one or more weightings factors place a greater weight on spatial frequencies with a stronger signal than other spatial frequencies in the spectrum. It may be advantageous to apply greater weight to these spatial frequencies with stronger signals since these signals generally have higher signal-to-noise ratio (SNR) and emphasizing these frequencies may provide a better result. In one aspect, a weighting matrix is applied to emphasize one or more frequencies in the spectrum with higher SNR.

As discussed in more detail in subsection V (C) with reference to FIG. 17, at an overlapping portion of two reconstructed spectrums, the phase difference due to the sample spectrum cancels out and the phase difference solely depends on the system aberration. As shown by the illustration 1790 in FIG. 17, the phase difference in the overlapping portion is a linear combination of the system aberration. Due to this, a linear operator may be determined that accounts for the phase differences. The linear operation may then be used to recover the system aberration from the phase differences in the overlapping portions.

Returning to FIG. 5, at suboperation 520, the phase difference in each overlapping portion of the reconstructed spectrums is determined by subtracting the phase of the overlapping reconstructed spectrums. For example, as illustrated in FIG. 17, the phase of the reconstructed spectrum 1712 of the overlap (consists of 1750, 1760 and an offset) may be subtracted from the phase of the overlapping part of spectrum 1714 (consists of 1751, 1761 and another offset) to determine the phase difference.

At suboperation 530, a system aberration may be determined using the phase differences from the overlapping portions. In certain implementations, the system aberration is determined by solving for the linear operator that maps the phase differences of the overlapping portions of the complex field spectrums to the system aberration. An example of a linear operator is provided in Eqn. 48. In this example, phase differences for the overlapping portions can be entered for different pairs of overlapping spectrums into Eqn. 48 and the system aberration can be solved from the populated matrix with the phase differences. In one implementation, the phase differences of a smaller set of pairs of overlapping spectrums from the total number of pairs of overlapping spectrums in the full spectrum of the sample are used, which may be advantageous to reduce computational resources. An example of a 2D aberration of the APIC imaging system is given by Eqn. 51.

Extending Sample Spectrum Using Darkfield Measurements

FIG. 6 is a flow diagram depicting an example of suboperations that may be included in operation 470 of FIG. 4, according to certain embodiments. One or more of the suboperations in the flow diagram may use a reconstructed sample spectrum (e.g., reconstructed sample spectrum from operation 460 of FIG. 4) and/or a system aberration (e.g., system aberration extracted at operation 440 of FIG. 4) as known parameters to extend the sample spectrum using one or more darkfield measurements.

In some implementations, the suboperations in FIG. 6 may be performed for two or more of the darkfield measurements obtained at operation 420 of FIG. 4, for example. In one implementation, the suboperations in FIG. 6 are performed for all of the darkfield measurements. Where suboperations in FIG. 6 are performed for multiple darkfield measurements, the suboperations may be performed in parallel (parallel processing), for example.

At suboperation 610, one of the darkfield measurements may be selected from the plurality of darkfield measurements. In one example, the darkfield measurement with a spectrum closest to a known reconstructed sample spectrum is selected (e.g., known sample spectrum from operation 460).

The sampled spectrum of the darkfield measurement (e.g., sampled spectrum 1810 in FIG. 18) consists of the reconstructed known sample spectrum (e.g., known sample spectrum 1814 in FIG. 18) and an unknown spectrum (e.g., unknown spectrum 1812 in FIG. 18). The unknown spectrum of the darkfield measurement can be reconstructed using the known sample spectrum. At suboperation 620, the known sample spectrum may be cropped out from the prior reconstructed spectrum based on which part of the sample spectrum is measured in the selected darkfield measurement (e.g., spectrum of darkfield measurement 1830 in FIG. 18). A correlation operator and the autocorrelation of the cropped known spectrum are used to obtain the unknown spectrum of the selected darkfield measurement. This cropped spectrum is only a part of the information of the spectrum associated with the selected darkfield measurement. In one example, the known sample spectrum is subtracted from the spectrum of the darkfield measurement.

At optional (denoted by dashed line) suboperation 630, the known system aberration may be added back into the cropped out known part of the spectrum of the selected darkfield measurement to obtain an uncorrected known part. In another implementation, the known system aberration may be added into the spectrum of the darkfield measurement prior to suboperation 620.

In certain embodiments, APIC imaging methods correct for aberrations such as an imaging system aberration (e.g., system aberration extracted at operation 440 in FIG. 4). For embodiments with aberration correction, suboperation 630 may be included to add the system aberration back into the unknown spectrum and suboperation 680 may be included to remove the system aberration from the recovered unknown part of the sample spectrum.

As discussed in detail in Section V(D), the spectrum of the darkfield measurement (e.g., Fourier transform of the darkfield intensity measurement 1830 in FIG. 18) includes a first cross correlation term (e.g., first cross-correlation term 1844 in FIG. 18) and a second cross-correlation term (e.g., second cross-correlation term 1846 in FIG. 18) of the unknown and known spectrum, an autocorrelation term of the unknown spectrum (e.g., autocorrelation of the unknown spectrum 1842 in FIG. 18), and an autocorrelation of the known spectrum (e.g., autocorrelation of the known spectrum 1848 in FIG. 18). At suboperation 640, the autocorrelation term of the known reconstructed sample spectrum is calculated and subtracted out of the spectrum of the darkfield measurement, leaving the auto-correlation term of the unknown spectrum, and the first and second cross-correlation terms.

At suboperation 650, the portion of one of the cross-correlation terms that does not overlap with the other cross-correlation term or the autocorrelation term of the unknown spectrum is extracted (by discarding the overlap). For example, the possible non-zero area of the other cross-correlation term may be determined using the shape of the known sample spectrum and that of the unknown spectrum of the darkfield measurement. The non-zero area in their autocorrelation term can be determined from the two as well. The non-overlapping portion can be extracted by setting any possible non-zero area covered by autocorrelation of unknown spectrum (autocorrelation of unknown spectrum 1842) and the other cross-correlation term (first cross-correlation term 1844 in FIG. 18) to zero in the result of subtracting the auto-correlation of the known spectrum (e.g., auto-correlation of the known spectrum 1848 in FIG. 18) from the spectrum of the darkfield intensity measurement (e.g., darkfield intensity measurement 1830 in FIG. 18).

Figure 19:
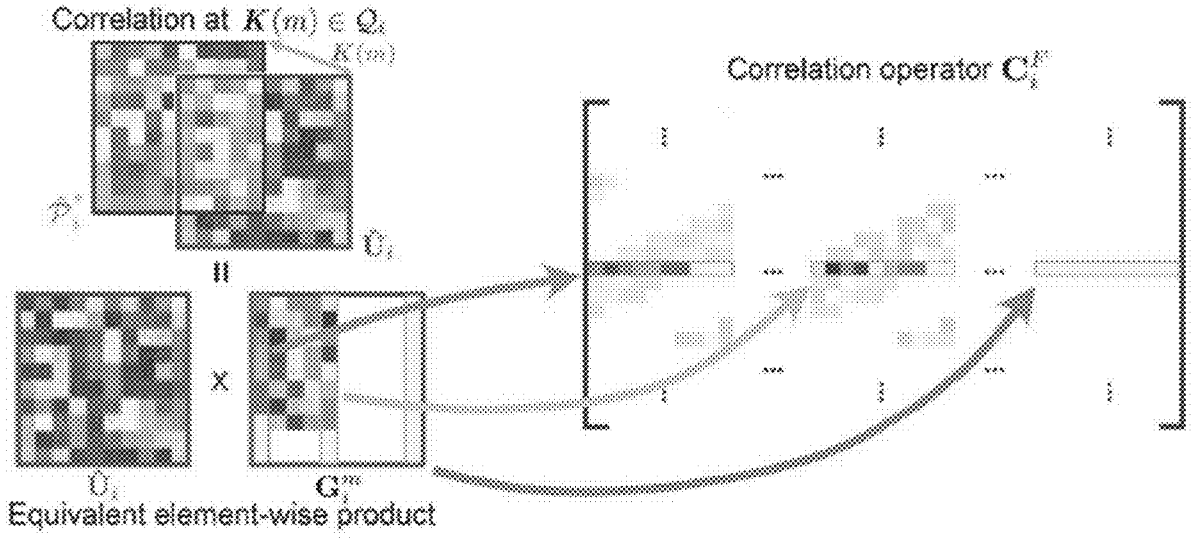
FIG. 19 depicts a graphical illustration of the construction of a correlation operator, according to embodiments.

The non-overlapping portion is linearly related to the unknown part of the spectrum of the darkfield measurement. A linear equation (e.g., part of a correlation operator) may be obtained with respect to the unknown part of the darkfield measurement. This linear equation may be used to form a closed-form solution of an unknown part from each darkfield measurement. At suboperation 660, a correlation operator may be constructed from known spectrum based on the portion extracted (1852 in FIG. 18). FIG. 19 depicts a graphical illustration of the construction of a correlation operation according to certain implementations. The correlation operator may be used in a closed form solution to determine the unknown part of the sample spectrum based on the extracted non-overlapping spectrum 1852 in FIG. 18. A correlation operator for multiple darkfield measurements can be used to obtain a correlation matrix. An example of a correlation matrix, $$C_i^F$$

is described in Section V(D).

In some implementations, by constructing a correlation operator, a lincar equation with respect to the unknown part of the sample spectrum is determined. In calculating cross-correlations of the known part of the signal and the unknown part of the signal, one of the signals is shifted and gets multiplied by the other signal. The summation of this product is a correlation coefficient. The known signal can be used as the weight to calculate a weighted version of the unknown signal. The summation of weighted version of the unknown signal is the correlation coefficient and this process is linear in terms of the unknown spectrum. We can thus form a linear equation and the linear equation can be solved for the unknown spectrum.

At suboperation 670, the correlation operator is applied to the spectrum of the darkfield measurement to recover the unknown part.

In implementations where the imaging method corrects for aberration, after recovering the unknown part, the aberration is corrected in the unknown part. At optional (denoted by dashed line) suboperation 680, the known system aberration is removed (subtracted) from the unknown part.

At suboperation 690, the sample spectrum is filled in with the recovered unknown part. Once the unknown part of the sample spectrum is recovered, the sample spectrum is filled in (summed) with the recovered unknown part.

In certain implementations, the suboperations in FIG. 6 are completed for two or more of the plurality of darkfield measurements. In one example, the suboperations are completed for all the darkfield measurements. Inverse Fourier transform is applied to the extended sample spectrum to obtain a higher-resolution, aberration-free reconstructed image with higher resolution than the NA-matching intensity measurements or darkfield measurements.

In certain implementations, one or more unknown parts of the sample spectrum are recovered and a spectrum spanning procedure is used to fill in the sample spectrum with the recovered unknown parts. For example, the suboperations in FIG. 6 may be performed for multiple darkfield measurements to obtain corresponding multiple unknown parts of the sample spectrum. The spectrum spanning procedure may be used to fill in (add to) the sample spectrum to obtain an extended sample spectrum.

According to embodiments, an APIC imaging method uses a plurality of NA-matching intensity measurements and/or a plurality of darkfield intensity measurements in a reconstruction process. Various number of these intensity measurements may be used.

In some embodiments, an APIC imaging method uses at least 6 NA-matching measurements. In some embodiments, an APIC imaging method uses at least 8 NA-matching measurements. In some embodiments, an APIC imaging method uses between 6 NA-matching measurements and 8 NA-matching measurements. In some embodiments, an APIC imaging method uses at least 7 NA-matching measurements. In some embodiments, an APIC imaging method uses at least 9 NA-matching measurements. In some embodiments, an APIC imaging method uses more than 9 NA-matching measurements.

In some embodiments, an APIC imaging method uses at least one darkfield measurement. In some embodiments, an APIC imaging method uses between 1-10 darkfield measurements. In some embodiments, an APIC imaging method uses between 10-20 darkfield measurements. In some embodiments, an APIC imaging method uses between 20 and 30 darkfield measurements. In some embodiments, an APIC imaging method uses more than 10 darkfield measurements.

E. Additional Examples of APIC Imaging Systems and System Components

FIG. 7 is a block diagram of components of an APIC imaging system 700, according to embodiments. The APIC imaging system 700 comprises an APIC imaging device 701 and a computing device 700 in electronic communication with APIC imaging device 701. The APIC imaging device 701 includes an illumination device 710 for providing illumination at a plurality of NA-matching illumination angles and at a plurality of darkfield illumination angles incident a specimen 720 being imaged. The illumination device 710 may be configured to provide illumination in reflection mode and/or in transmission mode. The APIC imaging system 700 is shown at an instant when the specimen 720 is being imaged. It would be understood that the presence of a specimen is optional (denoted by a dotted line). APIC imaging device 701 also includes an optical system 730 with collection optics such an objective for receiving illumination scattered by the specimen 720. An example of an objective that may be used is a low magnification objective such as, e.g., a 10× magnification, NA 0.25 objective (e.g., 10× magnification, NA 0.25 objective sold by Olympus).

APIC imaging device 701 also includes one or more radiation detectors 740 in communication with the optical system 730 to receive light. The one or more radiation detectors 740 are configured to acquire a plurality of NA-matching intensity measurements while the illumination device 710 provides illumination at NA-matching illumination angles and acquire a plurality of darkfield intensity measurements while the illumination device 710 provides illumination at darkfield illumination angles. The computing device 780 includes one or more processors 782, a non-transitory computer readable medium (CRM) 784, and an optional (denoted by dashed line) display 786. The one or more processors 782 are in electrical communication with one or more radiation detectors 740 to receive a signal with a plurality of NA-matching intensity measurements and a plurality of darkfield intensity measurements and/or to send control signals to the one or more radiation detectors 740, for example, to trigger image acquisition. Communication between one or more system components may be in wired and/or wireless form.

In some embodiments, the illumination device of an APIC imaging system includes one or more illumination sources. In other cases, the illumination device is in communication with (e.g., via optical fibers) the one or more illumination sources to receive illumination. For example, illumination device 1110 in FIG. 11 receives a laser beam 1118 from one or more laser sources (e.g., via optical fibers) that are separate from the illumination device 1110.

An illumination device of various formats may be used. In one embodiment, an illumination device includes a galvo motor configured to receive a laser beam and a plurality of mirrors configured to reflect the laser beam at different illumination angles. In another embodiment, an illumination device includes one or more rings of illumination sources mounted onto a supporting structure (e.g., a flat plate, a hemispherical plate, a semi-hemispherical plate, a partial conical plate, etc.). For example, an illumination device may have a first ring of illumination sources configured for NA-matching illumination angles and a second ring of illumination sources configured for darkfield illumination angles. In another embodiment, the illumination device includes a single illumination source. In another embodiment, the illumination device includes a rectangular array of illumination sources and/or a ring of illumination sources. For example, an illumination device may include an LED array (e.g., RGB LED Matrix sold by Adafruit) and/or LED ring (e.g., Neopixel ring 16 sold by Adafruit). As another example, an LCD pixel array and/or LCD pixel ring may be used. One skilled in the art would contemplate other sources of radiation and other formats of illumination devices that can be implemented by an APIC imaging system.

The illumination sources of different embodiments may provide electromagnetic waves of various wavelength. In some cases, the illumination sources of the illumination device provide wavelength within the visible spectrum. In another case, the illumination sources provide electromagnetic waves in the ultraviolet spectrum. In another case, the illumination sources provide electromagnetic waves in the infrared spectrum.

In some embodiments, the illumination device includes a first plurality of illumination sources configured to provide illumination sequentially at a corresponding plurality of NA-matching illumination angles for acquiring a plurality of NA-matching measurements and a second plurality of illumination sources configured to provide illumination sequentially at a corresponding plurality of darkfield illumination angles for acquiring a plurality of darkfield measurements. For example, illumination device 110 in FIGS. 1A and 1B includes a ring of NA-matching illumination sources 116*a* and a plurality of darkfield illumination sources 116*b*. As another example, illumination device 810A in FIG. 8A includes a first ring of NA matching illumination sources 812A and a second ring of darkfield illumination sources 814A. As another example, illumination device 810B in FIG. 8B includes a first ring of NA matching illumination sources 812B and a second ring of darkfield illumination sources 814B.

In some embodiments, an APIC imaging system has one or more motorized translational stages upon which the illumination device is mounted to adjust the position (height and x-y translational position) of the illumination device. In some cases, the motorized transitional stage(s) is/are in communication with the computing device of the APIC imaging system to control the movement. In one implementation, two motorized transitional stages are used. In this implementation, two circuit boards (e.g., circuit boards made by Arduino Uno) may be in communication with the motorized transitional stages respectively to control them individually.

In various embodiments, an APIC imaging system includes one or more radiation detectors (e.g., radiation detector 140 in FIGS. 1A and 1B and radiation detector(s) in FIG. 7) configured to receive light from the optical system and acquire a plurality of NA-matching intensity measurements and a plurality of darkfield measurements. An example of a suitable radiation detector is a camera such as the Prosilica GT6400 camera made by Allied Vision. In some embodiments, multiple radiation detectors may be employed to acquire intensity measurements at different angles. In FIG. 10, for example, APIC imaging system 1000 includes a first ring of radiation detectors 1040*a* configured to acquire a plurality of NA-matching intensity measurements and a second ring of radiation detectors 1040*b* configured to acquire a plurality of darkfield measurements. A radiation detector may include one or more light detecting elements such as, for example, a charge coupled device (CCD), a CMOS imaging sensor, an avalanche photo-diode (APD) array, a photo-diode (PD) array, or a photomultiplier tube (PMT) array.

An APIC system may include a computing device for performing one or more functions of the APIC imaging system such as, e.g., one or more operations of a APIC imaging method. The computing device may include one or more processors and a non-transitory computer readable medium in electrical communication with the one or more processors. Optionally, the computing device may also have a display that is in electrical communication with the one or more processors. The computing device can be in various forms such as, for example, a smartphone, laptop, desktop, tablet, etc. An example of a suitable computing device is a personal computer having a non-transitory computer readable medium with 16 GB RAM and a processor including a CPU (e.g., Intel Core i5-8259U).

In some cases, the computing device may include a controller for controlling functionality of the APIC system. In one example, the controller may include one or more circuit boards (e.g., Arduino board made by Arduino Uno). In one implementation, a first plurality of illumination sources configured to provide illumination sequentially at a corresponding plurality of NA-matching illumination angles for acquiring a plurality of NA-matching measurements are controlled by a first circuit board and the second plurality of illumination sources configured to provide illumination sequentially at a corresponding plurality of darkfield illumination angles for acquiring a plurality of darkfield measurements are controlled by a second circuit board.

In various embodiments, the APIC imaging system includes one or more processors (e.g., processor(s) 782 in FIG. 7, GPU(s) 1282B in FIG. 12, and CPU(s) 1282A in FIG. 12) and non-transitory computer readable medium (CRM) (e.g., memory) (e.g., computer readable medium 784 in FIG. 7 and memory 1284 in FIG. 12) in communication with the processor(s). An example of a suitable CPU is an Intel Core i9-10940X with 64 GB RAM. The one or more processors and computer readable medium may be part of a controller. The processor-executable code (or "instructions") for performing the APIC imaging method can be stored on the CRM or other memory. The processor(s) and can retrieve the processor-executable code from the CRM or other memory to perform various functions or operations of the APIC imaging method. The CRM or other memory can store raw and/or processed image data. In some implementations, the CRM or other memory can additionally or alternatively include a volatile memory array for temporarily storing code to be executed as well as image data to be processed, stored, or displayed.

Figure 8A:
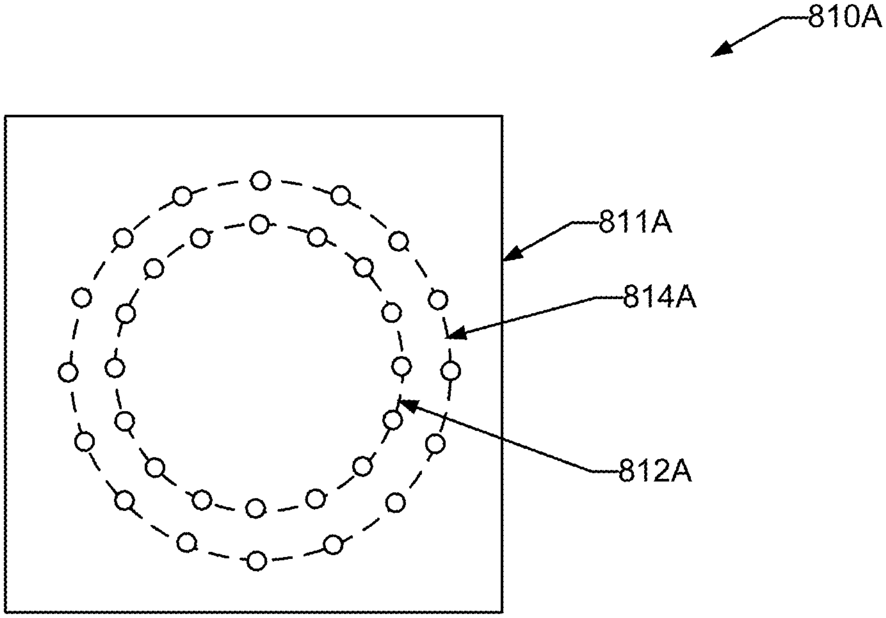
FIG. 8A depicts a plan view of an illumination device of an APIC system, according to embodiments.

FIG. 8A depicts a plan view of an illumination device 810A of an APIC system, according to embodiments. Illumination device 810A includes a first ring of NA matching illumination sources 812A and a second ring of darkfield illumination sources 814A. First ring of NA matching illumination sources 812A and second ring of darkfield illumination sources 814A are mounted onto a surface of a flat plate 811A. The first ring 812A has a circumference through the centers of the NA matching illumination sources. The second ring 814B has a circumference through the centers of the darkfield illumination sources. The circumference of the first ring 812A has a diameter and the illumination device 810A positioned during operation with respect to the collection optics such that the NA matching illumination sources 812A can provide illumination at each of a plurality of NA-matching illumination angles. The circumference of the second ring 814A has a diameter and the illumination device positioned during operation with respect to the collection optics such that the darkfield illumination sources 814B can provide illumination at each of a plurality of darkfield illumination angles. Additional rings of darkfield illumination sources may be used in other implementations. In other implementations, the darkfield illumination sources can be in other arrangements than rings where the darkfield illumination sources have illumination angles greater than the maximum acceptance angle of the collection optics. Also, each of the rings or other arrangements of darkfield illumination sources may include fewer or more illumination sources according to other implementations.

Figure 8B:
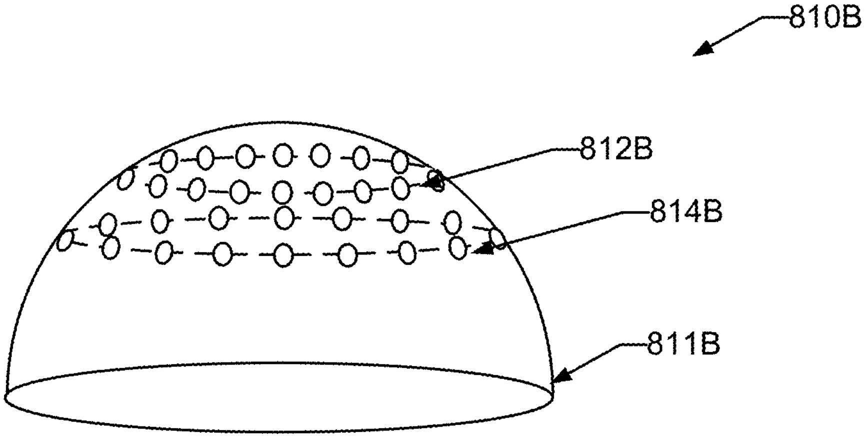
FIG. 8B depicts an isometric view of an illumination device of an APIC system, according to embodiments.

FIG. 8B depicts an isometric view of an illumination device 810B of an APIC system, according to embodiments Illumination device 810B includes a first ring of NA matching illumination sources 812B and a second ring of darkfield illumination sources 814B. First ring of NA matching illumination sources 812B and second ring of darkfield illumination sources 814B are mounted onto a surface of a curved support 811B. The first ring 812B has a circumference through the centers of the NA matching illumination sources. The second ring 812B has a circumference through the centers of the NA matching illumination sources. The circumference of the first ring 812B has a diameter and the illumination device 810B positioned during operation with respect to the collection optics such that the NA matching illumination sources 812B can provide illumination at each of a plurality of NA-matching illumination angles. The circumference of the second ring 812B has a diameter and the illumination device positioned during operation with respect to the collection optics such that the darkfield illumination sources 812B can provide illumination at each of a plurality of darkfield illumination angles. Additional rings of darkfield illumination sources may be used in other implementations. In other implementations, the darkfield illumination sources can be in other arrangements than rings where the darkfield illumination sources have illumination angles greater than the maximum acceptance angle of the collection optics. Also, each of the rings or other arrangements of darkfield illumination sources may include fewer or more illumination sources according to other implementations.

FIG. 9 is a side view of components of an APIC system 900, according to certain embodiments. APIC system 900 includes an illumination device 910 including a single illumination source 912 and an optical system 930 with an aperture 932 and an objective 934 having a lens with an acceptance angle, θ. APIC system 900 also includes a radiation detector 940. At the instant in time depicted in the illustrated example, a specimen 920 being imaged is located on a transparent receptacle 922 (e.g., transparent slide).

APIC system 900 also includes a mechanism (not shown) coupled to the single illumination source 912. The mechanism is configured to move (e.g., scan) the illumination source 912 in a direction of an x-axis and/or in a direction of a y-axis (not shown) perpendicular to a plane of the x-axis and the z-axis. In FIG. 9, the single illumination source 912 is shown moved between three positions. At the first two positions on the right, the illumination source 912 is depicted as providing NA-matching illumination 916 along an NA-matching illumination angle, α, that is equal to the acceptance angle, θ. At a third position on the left, the illumination source 912 is depicted as providing darkfield illumination 917 along a darkfield illumination angle that is greater than the acceptance angle, θ. Although three positions are shown, it would be understood that the single illumination source 912 may be moved to additional positions. During operation, the radiation detector 940 acquires a plurality of NA-matching intensity measurements while illumination is provided at the corresponding plurality of NA-matching illumination angles and acquires a plurality of darkfield intensity measurements while illumination is provided at the corresponding plurality of darkfield illumination angles. In some implementations, an NA-matching intensity measurement is acquired at each plurality of NA-matching illumination angles and a darkfield intensity measurement is acquired at each plurality of darkfield illumination angles. In another implementation, the APIC system 900 may be configured to move the transparent receptacle 922 relative to the single illumination source 912 while keeping the single illumination source 912 stationary. In another implementation, the APIC system 900 may be configured to move the optical system 930 and radiation detector 940 relative to the illumination source 912 and transparent receptacle 922 while keeping to the illumination source 912 and transparent receptacle 922 stationary.

FIG. 10 is a side view of components of an APIC system 1000, according to an embodiment. APIC system 1000 includes an illumination device 1010 with a single illumination source 1012 and an optical system 1030 with an aperture 1032 and an objective 1034 having a lens with an acceptance angle, θ. At the instant in time depicted in the illustrated example, a specimen 1020 being imaged is located on a transparent receptacle 1022 (e.g., transparent slide). APIC imaging system 1000 also includes a first ring of radiation detectors **1040*a* configured to acquire a plurality of NA-matching intensity measurements and a second ring of radiation detectors 1040*b* configured to acquire a plurality of darkfield measurements. The first ring of radiation detectors 1040*a* have respective detection planes 1041*a*. The radiation detectors in the first ring 1040*a* are positioned such that their respective detection planes 1041*a* are perpendicularly facing the NA-matching illumination angles to be able to capture a plurality of NA-matching intensity measurements during operation. The radiation detectors in the second ring 1040*b* are positioned such that their respective detection planes 1041*b* are perpendicularly facing the darkfield illumination angles to be able to capture a plurality of darkfield intensity measurements during operation. In the illustrated example, the single illumination source 1012** may remain stationary and NA-matching and darkfield intensity measurements may be taken at a single exposure time during operation.

In certain embodiments, an APIC imaging system includes an illumination device that directs a laser beam at different NA-matching illumination angles and darkfield illumination angles. For example, the illumination device may include a galvo motor (two-axis rotatable mirror system) and an array of mirrors (e.g., an arrangement of mirrors in concentric circles along a flat surface). The galvo motor may have mirrors that are rotatable to direct a laser beam to different mirrors in the array that then reflect the laser beam at the different illumination angles. The galvo motor is in communication with one or more laser sources (e.g., via optical fibers) to receive the laser beam.

FIG. 11 depicts an orthogonal view of an APIC imaging system 1100 having an illumination device 1110 with a galvo motor 1111 and a circular mirror array 1115, according to an embodiment. Galvo motor 1111 includes first and second rotatable mirrors 1113 and 1114. Circular mirror array 1115 includes ninety five (95) mirrors 1116(1)-1116(95). Other numbers of mirrors can be used in other implementations. Each mirror **1116(*i*) of the mirror array 1115 is coupled at one end of a rectangular tower coupled to a plate. The rectangular towers may be 3D-printed structures. Each tower's top surface is sloped at a certain angle such that collimated laser beam 1104 may be reflected towards the sample plane at one of the illumination angles in the sequence of illumination angles. In one implementation, a neutral density filter may be placed on each of the mirrors 1116(1)-1116(95) in circular mirror array 1115. Use of such neutral density filters allows for increasing the input laser intensity to obtain higher SNR in dark field images while preventing the bright field images from over-exposure. While two rotatable mirrors 1113 and 1114 are depicted in FIG. 11**, a single mirror rotatable about two different axes can be used in another implementation.

The APIC system 1100 also includes an optical system 1130 and a radiation detector 1140 for receiving laser light propagated by optical system 1130. Optical system 1130 includes a collection element 1134 (e.g., objective) having a focal length, $f_1$, and a focusing element 1136 (e.g., lens) having a focal length, $f_2$. Collection element 1134 is located to receive light issuing from the specimen during operation. Focusing element 1136 is configured to focus light propagated from collection element 1134 to radiation detector 1140. Optical system 1130 may be in a 4f arrangement or a 6f arrangement in in certain implementations. APIC system 1100 also includes a specimen receptacle 1122 (e.g., slide) for receiving a specimen being imaged, specimen receptacle 1122 includes a first surface at a sample plane. The illustrated example is shown at an instant in time during an image acquisition process where a specimen 1120 is located in specimen receptacle 1122.

The first and second rotatable mirrors 1113 and 1114 may be controlled in a variety of manners. By way of example, a controller, may be coupled with the first and second rotatable mirrors 1113 and 1114 of FIG. 11. The controller may access instructions stored in a memory. The instructions may be executable by the controller to cause the first and second rotatable mirrors 1113 and 1114 of FIG. 11 to or rotate to any given position such that the specimen is illuminated at each of the illumination angles at each of the different sampling times, as described in the preceding paragraph. Alternatively, the first and second rotatable mirrors 1113 and 1114 may have an internal memory and processor and may be programed to cause each of the first and second rotatable mirrors 1113 and 1114 to follow a pre-determined rotation path.

FIG. 12 depicts a block diagram of an example of components of a computing device 1280, according to various embodiments. Computing device 1280 includes a bus 1201 coupled to an input/output (I/O) subsystem 1202, one or more processors 1282, one or more communication interfaces 1207, a main memory 1208, a secondary memory 1210, and a power supply 1240. One of more of these components may be in separate housing. According to certain implementations, the illustrated components may be examples of components that a part of computing device 780 in FIG. 7 or a part of a computing device that is part of, or in communication with, APIC system 100 in FIGS. 1A, 1B, and FIG. 3.

Computing device 1280 includes I/O subsystem 1202, which includes, or is in communication with, one or more components which may implement an interface for interacting with human users and/or other computer devices depending upon the application. Certain embodiments disclosed herein may be implemented in program code on computing device 1280 with I/O subsystem 1202 used to receive input program statements and/or data from a human user (e.g., via a graphical user interface (GUI), a keyboard, touchpad, etc.) and to display them back to the user, for example, on a display. The I/O subsystem 1202 may include, e.g., a keyboard, mouse, graphical user interface, touchscreen, or other interfaces for input, and, e.g., an LED or other flat screen display, or other interfaces for output. Other elements of embodiments may be implemented with a computer system like that of computer system 1200 without I/O subsystem 1202. According to various embodiments, a processor may include a CPU, GPU or computer, analog and/or digital input/output connections, controller boards, etc.

Program code may be stored in non-transitory computer readable media such as secondary memory 1210 or main memory 1208 or both. One or more processors 1204 may read program code from one or more non-transitory media and execute the code to enable computing device 1280 to accomplish the methods performed by various embodiments described herein, such as APIC imaging methods. Those skilled in the art will understand that the one or more processors 1282 may accept source code and interpret or compile the source code into machine code that is understandable at the hardware gate level of the one or more processors 1282.

Communication interfaces 1207 may include any suitable components or circuitry used for communication using any suitable communication network (e.g., the Internet, an intranet, a wide-area network (WAN), a local-area network (LAN), a wireless network, a virtual private network (VPN), and/or any other suitable type of communication network). For example, communication interfaces 1207 can include network interface card circuitry, wireless communication circuitry, etc.

In certain embodiments, computing device 1280 may be part of or connected to a controller that is employed to control functions of an APIC system such as controlling image acquisition by the radiation detector (e.g., radiation detector(s) 140 in FIGS. 1A, 1B, and 3, radiation detector(s) 740 in FIG. 7, radiation detector 940 in FIG. 9, radiation detectors 1040*a* and 1040*b* in FIG. 10, radiation detector 1130 in FIG. 11) controlling illuminations in an illumination device (e.g., illumination device 110 in FIGS. 1A, 1B, and 3, illumination device 710 in FIG. 7, illumination device 810A in FIG. 8A, illumination device 810B in FIG. 8B, illumination device 910 in FIG. 9, illumination device 1010 in FIG. 10, and illumination device 1110 in FIG. 11). The controller will typically include one or more memory devices and one or more processors. The processor may include a CPU or computer, analog and/or digital input/output connections, stepper motor controller boards, etc.

III. Demonstration Results

For certain implementations, APIC reconstruction may be computationally faster than certain examples of FPM reconstruction. For certain implementations, APIC reconstruction may be more robust than these examples of FPM reconstruction against large aberrations. In one implementation, APIC reconstruction may be capable of addressing aberration whose maximal phase differences exceed 3.8π when using a NA 0.25 objective.

Implementation A

The APIC system in FIGS. 1A and 1B according to one implementation (Implementation A) was used. In this implementation, the objective 134 was a low magnification objective, the 10× magnification, NA 0.25 objective sold by Olympus, for data acquisition. The illumination device 110 included an LED ring 112 that was the Neopixel ring 16 made by Adafruit. The LED ring 112 was glued onto an LED array that was the 32×32 RGB LED Matrix sold by Adafruit to provide illumination at NA-matching illumination angles. Another cluster of illumination sources 114 configured to provide illumination sequentially at a corresponding plurality of darkfield illumination angles was also included. The LED ring 112 (first cluster) and the second cluster of illumination sources 114 were mounted on a motorized stage for position and height adjustment, and were individually controlled by two circuit boards made by Arduino Uno. In the data acquisition process, one LED was lit up at one time, and the radiation detector 140 was simultaneously triggered to capture an image when the LED was on. The radiation detector 140 was the Prosilica GT6400 camera made by Allied Vision. The acquisition process continued until all LEDs in the two clusters of LEDs were lit once. After data acquisition, an APIC imaging method and an FPM imaging method was used to perform reconstruction. The computing device used to perform the APIC and FPM reconstructions was a personal computer including a CPU: Intel Core i9-10940X with 64 GB RAM.

First Experiment with Small Dataset

In a first experiment, a Siemens star target was imaged and a small dataset was acquired to perform reconstruction using APIC and FPM. The dataset acquired consisted of 9 brightfield measurements, 8 NA-matching measurements and 27 darkfield measurements. The nominal scanning pupil overlap rate was approximately 65%. The results suggest that the APIC reconstruction was able to render a more accurate complex field than the FPM reconstruction.

Figure 13:
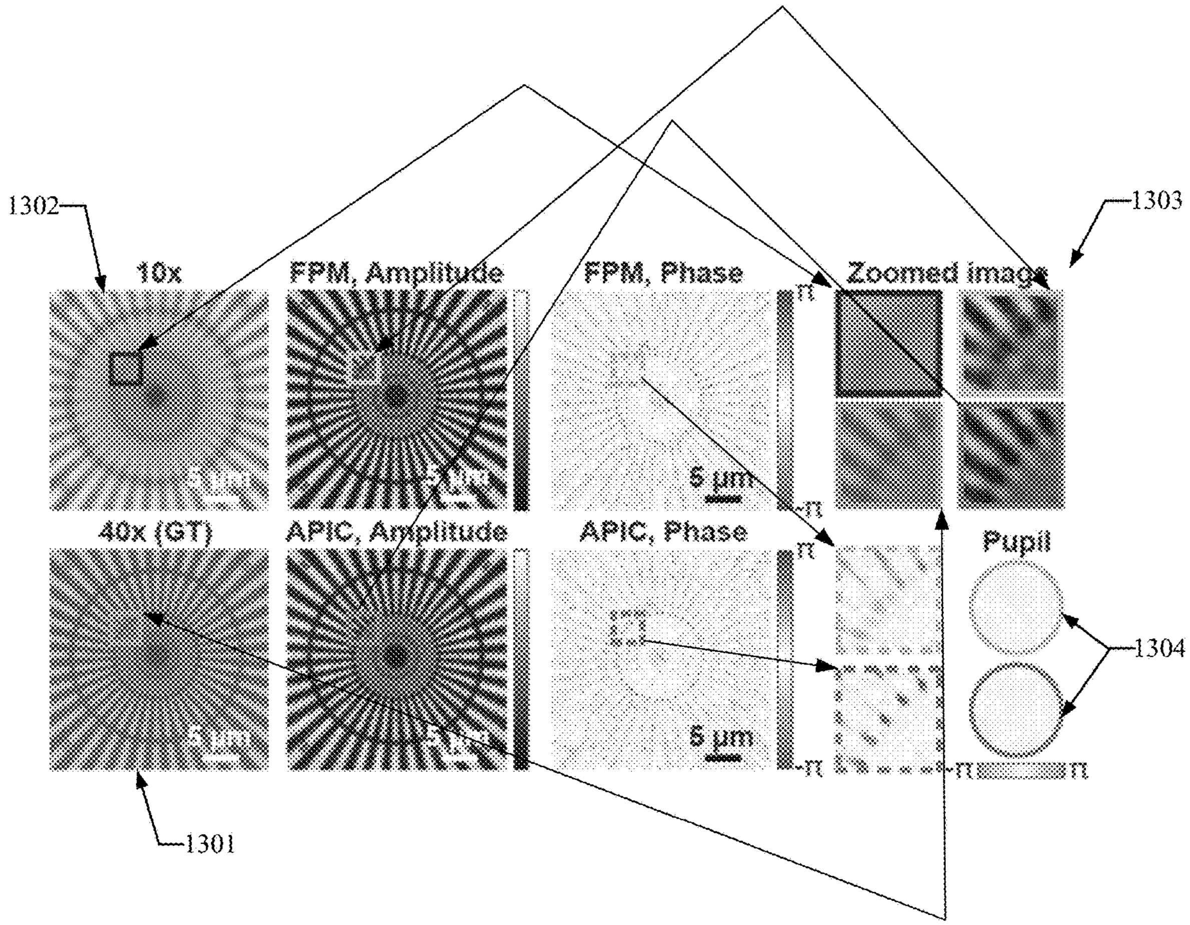
FIG. 13 depicts illustrations of APIC and FPM reconstruction results for a small number of measurements, according to embodiments.

FIG. 13 depicts illustrations of APIC and FPM reconstruction results for a small number of measurements, according to embodiments. FIG. 13 includes a ground truth image 1301, which was imaged under a high-NA, 40× objective and a Kohler illuminated image 1302 under the same 10× objective used in APIC's data acquisition. FIG. 13 also includes zoomed images 1303 of the reconstructed amplitude and phase. FIG. 13 also includes zoomed images 1303 of the reconstructed amplitude and phase. FIG. 13 also includes a reconstructed pupils 1304 using APIC and FPM reconstruction.

As shown by the result, the reconstructed finer spokes were distorted in the reconstruction result of FPM. Moreover, noticeable wavy reconstruction artifacts existed in the phases reconstructed by FPM. This suggests that large redundancy may be needed for FPM to provide a good reconstruction. When the measurements were given to APIC reconstruction, the reconstructed phases and amplitudes were less noisy. The reconstructed amplitude is also closer to the ground truth, which is sampled using a high-NA objective. This experiment showed the ability of APIC reconstruction to better retrieve a high-resolution complex field when the raw data size is constrained because it is an analytical method and does not rely as heavily on pupil overlap redundancy for solution convergence.

For image tile of length size 256 pixels, APIC reconstruction took 9 seconds on the personal computer, while FPM took 25 seconds to finish reconstruction. The relative computational efficiency of APIC can again be attributed to the analytical nature of its approach. This computational efficiency is image tile size dependent—the smaller the tile the more efficient. Section VI includes more detail regarding image tile size. As it is generally preferred to divide a large image into more smaller tiles in parallel computing, APIC's computational efficiency for smaller tiles aligns well with practical computation considerations.

Second Experiment with 312 Images

In a second experiment, the robustness of APIC and FPM reconstruction at addressing optical aberrations was examined. For this experiment, a total of 316 images were acquired including 52 normal brightfield measurements, 16 NA-matching measurements and 248 darkfield measurements. The nominal scanning pupil overlap rate of our dataset was approximately 87% and the final theoretical synthetic NA was equal to 0.75 when all darkfield measurements were used. This large degree of spectrum overlap was chosen to provide sufficient data redundancy for the best performance of FPM. APIC does not typically use such a large dataset. In our reconstruction, APIC only used the NA-matching and darkfield measurements, whereas FPM used the entire dataset, including the additional 52 brightfield measurements corresponding to illumination angles that were below the objective's acceptance angle. The second order Gauss-Newton FPM reconstruction algorithm was applied for reconstruction as it was found to be the most robust FPM reconstruction algorithm. A set of 6 parameters was used in the reconstruction of FPM.

The Siemens star target was deliberately defocused to assess how the two methods perform under different aberration levels. In this experiment, the sample was defocused to different levels and the defocus information was hidden from both methods.

Figure 14A:
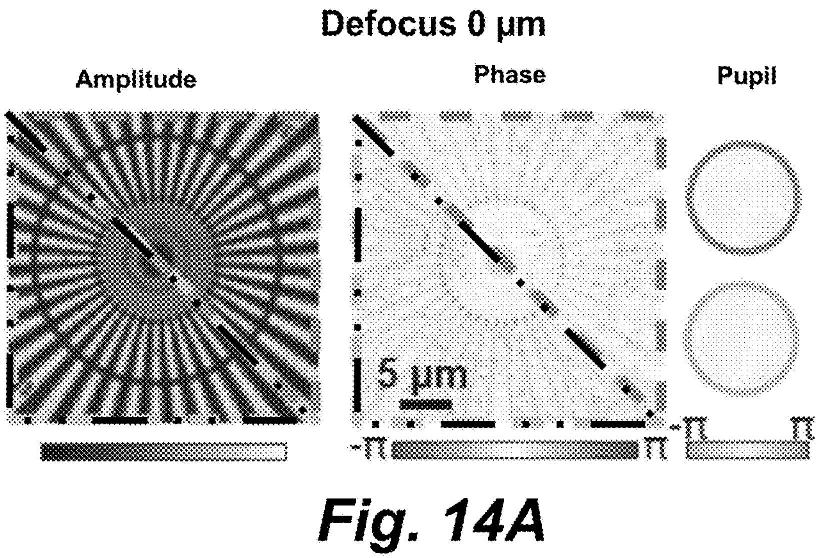
FIG. 14A depicts illustrations of complex fields under defocus of 0 μm reconstructed by an APIC imaging system, according to an embodiment.
Figure 14B:
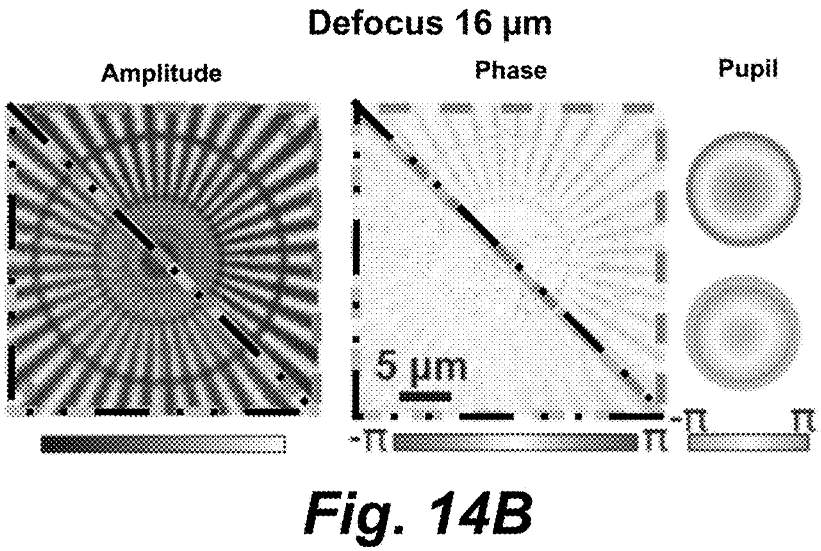
FIG. 14B depicts illustrations of complex fields under defocus of 16 μm reconstructed by an APIC imaging system, according to an embodiment.
Figure 14C:
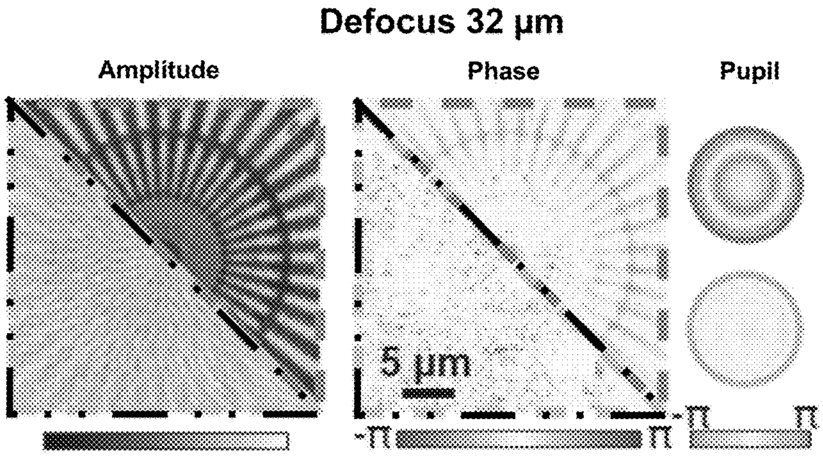
FIG. 14C depicts illustrations of complex fields under defocus of 32 μm reconstructed by an APIC imaging system, according to an embodiment.

FIGS. 14A, 14B, and 14C depict results of reconstructed complex fields under different levels of aberrations, according to embodiments. FIG. 14A depicts results of reconstructed complex fields under defocus of 0 μm. FIG. 14B depicts results of reconstructed complex fields under defocus of 16 μm. FIG. 14C depicts results of reconstructed complex fields under defocus of 32 μm. APIC reconstructed amplitude and phase are shown on the upper right of each group and highlighted by the dashed line. FPM reconstructed amplitude and phase are shown on the lower left of each group and highlighted by the dash dotted line.

Figure 15:
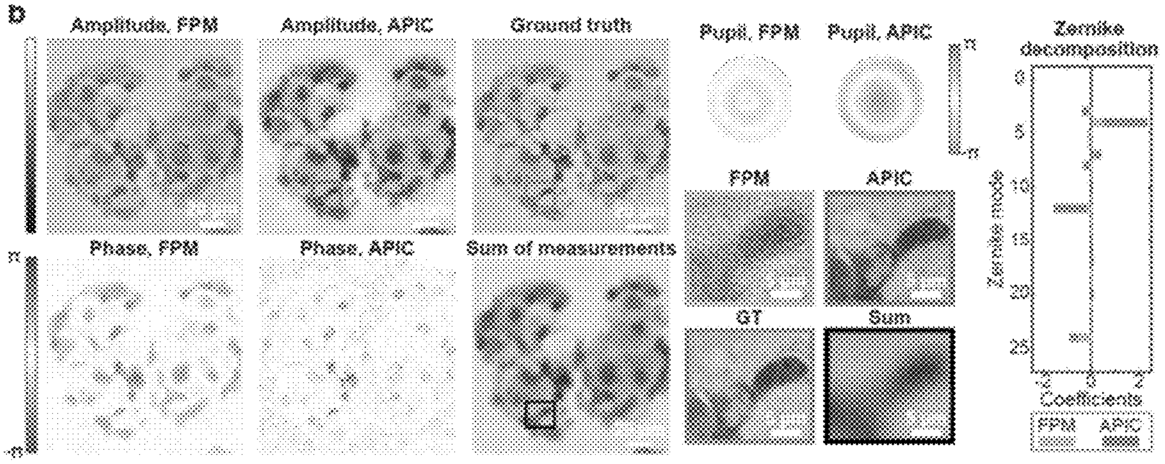
FIG. 15 depicts illustrations of complex fields of a human thyroid carcinoma cell sample reconstructed using APIC according to embodiments and FPM for comparison.

FIG. 15 depicts results of reconstructed complex fields of a human thyroid carcinoma cell sample using APIC and FPM, according to embodiments. Sum of measurements denotes the summation of all 316 images acquired, which can be treated as the incoherent image we would get under the same objective. The ground truth was acquired using an objective whose magnification power is 40 and NA equals 0.75. The NA of this 40× objective equals the theoretical synthetic NA of APIC and FPM. The square root of the summed image was calculated and the 40× image matched up with the amplitude reconstruction. The zoomed images of the highlighted boxes are shown on the lower right. The Zernike decompositions of retrieved aberrations using FPM and APIC are shown on the far-right side.

From the results, for large aberrations whose phase standard deviation exceeded 1.ln: on the pupil function (the case when Siemens star target was defocused by 32 μm, and the maximal phase difference is approximately 3.8n:), FPM may not have found the correct solution and the reconstructed images were different from the ground truth. At a lower aberration level, the amplitude reconstructions of FPM appeared to be close to the ideal case. However, the reconstructed phases were substantially different from the result when no defocus was introduced. In contrast, APIC was highly robust to different levels of aberrations. Although the contrast of APIC's reconstruction dropped under larger aberrations, it retrieved the correct aberrations and gave high-resolution complex field reconstructions that match with the in-focus result. The measured resolution for both FPM and APIC is approximately 870 nm when the in focus measurements were used, which is close to the 840 nm theoretical resolution.

Implementation B with Complex Aberration

The APIC system in FIGS. 1A and 1B according to implementation A was used except the objective 134 was an obsolete Olympus objective (10× magnification, NA 0.25) designed to work with another type of tube lens in order to introduce complex aberration.

First Experiment

A human thyroid adenocarcinoma cell sample was imaged using the APIC imaging method and the FPM imaging method. FIG. 15 depicts images of a human thyroid adenocarcinoma cell sample that resulted from using APIC imaging method and FPM imaging method, according to embodiments. Sum of measurements denotes the summation of all 316 images acquired, which can be treated as the incoherent image under the same objective. The ground truth was acquired using an objective whose magnification power is 40 and NA equals 0.75. The NA of this 40× objective equals the theoretical synthetic NA of APIC and FPM. The square root of the summed image was calculated and the 40× image was calculated to match up with the amplitude reconstruction. The zoomed images of the highlighted boxes are shown on the lower right. The Zernike decompositions of retrieved aberrations using FPM and APIC are shown on the far-right side.

In FIG. 15, the reconstructed amplitude of FPM reconstruction appears distorted by reconstruction artefacts. In comparison, APIC reconstruction recovered the finer details that were in good correspondence with the image acquired using a 0.75 NA objective.

Second Experiment

Figure 16:
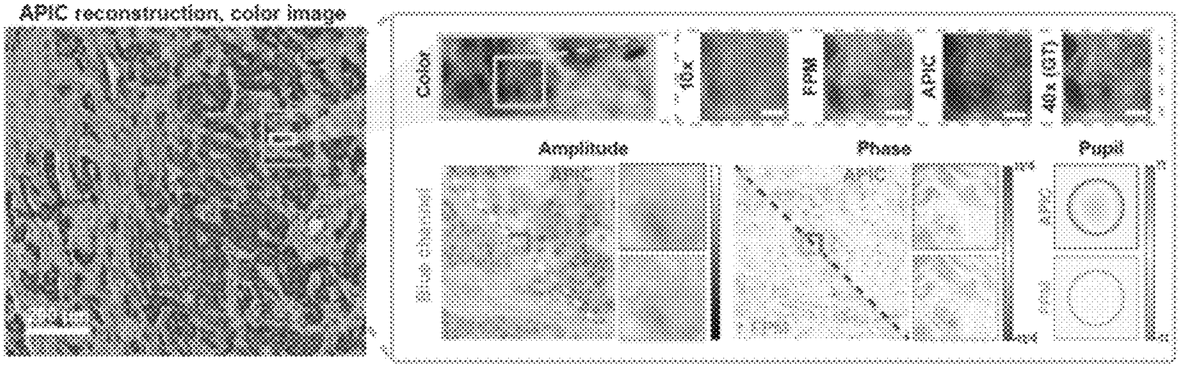
FIG. 16 depicts high-resolution images of hematoxylin and eosin (H&E) stained breast cancer cells resulted from using APIC imaging method according to embodiments and FPM imaging method for comparison.

A hematoxylin and cosin (H&E) stained breast cancer cell sample was imaged using APIC imaging method and FPM imaging method. Red, green and blue LEDs were used to acquire dataset for these three different channels and then applied APIC for the reconstruction. In this experiment, the sample was placed at a fixed height in the data acquisition process. As a result, different levels of defocus are shown in different channels lying on top of the chromatic aberrations of the objective. A 40× objective was used to acquire the ground truth image. The illumination angles were calibrated for the central patch (side length: 512 pixels) and then the angles were calculated for off-axis patches using geometry. This calibrated illumination angles were used as input parameter data in reconstruction. The reconstructed color image is shown in FIG. 16. The comparison of all three channels is discussed in Section VI (C).

FIG. 16 depicts constructed high-resolution images of hematoxylin and cosin (H&E) stained breast cancer cells resulted from using APIC imaging method according to embodiments and FPM imaging method for comparison. For each group, FPM reconstructions are shown in the lower left and APIC reconstructions are shown in the upper right. The zoomed images of the amplitude and phase reconstructions are shown on the right of each boxes. Scale bar for the zoomed images: 5 μm.

From the zoomed images in FIG. 16, the reconstructions of FPM appeared noisy for the blue channel. FPM did not appear to work well with this weakly absorptive sample under a relatively high aberration level. FPM appeared to not be able to extract the aberration of the imaging system. As such, the color image generated by FPM appeared grainy and the high spatial frequency information were only partially recovered. The color reconstruction of APIC retained all high spatial frequency features that were closely matched up with the ground truth. This demonstrates that the aberration and complex field reconstruction of APIC appears to be more accurate as compared with FPM.

In the experiments discussed in this Section, an APIC imaging method of certain implementations was shown to be able to extract relatively large aberrations and synthesize a large FOV and higher resolution images using low NA objectives.

APIC methods advantageously avoid problems with conventional phase retrieval algorithms, such as being prone to optimization parameters and getting stuck in a local minimum. As APIC techniques directly solve for the complex field, they advantageously avoid a potentially time-consuming iterative process. APIC techniques may provide high-resolution and large field-of-view label-free imaging with robustness to aberrations. As an analytical method, APIC is insensitive to parameter selections and can compute the correct imaging field without getting trapped in local minimums. APIC's analyticity is particularly important in a range of exacting applications, such as digital pathology, where even minor errors are not tolerable. APIC guarantees the correct solution while other iterative methods cannot. Additionally, APIC brings new possibilities to label-free computational microscopy as it affords greater freedom in the use of engineered pupils for various imaging purposes. APIC techniques use of the known spectrum to reconstruct the unknown spectrum may be adapted for other uses.

V. APIC System Calibration

In some embodiments, an APIC imaging method includes a calibration procedure, which may be performed once for a particular APIC imaging system. In some implementations, the calibration procedure determines the illumination angle of each tilted illumination for each intensity measurement. This information determines the area of the sample's spectrum being measured. The calibration procedure may use a circle-finding algorithm to find the exact illumination angle for the intensity measurements. In one example, brightfield measurements whose illumination angles are below the acceptance angle of imaging system may be collected as well. These brightfield measurements can be used for geometrically calibrating the angles associated with the darkfield measurements.

Figure 20:
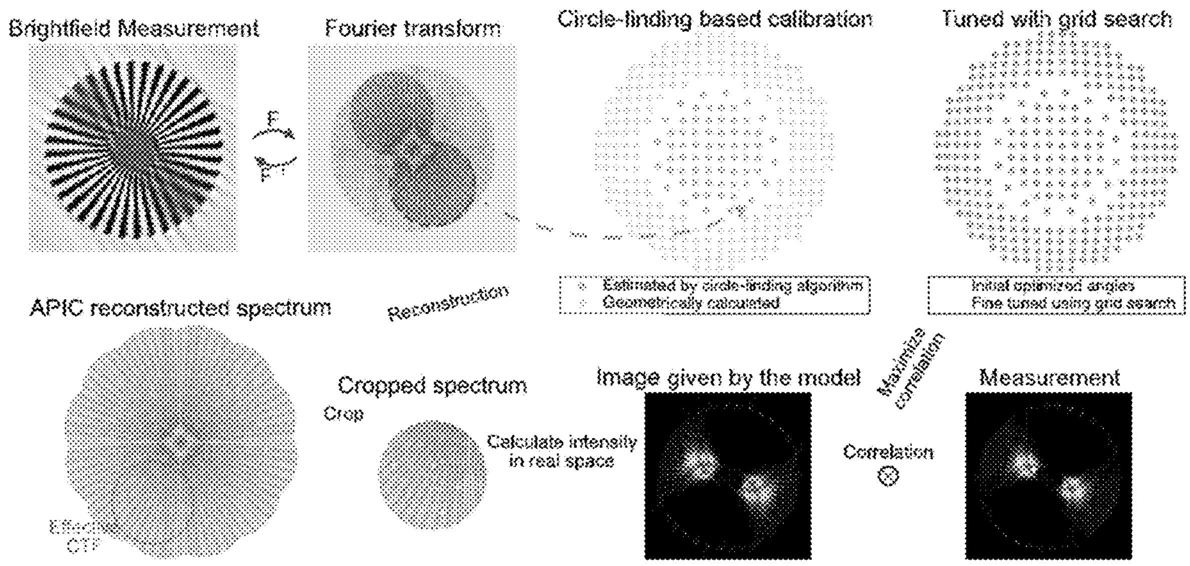
FIG. 20 depicts an illustration of autocorrelation, according to embodiments.

In some embodiments, a calibration procedure includes optimizing illumination angles by maximizing the correlation between the real measurements and the images obtained. For example, the calibration data can be used to reconstruct the complex field with the geometrically calculated darkfield LED illumination angle and then the reconstructed complex field can be used to optimize the illumination angle by searching over a pre-defined finer grid. Once this is done, the calibrated illumination angles may be fixed and used in the reconstruction process. FIG. 20 depicts a calibration process that optimizes the illumination angles, according to an embodiment. By locating the center of the circle in the Fourier transform of the measurement, the corresponding $k_i$ can be extracted in the spatial frequency domain. Using the separation of the LEDs on the array and the estimated brightfield LED illumination angles, the darkfield LED illumination angles can be calculated using the geometry.

In one calibration example, an illumination device was used that included an LED ring attached on top of an LED array. The LED ring was used for the NA-matching measurements. This illumination device was mounted on a motorized translational stage for height adjustment. The motorized translational stage was configured such that the tilt and height exactly matched the illumination angle of the ring LED and the maximum acceptance angle of the objective of the optical system. To find the exact height, the illumination device was moved toward the sample being imaged until the LED ring produced the darkfield measurement. Then, the illumination device was moved away gradually increasing the separation between the LED ring and the sample until the image under the ring LED illumination transitioned from darkfield to brightfield. The transition point indicated the desired height. Once the height and tilt of the system were fixed, calibration data was acquired and the illumination angles for all LEDS in the LED ring were calibrated with the calibration data. During the calibration process, the optical system mas configured with a high NA objective to measure the relative intensity of each LED with a blank slide. The high NA objective was used so that the incident light from any LED could directly enter the optical system. The calibration intensity measurements were normalized.

VI. APIC Reconstruction

Section V presents the forward model and APIC reconstruction according to various embodiments. In certain embodiments, APIC reconstruction includes (1) reconstructing a complex field for each of a plurality of NA-matching measurements (e.g., intensity measurements acquired under tilted illumination where illumination angles are equal to (match), or nearly match, a maximum acceptance angle of the collection optics of the imaging system acquiring the intensity measurements), (2) extracting a system aberration using the complex field spectrums as discussed in and correcting for aberration in the complex field spectrums using the extracted system aberration, and (3) expanding the sample spectrum using darkfield measurements. Some detail regarding reconstructing a complex field spectrum for each of a plurality of NA-matching measurements is discussed in subsection V(B) below. Some detail regarding extracting a system aberration using the complex field spectrums is discussed in subsection V(C). Some detail regarding expanding the sample spectrum using darkfield measurements is discussed in subsection V(D). In alternate embodiments, an APIC reconstruction method may omit the operations involving extracting and correcting for aberrations. In other alternate embodiments, an APIC reconstruction method may omit expanding the complex field using darkfield measurements and simply extracts and corrects for the system aberration. The extracted aberration may be used to correct for other type of images such as fluorescence image acquired using the same optical imaging system (e.g., objectives).

In certain embodiments, an APIC reconstruction method includes (1) reconstructing complex field spectrums using NA-matching measurements, (2) extracting a system aberration and correcting for aberrations in the reconstructed spectrums, and (3) expanding the known sample spectrum using darkfield measurements. In some embodiments, Kramers-Kronig relations may be employed to reconstruct the complex fields from NA-matching measurements. Using the reconstructed fields, the system aberration can be retrieved. The extracted aberration may then be applied to correct the currently reconstructed aberrated fields and the subsequent darkfield associated field reconstructions. The aberration corrected reconstructed complex field can serve as initial a priori knowledge, referred to as the known field, and its Fourier transform as the known spectrum. To achieve high-resolution imaging, darkfield measurements may be incorporated and used to expand the reconstructed sample spectrum in an orderly way. At each sub-step, a new spectrum may be reconstructed corresponding to an unused darkfield measurement whose illumination angle is the smallest among all remaining unused measurements. This newly reconstructed spectrum, together with the original reconstructed spectrum, can serve as the new a priori knowledge in subsequent reconstructions. To recover the field associated with one darkfield measurement, focus on the spatial frequency space and form a linear equation with respect to the unknown spectrum. By solving this linear equation, a closed-form solution of the unknown spectrum sampled in this darkfield measurement can be obtained. Adding this newly reconstructed spectrum effectively expands the sample spectrum coverage to achieve higher resolution. After all measurements are reconstructed, a high-resolution, aberration-free complex field reconstruction may be obtained.

In Section V, APIC techniques are described with reference to system components of APIC system 100 in FIGS. 1A-1B. It would be understood that these aspects may apply to system components of other embodiments such as those illustrated in FIGS. 7, 8A-8B, 9, 10, 11, and 12. Also, the described aspects may be practiced without one or more of the specific details set forth in this section.

A. The Forward Model

When a thin specimen is illuminated by a plane wave emitted by an $i^{th}$ (where i=1, 2, . . . , n) laser emitting diode (LED) or another illumination source with a transverse k-vector, $k_i$, and then imaged an APIC imaging system, the modulated sample spectrum is given by:

$$\hat{S}_i(k) = \hat{O}(k - k_i)H(k) \quad \text{(Eqn. 1)}$$

where H is the coherent transfer function (CTF) associated with the optical system, Ô is the original sample's spectrum, $\hat{S}_i$ is the $i^{th}$ sampled spectrum, and k is the 2D (transverse) spatial frequency vector. Reciprocally, the spatial coordinate is denoted on the sample plane with x. Without loss of generality, it is assumed that Ô(0) is a real number. For a thin specimen, it can be assumed further that the majority of the incident illumination light does not change its original direction. That is, at any position x:

$$|(\mathcal{F}^{-1}[\hat{O}(k)\delta(k)])(x)| > |[\mathcal{F}^{-1}(\hat{O}(k)[1-\delta(k)])](x)| \quad \text{(Eqn. 2)}$$

where $\mathcal{F}^{-1}$ is the inverse Fourier transform, $[\mathcal{F}^{-1}(\cdot)]$ (x) means the inverse Fourier transform is evaluated at x, $|\cdot|$ gives the modulus of a complex number, and δ(k) is the Kronecker delta as follows:

$$\delta(k) = \begin{cases} 1, & k = 0, \\ 0, & \text{otherwise} \end{cases} \quad \text{(Eqn. 3)}$$

The physical meaning of this assumption is that the ballistic light exiting from the sample plane is dominant over the scattering light almost everywhere within the field of view.

As only the intensity of the light field is directly measured, the signal measured by the radiation detector of the APIC system is:

$$I_i(x) = \left|[\mathcal{F}^{-1}(\hat{S}_i)](x)\right|^2 = |S_i(x)|^2 \quad \text{(Eqn. 4)}$$

where $I_i$ is the $i^{th}$ intensity image captured when lighting up the $i^{th}$ LED, and $S_i$ denotes the $i^{th}$ sampled field in real space (the inverse Fourier transform of $\hat{S}_i$).

This intensity measurement is insensitive to phase shift applied to the inverse Fourier transform:

$$\left|[\mathcal{F}^{-1}(\hat{S}_i)](x)e^{j\xi(x)}\right|^2 = \left|[\mathcal{F}^{-1}(\hat{S}_i)](x)\right|^2 = I_i(x) \quad \text{(Eqn. 5)}$$

where ξ(x) stands for an arbitrary phase function and j is the unit imaginary number. Thus, a particular phase ramp can be selected, namely $-2\pi k_i \cdot x$, which effectively shifts $\hat{S}_i$ along the opposite direction of $k_i$.

Using the properties of Fourier transform when applying this special phase ramp, the measured intensity image is identical to the intensity of the inverse Fourier transform of the following (translated) spectrum:

$$\hat{S}'_i(k) = [\mathcal{F}(S'_i)](k) = \left[\hat{S}_i * \mathcal{F}\left(e^{-j2\pi k_i \cdot x}\right)\right](k) = \hat{O}(k)H(k + k_i) \quad \text{(Eqn. 6)}$$

where · is the dot product, $S'_i(x) := S_i(x)e^{-2\lambda j k_i \cdot x}$, and * is convolution. This forward model suggests that different components of sample's spectrum can be measured with different illumination angles. By increasing the illumination angle, higher spatial frequency information can effectively be sampled, where such information may normally be inaccessible due to the limitations of the numerical aperture (NA) of the optical system.

The coherent transfer function (CTF) of the optical system of the APIC imaging system can be assumed to be circular with a NA-dependent radius, $k_{NA}$, and the phase $\phi$ of the CTF function depicts the system's aberration. For simplicity, the term "NA" or "system NA" used in Section V represents this radius $k_{NA}$. This provides:

$$H(k) = Circ_{NA}(k)e^{j\phi(k)} = \left(\mathbb{1}(|k| \leq NA)e^{j\phi(k)}k\right) \quad \text{(Eqn. 7)}$$

$$\delta(k) = \begin{cases} e^{j\phi(k)}, & \text{if } |k| \leq NA, \\ 0, & \text{otherwise} \end{cases}$$

where $\phi(k)$ stands for the system's aberration, and $Circ_{NA}(k) := \mathbb{1}(|k| \leq NA)$ is an indicator function that is equal to one when the modulus of the k-vector is below the system NA and is zero otherwise.

The sample spectrum $\hat{O}(k)$ can be further decomposed to its amplitude and phase. Together with Eqn. 7, Eqn. 6 can be written as:

$$\hat{S}_i'(k) = \hat{O}(k)H(k + k_i) = \hat{A}(k)e^{j\hat{\alpha}(k)}Circ_{NA}(k + k_i)e^{j\phi(k+k_i)} \quad \text{(Eqn. 8)}$$

where $\hat{A}(k) := [\hat{O}(k)] \in \mathbb{R}$ is the amplitude of the sample's spectrum and $\hat{\alpha}(k) := \arg \hat{O}(k) \in \mathbb{R}$ is its phase (the operator arg gives the argument of a complex number).

In the following subsections B-D, based on Eqn. 6, a closed form solution to the sample's spectrum, $\hat{O}(k)$, is obtained and a technique is shown for analytically retrieving the aberration, $\phi(k)$, of an APIC imaging system. This methodology uses NA-matching (e.g., $|k_i|=NA$) and dark-field measurements (e.g., $|k_i|>NA$). For simplicity, it is assumed that $|k_i|>NA$ and k is sequentially ordered so that $|k_i| \leq |k_{i+1}|$.

B. Complex Field Reconstruction for NA-Matching Angle Illumination

In certain embodiments, an APIC reconstruction method includes reconstructing the complex field spectrums using the NA-matching intensity measurements acquired when the illumination angles are equal to (match), or nearly match, the maximal acceptance angle of the optical system in the Fourier domain. In some cases, the Kramers-Kronig methodology may be employed to reconstruct the complex field spectrums from the NA-matching measurements. However, the Kramers-Kronig method does not take into account system aberration. In the complex field reconstruction method discussed in this subsection, aberration is taken into account, which is advantageous over existing techniques that do not consider aberration in their complex field reconstruction. The reconstruction can be performed by employing Eqn. 32.

In this subsection, only the first $n_0$ measurements whose k-vector $k_i$ that satisfy Eqn. 9 below are considered:

$$|k_i| = NA,\ i = 1, 2, \ldots, n_0, \text{ where } n_0 := \max_i |k_i| = NA \quad \text{(Eqn. 9)}$$

These measurements are the NA-matching measurements used in this subsection. In this subsection, a signal is constructed whose Fourier transform is one-sided (which will be defined later in this subsection), and it will be shown that this allows for the calculation of the imaginary part of the signal from its real part based on the fact that the Fourier transform is a linear operator. This constructed signal can then be mapped back to the desired complex field. This approach can also be generalized to higher dimensional spaces. Although this methodology allows for analytical complex field reconstruction, it was found that both the desired sample's field and the aberration function of the imaging system are entangled in the reconstructed field.

The goal is computing the imaginary part of a complex signal from its real part using, e.g., Kramers-Kronig relations. In order to do so, the real part must be known first. However, the APIC system only takes measurements of the intensity (squared modulus) of a complex field, which is neither its real or imaginary part. To solve this mismatch, a nonlinear transformation is applied that maps the intensity and phase of a complex number to the real and imaginary part of its output, respectively. This can be done by taking the logarithm of a nonzero complex number. Applying this to the complex field $S'_i(x)$ in a point-wise manner, it is found:

$$\log[S_i'(x)] = \log[|S_i'(x)|] + j\arg[S_i'(x)] \quad \text{(Eqn. 10)}$$

The nonzero condition is guaranteed by Eqn. 2. Note that the first term on the right-hand side is purely real and the second term is purely imaginary. $I_i(x)$ are the intensity measurements.

As the intensity $I_i(x)=|S_i(x)|^2=|(S)_i(x)\cdot e^{-2\pi jk_i\cdot x})|^2=|S'_i(x)|^2$ is measured, everything is known about the real part of $\log S'_i(x)$. What remains is to verify that its imaginary part can be reconstructed using this known real part.

Below it is shown that the Fourier transform of this transformed signal is "one-sided." Such structure allows one to perform the desired reconstruction.

For any positive integer $m \in \mathbb{Z}^+$, we say $g: \mathbb{R}^m \to \mathbb{C}$ if there exists a nonzero vector $e \in \mathbb{R}^m$, $e \neq 0$ such that its Fourier transform $\hat{g}$ satisfies:

$$\hat{g}(k) = 0,\ \forall\, k \in \mathbb{R}^m \text{ s.t. } k \cdot e < 0 \quad \text{(Eqn. 11)}$$

Hence, g is said to be strictly one sided if $(k)=0$, $\forall k \in \mathbb{R}^m$s.t.$\cdot e \leq 0$.

To show that the transform signal is one sided, the "offset" field, R (x), is factored out. R (x) is the field that does not change its direction:

$$\mathcal{R}(x) = \left(\mathcal{F}^{-1}\left[\hat{S}_i'(k)\delta(k)\right]\right)(x) = \left(\mathcal{F}^{-1}\left[\hat{O}(k)H(k+k_i)\delta(k)\right]\right)(x) = re^{j\phi(k_i)} \quad \text{(Eqn. 12)}$$

where $r$ is real. When the "offset" field is factored out from $S_i'(x)$:

$$\frac{S_i'(x)}{\mathcal{R}(x)} = \frac{S_i'(x)}{re^{j\phi(k_i)}} = \frac{S_i'(x)e^{-j\phi(k_i)}}{r} \quad \text{(Eqn. 13)}$$

It is seen that $\phi(k_i)$ serves as a phase offset and r can be treated as a normalization factor. Note that r and $\phi(k_i)$ are unknowns, and only intensity of $S_i(x)$ is measured. Thus, below focuses primarily focus on the "offset" field, $S'_i(x) e^{-j\phi(k_i)}$, because adding a phase offset to a complex field does not change its intensity.

Applying the logarithm transformation to the "offset" field, $S'_i(x) e^{-j\phi(k_i)}$:

$$\log[S'_i(x)e^{-j\phi(k_i)}] = \log\left[\frac{S'_i(x)e^{-j\phi(k_i)}}{r}\right] + \log(r) = \log\left[1 + \frac{S'_i(x)e^{-j\phi(k_i)} - r}{r}\right] + \log(r) \quad \text{(Eqn. 14)}$$

With the assumption that the majority of the light does not change its direction (Eqn. 2) the "offset" field is larger than the sample modulated field $r=|\mathcal{R}(x)|>|S'_i(x)-\mathcal{R}(x)|=|S'_i(x)-re^{-j\phi(k_i)}|$. So, $r>|S'_i(x)e^{-j\phi(k_i)}-r||e^{-j\phi(k_i)}|=|S'_i(x)e^{-j\phi(k_i)}-r|$. The first term on the right-hand side can be written as a convergent Taylor series (which will make it easier to analyze the structure of its Fourier transform as discussed below):

$$T(x) := \log\left[1 + \frac{S'_i(x)e^{-j\phi(k_i)} - r}{r}\right] + \sum_{m=1}^{\infty} \frac{(-1)^{m+1}}{m} \frac{[S'_i(x)e^{-j\phi(k_i)} - r]^m}{r^m} \quad \text{(Eqn. 15)}$$

Note that this applies to all x. For simplicity, $\Delta_i(x)$ is defined as:

$$\Delta_i(x) := S'_i(x)e^{-j\phi(k_i)} - r = [S'_i(x) - re^{-j\phi(k_i)}]e^{-j\phi(k_i)} = [S'_i(x) - \mathcal{R}(x)]e^{-j\phi(k_i)} \quad \text{(Eqn. 16)}$$

And, Eqn. 14 can be rewritten as:

$$\log[S'_i(x)e^{-j\phi(k_i)}] = \log(r) + T(x) = \log(r) + \sum_{m=1}^{\infty} \frac{(-1)^{m+1}}{m} \frac{\Delta_i^m(x)}{r^m} \quad \text{(Eqn. 17)}$$

The Fourier transform of $\Delta_i(x)$ yields:

$$\hat{\Delta}_i(k) := [\mathcal{F}(\Delta_i)](k) = [\mathcal{F}([S'_i(x) - \mathcal{R}(x)]e^{-j\phi(k_i)})](k) = \hat{S}'_i(k)[1 - \delta(k)]e^{-j\phi(k_i)} \quad \text{(Eqn. 18)}$$

For $x\in\mathbb{R}^2$, and letting $f_1(x)$: $\mathbb{R}^2\to\mathbb{C}$ and $f_2(x)$:: $\mathbb{R}^2\to\mathbb{C}$ be two complex $l_2$ function with Fourier transform $\hat{f}_1(k)$ and $\hat{f}_2(k)$, respectively. Assume there exists a (common) nonzero vector $e\in\mathbb{R}^2 e\neq 0$ such that:

$$\hat{f}_1(k) = \hat{f}_2(k) = 0, \forall k \text{ s.t. } k\cdot e < 0 \quad \text{(Eqn. 19)}$$

then their product $f'(x)=f_1(x)f_2(x)$ is one sided. Furthermore, if $f_1$ and $f_2$ are strictly one sided (with the same e), their product is also strictly one sided.

To prove this, the Fourier transform is taken of both sides, which yields:

$$\hat{f}'(k) = [\mathcal{F}(f')](k) = [\mathcal{F}(f_1 f_2)](k) = ([\mathcal{F}(f_1)] * [\mathcal{F}(f_1)])(k) = [\hat{f}_1 * \hat{f}_2](k) \quad \text{(Eqn. 20)}$$

For $k_0\in\mathbb{R}^2$ such that $k_0\cdot e<0 (e\neq 0)$, it is shown:

$$\hat{f}'(k_0) = [\hat{f}_1 * \hat{f}_2](k_0) = \int dk' \hat{f}_1(k')\hat{f}_2(k_0 - k') = \int_{k'\cdot e<0} dk' \hat{f}_1(k')\hat{f}_2(k_0 - k') + \int_{k'\cdot e\geq 0}\int dk' \hat{f}_1(k')\hat{f}_2(k_0 - k') \quad \text{(Eqn. 21)}$$

If $k'\cdot e<0$, $\hat{f}_1(k')=0$. If $k'\cdot e\geq 0$, $(k_0-k')\cdot e=k_0\cdot e-k'\cdot e<0$. As $f_1$ and $f_2$ are both one sided and share the same e:

$$\hat{f}'(k_0) = \int_{k'\cdot e<0} dk' \hat{f}_1(k')\hat{f}_2(k_0 - k') + \int_{k'\cdot e\geq 0} dk' \hat{f}_1(k')\hat{f}_2(k_0 - k') = 0, \forall k_0 \text{ s.t. } k_0\cdot e < 0 \quad \text{(Eqn. 22)}$$

That is, f' is one sided. The proof for $f_1$ and $f_2$ being strictly one sided follows the same structure. To see that, the integration for $k'\cdot e\leq 0$ and $k'\cdot e>0$ is calculated and then it can be proven the strict version with the same technique.

It is seen that that $\Delta_i(x)$ is one sided. To show this, it is chosen that $e=-k_i$. As the illumination angle is matched with NA (Eq. 9), it is verified that for arbitrary k such that $k\cdot e<0$:

$$|k + k_i| = \sqrt{|k|^2 + |k_i|^2 + 2k\cdot k_i} = \sqrt{|k|^2 + |k_i|^2 - 2k\cdot e} > \sqrt{|k_i|^2} = NA \quad \text{(Eqn. 23)}$$

The last equality holds because of the interest in the NA-matching angle illumination condition (Eqn. 9) in this subsection. So, $H(k+k_i)=0$ for all k subject to $k_0\cdot k_0\cdot e=k\cdot(-k_i)<0$. It can then be proved that $\Delta_i$ is one sided:

$$\hat{\Delta}_i(k) = \hat{S}'_i(k)[1 - \delta(k)]e^{-j\phi(k_i)}$$
$$\hat{O}_i(k)H(k + k_i)[1 - \delta(k)]e^{-j\phi(k_i)} = 0, \forall k \text{ s.t. } k\cdot(-k_i) < 0 \quad \text{(Eqn. 24)}$$

Furthermore, for $k\cdot e=-k\cdot k_{ib=0}$, e $k\perp k_i$. When $k\neq 0$, the above two equations still hold. It is only needed to consider the special case, namely k=0. At k=0:

$$\hat{\Delta}_i(0) = \hat{S}'_i(0)[1 - \delta(0)]e^{-j\phi(k_i)} = \hat{S}'_i(0)(1 - 1)e^{-j\phi(k_i)} = 0 \quad \text{(Eqn. 25)}$$

That is, $\Delta_i$ is strictly one sided. Using Eqn. 19, it can be concluded that the Taylor series (the last term on the right-hand side of Eqn. 17) is strictly one sided by induction.

If one were to want to directly use $S_i$ instead, the "offset" field should be modified as $re^{2\pi jk_ix+j\phi(k_i)}$. This is because the original model uses tilted illumination, so the unchanged light field is associated with an incident angle. With such modification, one can verify it gives an identical result.

Here, it has been proved that the transformed signal $$\log\left[S_i'(x)e^{-j\phi(k_i)}\right]$$

is one sided (it is easy to see that $$\log[S_i'(x)]$$

is also one sided, as $e^{-j\phi(k_i)}$ is a constant). Below it is shown that such special structure allows one to reconstruct the imaginary part from the real part of the signal.

A modified version of Eqn. 10:

$$\log\left[S_i'(x)e^{-j\phi(k_i)}\right] = \log\left[\left|S_i'(x)e^{-j\phi(k_i)}\right|\right] + j\arg\left[S_i'(x)e^{-j\phi(k_i)}\right] = \log[|S_i'(x)|] + j(\arg[S_i'(x)] - \phi(k_i)) = \log(r) + \Re[T(x)] + j\Im[T(x)] \quad \text{(Eqn. 26)}$$

where the last equality follows from Eqn. 17, $\Re(\cdot)$ denotes the real part of a complex number, and $\Im(\cdot)$ denotes the imaginary part. The Fourier transform exhibits even symmetric for a real signal and odd symmetric for an imaginary signal, and so:

$$[\mathcal{F}(\log|S_i'|)](k) = [\mathcal{F}(\log|S_i'|)]^*(-k) \quad \text{(Eqn. 27)}$$

and $$[\mathcal{F}(j[\arg(S_i') - \phi(k_i)])](k) = -[\mathcal{F}(j[\arg(S_i') - \phi(k_i)])]^*(-k) \quad \text{(Eqn. 28)}$$

where * in the superscript denotes complex conjugate. Since it is already proved that $\log[S'_i(x)e^{-j\phi(k_i)}]$ is one sided:

$$\left[\mathcal{F}\left(\log\left[S_i'e^{-j\phi(k_i)}\right]\right)\right](k) = [\mathcal{F}(\log|S_i'|)](k) + [\mathcal{F}(j[\arg(S_i') - \phi(k_i)])](k) = 0 \quad \text{(Eqn. 29)}$$

$$[\mathcal{F}(j\,[\arg(S_i') - \phi(k_i)])](k) = -[\mathcal{F}(\log|S_i'|)](k),\ \forall\,k \text{ s.t. } k\cdot(-k_i) < 0$$

For $k\cdot(-k_i)>0$, symmetry can be used to conclude:

$$[\mathcal{F}(j[\arg(S_i') - \phi(k_i)])](k) = [F(\log|S_i'|)](k),\ \forall\,k \text{ s.t. } k\cdot(-k_i) > 0 \quad \text{(Eqn. 30)}$$

As T(x) is strictly one sided, its Fourier transform is zero for all k such that $k \perp k_j$. Moreover, the Fourier transform of constant log (r) is a real (Dirac delta) function centered at zero. In other words, the Fourier transform of log (r) has no imaginary part. So:

$$[\mathcal{F}(j[\arg(S_i') - \phi(k_i)])](k) = 0,\ \forall\,k \text{ s.t. } k\cdot(-k_i) = 0 \quad \text{(Eqn. 31)}$$

By collecting all pieces from the above three equations and noticing $$I_i(x) = |S_i'(x)|^2$$

$$\left[\mathcal{F}\left(\log\left[S_i'e^{-j\phi(k_i)}\right]\right)\right](k) = \begin{cases} 2\,[\mathcal{F}(\log|S_i'|)](k) = [\mathcal{F}(\log I_i)](k), & k\cdot k_i < 0, \\ [\mathcal{F}(\log|S_i'|)](k) = \frac{1}{2}[\mathcal{F}(\log I_i)](k), & k\cdot k_i = 0, \\ 0, & k\cdot k_i > 0 \end{cases} \quad \text{(Eqn. 32)}$$

That is, the complex field can be reconstructed using its real part $$\log\left|S_i^i\right|.$$

The desired field (up to a constant phase offset) can then be restored with inverse Fourier transform and applying exponential function to each point of the inverse Fourier transform:

$$S_i'(x)e^{-j\phi(k_i)} = \exp\left[\left(\mathcal{F}^{-1}\left[\mathcal{F}\left(\log\left[S_i'e^{-j\phi(k_i)}\right]\right)\right]\right)(x)\right] \quad \text{(Eqn. 33)}$$

If there is no aberration in the system $$\phi(k) \equiv 0,\ S_i'(x) = \hat{O}(k)\,Circ_{NA}(k + k_i)$$

and the phase offset $\phi(k_i)=0$.

C. Aberration Extraction

This subsection discusses the principle underlying a procedure for extracting the system aberration from the complex field spectrums reconstructed from the NA-matching intensity measurements, according to certain embodiments.

Subsection V(B) ends with the reconstruction of $$S_i'(x)e^{-j\phi(k_i)}.$$

Looking at its spectrum:

$$\hat{S}_i'(k)e^{-j\phi(k_i)} = \hat{O}(k)H(k + k_i)e^{-j\phi(k_i)} = \hat{A}(k)e^{j\hat{\alpha}(k)}Circ_{NA}(k + k_i)e^{j\phi(k+k_i) - j\phi(k_i)} \quad \text{(Eqn. 34)}$$

As can be seen from Eqn. 34, the sample's spectrum and the system's aberration function are superimposed in the reconstruction. For a practical imaging system with aberration, this is not yet a reconstruction of a clean sample spectrum. Instead it is an aberrated version of the desired spectrum.

Without correction, aberrations of an imaging system, including defocus due to sample's height unevenness, can degrade reconstruction quality. This can be tackled by working in the spatial frequency domain (that is, working with the spectrum). As shown below, aberration of the system can be analytically solvable by considering the phases of the reconstructed spectrums.

To extract the aberration from the reconstructed spectrums, the procedure separates the contribution from the sample itself and the imaging system. This can be achieved by considering the phases of multiple reconstructed spectrums.

First, the overlap of two spectrums is defined. For two reconstructed spectrums $$\hat{S}_i'(k)$$

and $$\hat{S}_l'(k),$$

a set $\mathcal{C}_{il}$ is defined as:

$$C_{il} := \{k \in \mathbb{R}^2 \mid H(k+k_i)H(k+k_l) \neq 0\} \quad \text{(Eqn. 35)}$$

These two spectrums are overlapped if the set $\mathcal{C}_{il}$ is nonempty ($\mathcal{C}_{il} \neq \emptyset$) and the overlap between $$\hat{S}_i'(k)$$

and $$\hat{S}_l'(k)$$

is $\mathcal{C}_{il}$.

Consider two spectrums $$\hat{S}_i'(k)$$

and $$\hat{S}_l'(k)$$

with (nonempty) overlap $\mathcal{C}_{il} \neq \emptyset$. The phase difference within the overlapped region $\mathcal{C}_{il}$ gives:

$$\arg\left[\hat{S}_i'(k)e^{-j\phi(k_i)}\right] - \arg\left[\hat{S}_i'(k)e^{-j\phi(k_l)}\right] = [\hat{\alpha}(k) + \phi(k+k_i) - \phi(k_i)] - [\hat{\alpha}(k) + \phi(k+k_l) - \phi(k_l)] = \phi(k+k_i) - \phi(k_i) - \phi(k+k_l) + \phi(k_l) = [\phi(k+k_i) - \phi(k+k_l)] - [\phi(k_i) - \phi(k_l)], \quad \text{(Eqn. 36)}$$

if $$k \in C_{il}$$

The first term $\phi(k+k_i)-\phi(k+k_l)$ on the right-hand side is referred to as the "aberration difference," and the last term $\phi(k_i)-\phi(k_l)$ is referred to as "the offset." When considering the phase difference of the two spectrums, the contribution from the sample spectrum cancels out and the difference depends solely on the system's aberration. It can be seen that the remaining phase difference is linear with respect to the aberration function. As such, a linear operator can be constructed that maps the aberration into phase differences of two overlapping spectrums. To do so, the 2D spectrum is rearranged into a vector.

FIG. 17 is a diagram depicting an original spectrum 1711 of the sample, Ô(k), and a phase difference between two individual spectrums 1712, 1714 with overlap, according to an implementation. The original spectrum 1711 includes six individual spectrums corresponding to a plurality of six (6) NA-matching illumination angles. For aberration extraction, one or more illumination sources (e.g., LEDs) are used whose illumination k vector matches with the maximal receiving angle of the imaging system $k_i$=NA. In the illustrated example, the illumination sources are LEDs. For illustration purposes, l=i+1 is selected as the LEDs are lit up along an annulus. The original spectrum 1711 includes a plurality of six overlapping spectrums including a first constructed spectrum 1712 and a second constructed spectrum 1714 with overlap. Ô(k) stands for the original sample's spectrum, $S'_i(k)$ is the acquired spectrum under i th illumination, and H(k) is the coherent transfer function (CTF). Illustration 1720 depicts the aberration of first constructed spectrum 1712 and illustration 1721 depicts the aberration of second constructed spectrum 1714. Illustration 1730 depicts the sample's phase of first constructed spectrum 1712 and illustration 1731 depicts the sample's phase of second constructed spectrum 1714. Illustration 1750 depicts the aberration of first constructed spectrum 1712 at the overlap between the first constructed spectrum 1712 and second constructed spectrum 1714. Illustration 1751 depicts the aberration of second constructed spectrum 1714 at the overlap between the first constructed spectrum 1712 and second constructed spectrum 1714. Illustration 1760 depicts the sample's phase of first constructed spectrum 1712 at the overlap between the first constructed spectrum 1712 and second constructed spectrum 1714. Illustration 1761 depicts the sample's phase of second constructed spectrum 1714 at the overlap between the first constructed spectrum 1712 and second constructed spectrum 1714. As shown, in the overlapping region between individual spectrums 1712 and 1714, the phase of the sample cancels out and the phase difference of the shifted CTF solely contributes to the measured phase difference. As shown in the illustration 1790, the phase difference in the overlapping portion is a linear combination of the system aberration. The phase difference is linearly dependent on the system aberration. Thus, an operator can be determined that accounts for the shift induced phase difference and this operator can be used to recover the imaging system's aberration.

Assume B is a m×t matrix, then a "flattening" operator, $\text{Flat}_{m,t}$, can be defined which concatenates every column of B and produces a vector of length mt. $\mathcal{B}$ denotes this flattened vector:

$$\mathcal{B} = \text{Flat}_{m,t}(B) \in \mathbb{R}^{mt\times 1} \qquad \text{(Eqn. 37)}$$

and $$\mathcal{B}[i_1 + (i_2 - 1)m] = B(i_1, i_2)$$

An inverse operator, Flat $$^{-1}_{m,t},$$

can be defined which restores the matrix when applied to the flattened vector:

$$B = \text{Flat}^{-1}_{m,t}(\mathcal{B}) \qquad \text{(Eqn. 38)}$$

Assuming the sample spectrum acquired is a N×N matrix, $$\hat{S}'_i \in \mathbb{C}^{N\times N}$$

can be the matrix form of the sampled spectrum, and $\phi \in \mathbb{R}_{N\times N}$ the matrix form of the aberration. The corresponding flattened version is then $\hat{\mathcal{S}}'_i = \text{Flat}_{N,N}(\hat{S}'_i) \in \mathbb{C}^{N^2\times 1}$, and $\varphi = \text{Flat}_{N,N}(\phi) \in \mathbb{R}^{N^2\times 1}$, respectively.

Let $K_u, K_v \in \mathbb{R}^{N\times N}$ be the spatial frequency grid (with zero frequency at $[c_0, c_0] = (\lceil N/2 \rceil, \lceil N/2 \rceil)$, where $\lceil N/2 \rceil$ is the smallest integer that is larger than N/2) for the sampled spectrum, where u and v denotes two orthogonal direction. Let $K_u, K_v \in \mathbb{R}^{N^2\times 1}$ be their flattened vectors $K_u = \text{Flat}_{N,N}(K_u)$ and $K_v = \text{Flat}_{N,N}(K_v)$. For simplicity, let K(m), m∈{1,2, . . . , $N^2$} denote k vector in grid, which is defined as:

$$K(m) := [K_u(m), K_v(m)] \qquad \text{(Eqn. 39)}$$

Additionally, an index set $\mathfrak{T}_{il}$ is defined by:

$$\mathcal{I}_{il} := \{m = 1, 2, \ldots, N^2 \mid K(m) \in C_{il}\} \qquad \text{(Eqn. 40)}$$

Let $|\mathfrak{T}_{il}|$ be the cardinal of set $\mathfrak{T}_{il}$ and also abuse the notation such that $\mathfrak{T}_{il}(m)$ indicate the m th smallest element in $\mathfrak{T}_{il}$. For the transverse illumination k-vector $k_i$(i=1, 2, . . . , n), its grid representation is denoted as $\kappa_i$.

With this notation, a difference operator $D_{il} \in \mathbb{R}^{|\mathfrak{T}_{il}|\times N^2}$ is designed. When acting on φ, it is desired that this operator to calculate the aberration difference $\phi(k+k_1)-\phi(k+k_1)$ associated with $\hat{\mathcal{S}}'_i$ and $\hat{\mathcal{S}}'_i$ (each row corresponds to one specific choice of k). Based on this principle, a value 1 is assigned to the place that corresponds to phase $\phi(k+k_1)$ and a value −1 to the place that corresponds to phase $\phi(k+k_1)$ for every row of $D_{il}$. That is to say, the operator $D_{il}$ is constructed as:

$$D_{il}(i_1, i_2) = \begin{cases} 1, & \text{if } K(i_2) = K[\mathcal{I}_{il}(i_1)] + \kappa_i \\ -1, & \text{if } K(i_2) = K[\mathcal{I}_{il}(i_1)] + \kappa_l \\ 0, & \text{otherwise} \end{cases} \qquad \text{(Eqn. 41)}$$

The operator is shown to calculate the aberration difference:

$$D_{il}\varphi = \begin{bmatrix} \phi(K[\mathcal{I}_{il}(1)] + \kappa_i) - \phi(K[\mathcal{I}_{il}(1)] + \kappa_l) \\ \phi(K[\mathcal{I}_{il}(2)] + \kappa_i) - \phi(K[\mathcal{I}_{il}(2)] + \kappa_l) \\ \vdots \\ \phi(K[\mathcal{I}_{il}(|\mathcal{I}_{il}|)] + \kappa_i) - \phi(K[\mathcal{I}_{il}(|\mathcal{I}_{il}|)] + \kappa_l) \end{bmatrix} \qquad \text{(Eqn. 42)}$$

Let $$\hat{\mathcal{S}}'_i[\mathfrak{T}_{il}] (i = 1, 2, \ldots, n)$$

be a $\mathbb{R}^{|\mathfrak{T}_{il}|\times 1}$ vector which is defined as $$\hat{\mathcal{S}}'_i[\mathcal{I}_{il}] := [\hat{\mathcal{S}}'_i[\mathcal{I}_{il}(1)], \hat{\mathcal{S}}'_i[\mathcal{I}_{il}(2)], \hat{\mathcal{S}}'_i[\mathcal{I}_{il}(3)], \ldots, \hat{\mathcal{S}}'_i[\mathcal{I}_{il}(|\mathcal{I}_{il}|)]]^T \qquad \text{(Eqn. 43)}$$

where T in the superscript denotes ordinary transpose. Simplifying the expression of $D_{il}\varphi$:

$$D_{il}\varphi = \arg(\hat{\mathcal{S}}'_i[\mathcal{I}_{il}]) - \arg(\hat{\mathcal{S}}'_l[\mathcal{I}_{il}]) + [\phi(k_i) - \phi(k_l)] \qquad \text{(Eqn. 44)}$$

Note $\phi(k_i)-\phi(k_l)$ is a constant. To account for this constant, an offset operator $$D^0_{il} \in$$

$\mathbb{R}^{|\mathfrak{I}_{il}|\times N^2}$, is defined where a 1 is assigned to place that corresponds to $k_i$ and −1 to $k_l$. That is, $$D^0_{il}(i_1, i_2) = \begin{cases} 1, & \text{if } K(i_2) = \kappa_i \\ -1, & \text{if } K(i_2) = \kappa_l \\ 0, & \text{otherwise} \end{cases} \qquad \text{(Eqn. 45)}$$

When acting on φ, this offset operator gives:

$$D^0_{il}\varphi = \begin{bmatrix} \phi(k_i) - \phi(k_l) \\ \phi(k_i) - \phi(k_l) \\ \vdots \\ \phi(k_i) - \phi(k_l) \end{bmatrix} \qquad \text{(Eqn. 46)}$$

Thus, $D_{il}$ and $$D^0_{il}$$

can be used to express the total phase difference between $$\hat{\mathcal{S}}'_i$$

and $$\hat{S}'_l,$$

which gives:

$$(D_{il} - D^0_{il})\varphi = \arg(\hat{S}'_i[\mathcal{I}_{il}]) - \arg(\hat{S}'_l[\mathcal{I}_{il}]) \quad \text{(Eqn. 47)}$$

For different pairs of spectrums with overlap, those equations can be concatenated, which yields:

$$D\varphi = \beta_\Delta, \quad \text{(Eqn. 48)}$$

Where:

$$D := \begin{bmatrix} D_{i_1 l_1} - D^0_{i_1 l_1} \\ D_{i_2 l_2} - D^0_{i_2 l_2} \\ \vdots \\ D_{i_m l_m} - D^0_{i_m l_m} \end{bmatrix}$$

and $$\beta_\Delta := \arg\begin{pmatrix} \hat{S}'_{i_1}[\mathcal{I}_{i_1 l_1}] \\ \hat{S}'_{i_2}[\mathcal{I}_{i_2 l_2}] \\ \vdots \\ \hat{S}'_{i_m}[\mathcal{I}_{i_m l_m}] \end{pmatrix} - \arg\begin{pmatrix} \hat{S}'_{l_1}[\mathcal{I}_{i_1 l_1}] \\ \hat{S}'_{l_2}[\mathcal{I}_{i_2 l_2}] \\ \vdots \\ \hat{S}'_{l_m}[\mathcal{I}_{i_m l_m}] \end{pmatrix}$$

Instead of directly solving for the aberration term, a Zernike polynomial is used to represent the aberration of the system. Thus, the Zernike operator $Z \in \mathbb{R}^{N^2 \times z}$, is introduced where z is the number of Zernike coefficients to be reconstructed and each column of Z represents a particular Zernike mode. With Zernike decomposition, the aberration of the imaging system is given by:

$$\varphi = Zc \quad \text{(Eqn. 49)}$$

where $c \in \mathbb{R}^{z \times 1}$ is the corresponding Zernike coefficient. Using Zernike decomposition, Eq. 48 can be rewritten as:

$$\beta_\Delta = D\varphi = DZc \quad \text{(Eqn. 50)}$$

The above linear equation (or the associated normal equation) can be solved to get the analytical solution of the Zernike coefficient c. The 2D aberration $\phi$ of the APIC imaging system is then given by:

$$\phi = \mathrm{Flat}^{-1}_{N,N}(\varphi) = \mathrm{Flat}^{-1}_{N,N}(Zc) \quad \text{(Eqn. 51)}$$

In reality, some spatial frequencies in the spectrum may have a stronger signal than other frequencies. It may be advantageous to emphasize those frequencies in the spectrum as they may have a higher signal-to-noise ratio (SNR). Thus, in some implementations, a weight matrix W may be employed to emphasize places with high SNR. This gives:

$$(WDZ)c = W\beta_\Delta \quad \text{(Eqn. 52)}$$

In one implementation, the logarithm of the modulus of the product $\hat{S}_i(k)\hat{S}_l(k)$ can be used as a weight matrix.

In some cases, the phase difference of two spectrums might exceed $2\pi$. Thus, phase differences may be first unwrapped and then solved using Eqn. 52 to extract the aberration of the imaging system.

D. Reconstruction Extending Spectrum Using Darkfield Measurements

Since the aberration of the imaging system (system aberration) may be fully determined by the aberration extraction procedure discussed in subsection C, the contribution of the aberration term can be removed from the reconstructed spectrums determined by the reconstruction procedure discussed in subsection B.

In subsection B, the (modified) sampled spectrums were reconstructed under NA-matching angle illumination based on Eqns. 32 and 33. This means the following is known for all $|k_i|$=NA:

$$\hat{S}'_i(x)e^{-j\phi(k_i)} = \hat{O}(k)H(k+k_i)e^{-j\phi(k_i)} = \hat{O}(k)Circ_{NA}(k+k_i)e^{j\phi(k+k_i)-j\phi(k_i)} \quad \text{(Eqn. 53)}$$

As the last phase factor $ee^{j\phi(k\alpha k_i)-j\phi(k_i)}$ entirely depends on the aberration, the aberration can now be corrected and a clean sample spectrum extracted, which yields:

$$\hat{O}(k)Circ_{NA}(k+k_i). \quad \text{(Eqn. 54)}$$

This basically means that a piece of the sample spectrum region covered by the CTF support was recovered for each NA-matching intensity measurement. Thus, these reconstructed regions can be stitched for a larger coverage in the spatial frequency domain. That is, the coverage of the reconstructed $\hat{O}(k)$ can be gradually expanded in the spatial frequency domain. Let us define the sampled region $\mathcal{M}_m$ that denotes the spectrum covered by the first $m^{th}$ measurements $$\mathcal{M}_m := \{k \in \mathbb{R}^2 \mid \exists i \in 1, 2, \ldots, m, Circ_{NA}(k+k_i) \neq 0\} \quad \text{(Eqn. 55)}$$

The mask $\mathcal{M}_m$ is defined which denotes the effective sampling mask for the first mth measurements $$M_m(k) := \mathbb{1}(k \in \mathcal{M}_m) = \begin{cases} 1, & \text{if } k \in \mathcal{M}_m \\ 0, & \text{otherwise} \end{cases} \quad \text{(Eqn. 56)}$$

Assuming the complex spectrum can be reconstructed for every measurement, the reconstructed complex sample spectrum $\hat{R}_m(k)$ using the first m th measurements can be expressed by:

$$\hat{R}_m(k) := \hat{O}(k)M_m(k) \qquad \text{(Eqn. 57)}$$

After aberration correction, the reconstructed spectrum, $\hat{R}_{n_o}(k)=\hat{O}(k)M_{n_o}((k)$, was obtained using NA-matching measurements, i=1,2, . . . , $n_o$. For $i>n_o$, the corresponding illumination angle that exceeds the maximal acceptance angle of the optical system was applied, darkfield (see Eqn. 9 for the definition of no) measured.

In this subsection, it is shown that if the sampled spectrum at i th illumination $$\hat{S}_i'(i > n_0)$$

consists of previously reconstructed (a priori) spectrum and another unknown part, the unknown part can be reconstructed using the known spectrum.

Let us decompose the sampled spectrum $$\hat{S}_i'$$

into the unknown and known part, assuming all previous measurements are reconstructed, which means $\hat{R}_{i-1}(k)=\hat{O}(k)M_{i-1}(k)$ is known. The known spectrum $\hat{\mathcal{P}}_i(k)$ at this substep is given by:

$$\hat{\mathcal{P}}_i(k) = \hat{R}_{i-1}(k)H(k+k_i) = \hat{O}(k)H(k+k_i)M_{i-1}(k). \qquad \text{(Eqn. 58)}$$

Then, the unknown part $\hat{U}_i(k)$ is $$\hat{U}_i(k) = \hat{S}_i'(k) - \hat{\mathcal{P}}_i(k) = \hat{O}(k)H(k+k_i) - \hat{O}(k)H(k+k_i)M_{i-1}(k) = \hat{O}(k)H(k+k_i)[1 - M_{i-1}(k)] \qquad \text{(Eqn. 59)}$$

Let Supp($f$) be the support of function $f:\mathbb{R}^2 \to \mathbb{C}$, which is a set given by:

$$Supp(f) := \{x \in \mathbb{R}^2 \mid f(x) \neq 0\} \qquad \text{(Eqn. 60)}$$

By construction of $\hat{\mathcal{P}}_i(k)$ and $\hat{U}_i(k)$, it is easy to see that $\hat{\mathcal{P}}_i(k)\neq 0$ suggests $\hat{U}_i(k)=0$, and vice versa. Thus, $\hat{\mathcal{P}}_i(k)$ and $\hat{U}_i(k)$ have disjoint support. Based on Eqns. 5 and 6, the measured intensity of one darkfield measurement (darkfield intensity measurement) can be expressed as $$I_i(x) = |[\mathcal{F}^{-1}(\hat{S}_i')](x)|^2 = |[\mathcal{F}^{-1}(\hat{U}_i + \hat{\mathcal{P}}_i)](x)|^2 = |U_i(x) + \mathcal{P}_i(x)|^2 = U_i(x)U_i^*(x) + U_i(x)\mathcal{P}_i^*(x) + \mathcal{P}_i(x)U_i^*(x) + \mathcal{P}_i(x)\mathcal{P}_i^*(x) \qquad \text{(Eqn. 61)}$$

where $\mathcal{P}(x):=[\mathcal{F}^{-1}(\hat{\mathcal{P}}_i](x)$ and $U(x):=[\mathcal{F}^{-1}(\hat{U}_i](x)$ are the known field and the unknown field, respectively. Using the property of Fourier transform, the Fourier transform of $I_i$ can be written as:

$$[\mathcal{F}(I_i)](k) = [\hat{U}_i \star \hat{U}_i](k) + [\hat{U}_i \star \hat{\mathcal{P}}_i](k) + [\hat{\mathcal{P}}_i \star \hat{U}_i](k) + [\hat{\mathcal{P}}_i \star \hat{\mathcal{P}}_i](k) \qquad \text{(Eqn. 62)}$$

where * denotes correlation. As the known spectrum is a priori, its auto-correlation can be subtracted from the Fourier transform of the intensity measurement, which yields:

$$[\mathcal{F}(I_i)](k) - [\hat{\mathcal{P}}_i \star \hat{\mathcal{P}}_i](k) = [\hat{U}_i \star \hat{U}_i](k) + [\hat{U}_i \star \hat{\mathcal{P}}_i](k) + [\hat{\mathcal{P}}_i \star \hat{U}_i](k) \qquad \text{(Eqn. 63)}$$

The two cross-terms are linear with respect to $\hat{U}_i$ as correlation is a linear operator. If considering one cross term, it naturally leads to a linear equation with respect to $\hat{U}_i$, which can be solved analytically. However, those three remaining terms cannot be easily separated due to the existence of the desired unknown part.

In the remaining part of this subsection, it is shown that the above three terms have different supports, as depicted in FIG. 18. Therefore, the non-overlapping part can be isolated, which allows for the construction of a linear equation with respect to $\hat{U}_i$.

FIG. 18 depicts a schematic illustration of the complex field reconstruction using a plurality of darkfield measurements to extend the known sample spectrum, according to embodiments. In this visualization, the sampled spectrum 1810 is centered, which is basically a cropped version of the spectrum translation model (Eqn. 6). The sampled spectrum 1810 is shown decomposed into two disjointed regions, an unknown spectrum 1812 and a known spectrum 1814. That is, sampled spectrum (not directly measured) 1810 consists of the previously reconstructed known sample spectrum 1814 and an unknown part 1812. The unknown part of the darkfield measurement can be reconstructed using the known reconstructed sample spectrum 1814.The Fourier transform of the darkfield measurement can be decomposed into four terms: an autocorrelation of the unknown spectrum 1842, a first cross-correlation term 1844, a second cross-correlation term 1846, and an auto-correlation of the known spectrum 1848. A Fourier transform of the (directly measured) darkfield intensity measurement 1820 provides a Fourier transformed darkfield intensity measurement 1830, the spectrum of the darkfield measurement. As the known part of the spectrum of the darkfield measurement is given, the intensity of the corresponding field can be calculated by reverse Fourier transform. Upon subtracting the auto-correlation of the known spectrum 1842 from the Fourier transform of the (directly measured) darkfield intensity measurement 1830, three terms are left: the autocorrelation of an unknown spectrum 1842, a first cross-correlation term 1844, and a second cross-correlation term 1846. A portion 1852 of the second cross-correlation term 1846 does not overlap with the autocorrelation of unknown spectrum 1842 or with the first cross-correlation term 1844. This portion 1852 can be extracted by discarding (setting to zero) regions covered by the possible nonzero area of the autocorrelation of unknown spectrum 1842 and the first cross-correlation term 1844 in the result of subtracting the auto-correlation of the known spectrum 1848 from the spectrum of the darkfield intensity measurement 1830. The portion 1852 is a linear combination of unknown parts. A linear equation (e.g., part of a correlation operator) may be obtained with respect to the unknown part 1852 of the darkfield measurement. This linear equation may be used to form a closed-form solution of an unknown part 1812 of the sample spectrum from each darkfield measurement. The unknown parts (e.g., portions at higher frequencies) determined from multiple darkfield measurements can be filled into the sample spectrum in, e.g., a sample spanning procedure, to extend the sample spectrum (e.g., the sample spectrum stitched together from complex field spectrums constructed from the NA-matching measurements). A reverse Fourier transform of the extended sample spectrum yields a higher resolution image (i.e., with higher resolution than the NA-matching intensity measurements or the darkfield measurements).

In the APIC system 100 shown in FIGS. 1A and 1B, the same radiation detector (e.g., camera) is used to acquire both darkfield and NA-matching measurements. Thus, each intensity measurement is a matrix of fixed size. The matrix representation of the original sample's spectrum $R_m$ is nevertheless a much larger matrix. The physical picture is that the tilt illumination translates the sample spectrum in the spatial frequency domain, as the initial forward model Eqn. 1 suggests, so that different spatial frequencies of sample spectrum is moved into this smaller measurement related grid and then gets sampled. This is equivalent to cropping out a specific region of the sample spectrum and moving the cropped part to the center when applying the pupil translation model in Eqn. 6. In following discussion, the matrix representations of both the unknown and the known spectrum are assumed to be centered, thus having the same dimension as the measurement.

Focusing on $[\hat{\mathcal{P}}_i * \hat{U}_i](k)$ and let $\mathcal{Q}_i$ be the non-intersecting set, which is defined as:

$$Q_i := \{k \in \mathbb{R}^2 \mid k \in Supp(\hat{\mathcal{P}}_i \star \hat{U}_i) \setminus [Supp(\hat{U}_i \star \hat{\mathcal{P}}_i) \cup Supp(\hat{U}_i \star \hat{U}_i)]\} \quad \text{(Eqn. 64)}$$

By construction:

$$[\mathcal{F}(I_i)](k) - [\hat{\mathcal{P}}_i \star \hat{\mathcal{P}}_i](k) = [\hat{\mathcal{P}}_i \star \hat{U}_i](k),\ \forall\, k \in Q_i \quad \text{(Eqn. 65)}$$

The masked subtraction as $L_i$, is defined as:

$$L_i(k) := ([\mathcal{F}(I_i)](k) - [\hat{\mathcal{P}}_i \star \hat{\mathcal{P}}_i](k))\mathbb{1}(k \in Q_i) = \begin{cases} [\hat{\mathcal{P}}_i \star \hat{U}_i](k), & \text{if } k \in Q_i \\ 0, & \text{otherwise} \end{cases} \quad \text{(Eqn. 66)}$$

Let $\hat{U}_i \in \mathbb{C}^{N \times N}$ be the matrix version of the (centered) unknown part and $\hat{U}_i \in \mathbb{C}^{N^2 \times 1}$ be its flattened vector $\hat{\mathcal{U}}_i = \mathrm{Flat}_{N,N}(\hat{U}_i)$, $L_i \in \mathbb{C}^{N \times N}$ be the (centered) matrix version of $L_i$ and $\mathcal{L}_i \in \mathbb{C}^{N^2 \times 1}$ be its flattened vector $\mathcal{L}_i = \mathrm{Flat}_{N,N}(L_i)$, and $\hat{\mathcal{P}}_i$ be the (centered) matrix version of the known part. In general, the correlation of two matrices of size N×N would be a matrix of size (2N−1)×(2N−1). Based on the Nyquist theorem, the nonzero part of $\hat{U}_i + \hat{\mathcal{P}}_i$ is contained in a N/2×N/2 box. As a consequence, the correlation of $\hat{U}_i$ and $\hat{\mathcal{P}}_i$ can be calculated using a N×N grid.

Let us construct a (sparse) correlation operator $C_i$ that takes all nonzero elements in the unknown spectrum $\hat{\mathcal{U}}_i$ and gives $\mathcal{L}_i$. First, focus on the $t_1$ th row and $t_2$ th column of $L_i$, which corresponds to m th element of vector $\mathcal{L}_i$, where $m = t_1 + N(t_2 - 1)$ and $t_1, t_2 \in 1, 2, \ldots, N$. Let $$t_1' = t_1 - c_0$$

and $$t_2' = t_2 - c_0.$$

Then, (recall that in Eq. 39 K is defined as the grid version of the k vector and also $K_u(c_0, c_0) = K_v(c_0, c_0) = 0$):

$$\mathcal{L}_i(m) = \begin{cases} [\hat{\mathcal{P}}_i \star \hat{U}_i][K(m)] & \text{if } K(m) \in Q_i \\ 0, & \text{otherwise} \end{cases} = \begin{cases} \displaystyle\sum_{i_1 = max\{1, 1+t'_1\}}^{min\{N, N+t'_1\}} \sum_{i_2 = max\{1, 1+t'_2\}}^{min\{N, N+t'_2\}} \hat{\mathcal{P}}_i^*(i_1 - t_1', i_2 - t_2')\hat{U}_i(i_1, i_2), & \text{if } K(m) \in Q_i \\ 0, & \text{otherwise} \end{cases} \quad \text{(Eqn. 67)}$$

For $K(m) \in \mathcal{Q}_i$i, a matrix $$G_i^m \in \mathbb{C}^{N \times N}$$

can be constructed that is defined as:

$$G_i^m(i_1, i_2) := \begin{cases} \hat{\mathcal{P}}_i^*(i_1 - t_1', i_2 - t_2'), & \text{if } \max\{1, 1 + t_\zeta'\} \le i_\zeta \le \min\{N, N + t_\zeta'\}, \zeta \in 1, 2 \cdot \\ 0, & \text{otherwise} \end{cases} \quad \text{(Eqn. 68)}$$

With this definition:

$$\mathcal{L}_i(m) = \begin{cases} [\mathrm{Flat}_{N,N}(G_i^m)]^T \hat{\mathcal{U}}_i, & \text{if } K(m) \in Q_i \\ 0, & \text{otherwise} \end{cases} \quad \text{(Eqn. 69)}$$

An index set $\mathfrak{L}_i$ is defined that denotes this special region that is linear in $\hat{\mathcal{U}}_i$:

$$\mathfrak{L}_i := \{m = 1, 2, \ldots, N^2 \mid K(m) \in Q_i\} \quad \text{(Eqn. 70)}$$

The notation is abused so that $\mathfrak{L}_i(m)$ indicates the m th smallest element in $\mathfrak{L}_i$ and define $\mathcal{L}_i(\mathfrak{L}_i)$ as $$\mathcal{L}_i(\mathfrak{L}_i) := [\mathcal{L}_i[\mathfrak{L}_i(1)], \mathcal{L}_i[\mathfrak{L}_i(2)], \ldots, \mathcal{L}_i[\mathfrak{L}_i(|\mathfrak{L}_i|)]]^T \quad \text{(Eqn. 71)}$$

where $|\mathfrak{L}_i|$ is the cardinal of $\mathfrak{L}_i$. A correlation operator can then be constructed. Let $$C_i^F \in \mathbb{C}^{|\mathcal{L}_i| \times N^2}$$

be a $|\mathfrak{L}_i| \times N^2$ matrix and let its m th row $$C_i^F(m, \cdot)$$

be:

$$C_i^F(m, \cdot) = \left[\text{Flat}_{N,N}\left(G_i^{\mathfrak{L}_i(m)}\right)\right]^T \quad \text{(Eqn. 72)}$$

and then:

$$C_i^F \hat{\mathcal{U}}_i = \mathcal{L}_i(\mathfrak{L}_i) \quad \text{(Eqn. 73)}$$

FIG. 19 depicts a graphical illustration of the construction of a correlation operator $$C_i^F$$

1912, according to embodiments. For vector K(m) that admits a measurement that is linear in the unknown spectrum, an associated matrix $$G_i^m$$

is constructed. This matrix is constructed such that the correlation of the unknown and known part at K(m) equals $$\sum\nolimits_{i_1,i_2=1}^{N} \hat{U}_i(i_1, i_2) G_i^m(i_1, i_2),$$

the summation of the element-wise multiplication of this matrix and the unknown spectrum. The flattened vector of $$G_i^m$$

serves as one row of the correlation matrix $$C_i^F,$$

as illustrated in the figure.

By construction of the unknown spectrum $\hat{U}_i$, it is known that the only locations that it can be nonzero are where the following holds:

$$H(k + k_i)[1 - M_{i-1}(k)] \neq 0 \quad \text{(Eqn. 74)}$$

Using the above equation, it can be easily found that the corresponding nonzero elements in the flattened vector $\hat{\mathcal{U}}_i$. An index set $N_i$ is defined that consists of the indices of these nonzero elements:

$$N_i := \left\{ m = 1, 2, \ldots, N^2 \mid H[K(m) + \kappa_i](1 - M_{i-1}[K(m)]) \neq 0 \right\} \quad \text{(Eqn. 75)}$$

and let $N_i(m)$ be the m th smallest element in $N_i$, and $|N_i|$ be the cardinal of $N_i$. To construct the correlation operator $C_i$ that encodes the sparsity of the unknown spectrum, simply keep all columns of $$C_i^F$$

whose indices belong to set $N_i$ and throw away all other columns. This gives the definition of $C_i \in \mathbb{C}^{|\mathfrak{L}_i| \times |N_i|}$ $$C_i(i_1, m) := C_i^F[i_1, N_i(m)],\ i_1 = 1, 2, \ldots, |\mathfrak{L}_i| \text{ and } m = 1, 2, \ldots, |N_i| \quad \text{(Eqn. 76)}$$

Then, the following linear equation with respect to the nonzero elements of the unknown spectrum:

$$C_i \hat{\mathcal{U}}_i(N_i) = \mathcal{L}_i(\mathfrak{L}_i) \quad \text{(Eqn. 77)}$$

where $\hat{\mathcal{U}}_i(N_i) := \left[\hat{\mathcal{U}}_i[N_i(1)], \hat{\mathcal{U}}_i[N_i(2)], \ldots, \hat{\mathcal{U}}_i[N_i(|N_i|)]\right]^T$.

To solve this equation, it is required that the rank of matrix $C_i$ to be at least $|N_i|$. This can be satisfied if the known spectrum covers the semicircle of the circular CTF. Overlap criteria may be applied in certain embodiments. For example, the autocorrelation of a semicircle may be around 4 times larger than itself. If it is assumed that the CTF is of radius ro, and the known spectrum is a semicircle, the area of the unknown spectrum is then $$\frac{1}{2}\pi r_0^2.$$

For a circle (area is $$\pi r_0^2),$$

its autocorrelation is strictly 4 times larger in size (area is $$4\pi r_0^2).$$

Thus, the linear region has an area of:

$$\text{Area}(Q_i) = \frac{1}{2}\left[4\pi r_0^2 - \left(4r_0^2 + \pi r_0^2\right)\right] = \frac{3\pi r_0^2 - 4r_0^2}{2} \quad \text{(Eqn. 78)}$$

which is approximately 1.7 times larger than the area of the unknown part. That is, if the known spectrum occupies 50% of the spectrum, the rank of matrix $C_i$ can be well above $|N_i|$. Numerically, a safe choice is to let the unknown spectrum occupy over 42% of the measured spectrum, assume the CTF is circular.

FIG. 20 depicts an illustration of autocorrelation of a semicircle with radius $r_0$, according to embodiments. The shape of the autocorrelation result has an area of $$4r_0^2 + \pi r_0^2$$

which is around 4.5 times larger than the area enclosed by the semicircle.

By solving Eqn. 77, the closed-form solution of the unknown spectrum is obtained. That is, the following spectrum is reconstructed:

$$\hat{U}_i(k) = \hat{O}(k)H(k+k_i)[1 - M_{i-1}(k)] \quad \text{(Eqn. 79)}$$

As the aberration of the system is determined, the aberration can be corrected, which gives the aberration corrected spectrum $\hat{O}(k)\mathrm{Circ}_{NA}(k+k_i)[1-M_{i-1}(k)]$. Because the intensity of the field is directly measured in the darkfield measurement and the phase is unknown, the square root of this measured intensity is used as the modulus of the complex field for maintaining the (point-wise) energy and robustness.

Until now, it is shown that the complex spectrum sampled with i th illumination can be reconstructed using a priori knowledge of the known spectrum. The entire reconstructed spectrum can be expanded by integrating this newly reconstructed spectrum. The overall reconstructed spectrum using i th measurement is given by $\hat{O}(k)M_{i-1}(k)+\hat{O}(k)\,\mathrm{Circ}_{NA}(k+k_i)[1-M_{i-1}(k)]$, which is exactly $\hat{O}(k)M_i(k)$ by definition of $M_i(k)$. That is, an extended complex spectrum reconstuction $\hat{R}_i$ after darkfield reconstruction at the i th sub-step is obtained. This reconstructed field serves as our a priori knowledge in the reconstruction of the (i+1) th sub-step.

For a dense LED array, the area of the unknown spectrum can be quite small because their effective CTFs cover similar area for two closely spaced LEDs (Eq. 6). In such case, the new spectrum can be filled when it is necessary to solve the linear equation formed in Eq. 77 (e.g., when the system becomes undetermined if we do not fill in the new spectrum). By doing this, the spectrum reconstructions prior to the stitching process are independent and they have overlaps in the spatial frequency domain. Therefore, we can average over the overlap for improved robustness of the reconstruction algorithm.

Once the darkfield reconstruction is done for all measurements, we have reconstructed all sampled spectrums and the extended complex spectrum $\hat{R}_n$, which is our high-resolution, aberration-free complex field reconstruction.

VI. Additional Results

A. Comparison of APIC and FPM using Reduced Dataset

In one example, 316 images were used in a full dataset. In another example, 9 bright field measurements, 8 NA-matching measurements and 28 darkfield measurements were used in a reduced dataset. For the reduced dataset example, an FPM method used all forty five (45) measurements and the APIC method used 36 intensity measurements including 8 NA-matching measurements and 28 darkfield intensity measurements. The APIC imaging system 100 of FIGS. 1A and 1B were used to acquire the intensity measurements. An APIC imaging method of certain implementations and a conventional FPM imaging method were used to reconstruct images.

Figure 21A:
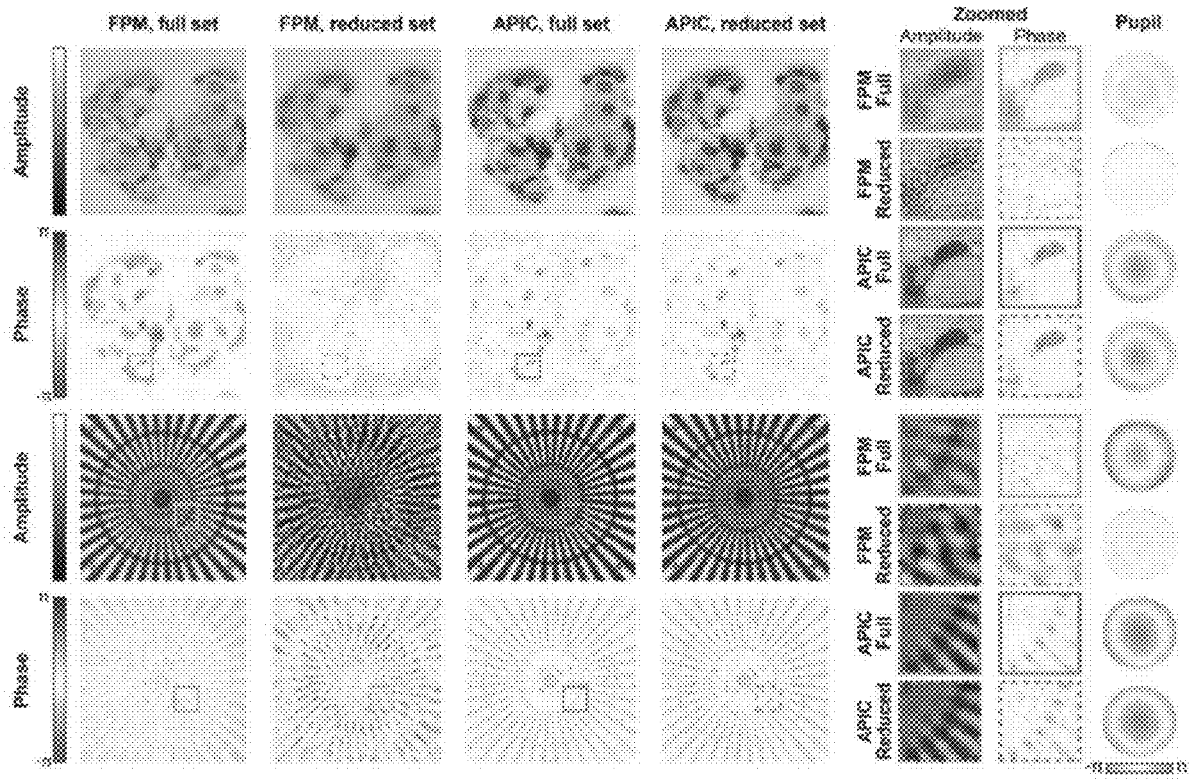
FIG. 21A depicts images reconstructed with both full dataset and reduced dataset using APIC imaging method according to embodiments and FPM imaging method for comparison.

FIG. 21A includes images reconstructed with both full dataset and reduced dataset using APIC imaging method according to embodiments and FPM imaging method for comparison. The full dataset is largely redundant as the overlap of two spectrum is around 86%. The nominal overlap ratio reduces to 65% for the reduced dataset. The specimen being imaged was a Siemens star target that was defocused by 16 μm. The zoomed images of amplitude and phase reconstructions of APIC and FPM are shown on the right, respectively.

B. Resolution Quantification

The APIC imaging system 100 of FIGS. 1A and 1B was used to acquire intensity measurements of a Siemens star target. The illumination device 110 was configured for illumination angles smaller than the acceptance angle of the objective 134. The illumination device 110 used red LED with a central wavelength of 632 nm. An APIC imaging method of certain implementations and a conventional FPM imaging method were used to reconstruct images.

Figure 21B:
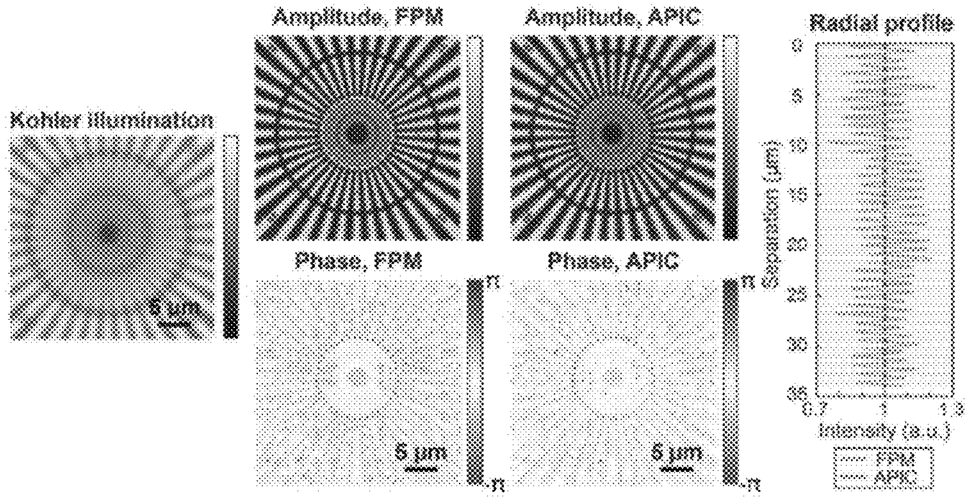
FIG. 21B depicts images reconstructed using APIC imaging method according to embodiments and FPM imaging method for comparison of resolution, according to embodiments.

FIG. 21B includes images reconstructed using APIC imaging method according to embodiments and FPM imaging method for comparison of resolution, according to embodiments. The reconstruction using in focus data and the reconstructed amplitude and phase of FPM and APIC are shown in the middle. The radial profiles along the circles highlighted in the reconstructed amplitude images are shown on the right. The radial profiles used a radius calculate where at least 10% contrast was preserved for any of the two reconstructed amplitude for the Siemens star target. The APIC and FPM images have similar radial profiles. The maximal illumination NA in this experiment is approximately 0.5 and the objective NA equals 0.25. The theoretical resolution of the imaging system is 842 nm. Using the radial profiles in FIG. 21B, the experimentally determined resolution achieved for both FPM and APIC is approximately 867 nm.

C. Reconstruction of Hematoxylin and Eosin Stained Sample

The APIC imaging system 100 of FIGS. 1A and 1B was used to acquire intensity measurements of hematoxylin and cosin (H&E) stained breast cancer cells. In this example, the illumination device 110 included a plurality of LEDs that were each configured for providing red, green, and blue illumination. APIC imaging method of a certain implementation (e.g., APIC method described with reference to FIG. 3) and a conventional FPM imaging method were used to reconstruct images.

Figure 22A:
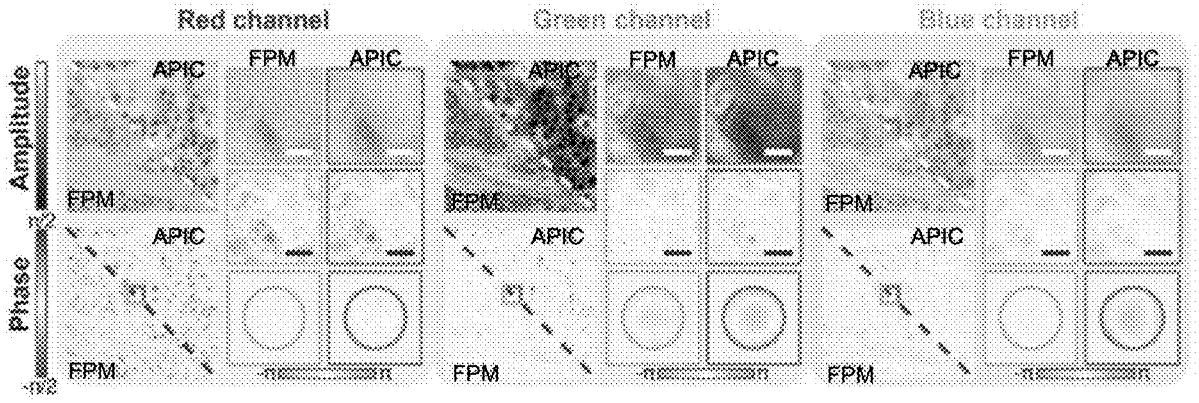
FIG. 22A depicts images of hematoxylin and eosin (H&E) stained breast cancer cells reconstructed using APIC imaging method according to embodiments and FPM imaging method for comparison.

FIG. 22A includes images of hematoxylin and cosin (H&E) stained breast cancer cells reconstructed using APIC imaging method according to embodiments and FPM imaging method for comparison. The complex field reconstructions and retrieved aberrations of a red channel, a green channel, and a blue channel are shown. The zoomed images of the amplitude and phase reconstructions are shown on the right of each boxes. Scale bar for the zoomed images: 5 μm. The quantitative phases of the APIC images appear more consistent among all three channels than for the FPM images.

D. Reconstruction Time

In this implementation, a computing device (e.g., computing device 780 in FIG. 7 or computing device 1280 in FIG. 12) in the form of a personal computer with 16 GB RAM and a CPU (e.g., Intel Core i5-8259U) was used for reconstructions. An APIC method of an implementation (e.g., APIC method described with reference to FIG. 3) was used for reconstruction. The reconstructions were performed on the computing device. The reconstructions were performed under different patch sizes. In this simulation, the overlap ratio was set to approximately 60%. The dataset consisted of 76 darkfield measurements and 16 NA-matching measurements. The FPM method was performed with the convergence criterion for first and second order FPM reconstruction methods as was used in other experiments and simulations discussed herein. A moderate aberration was added where the phase standard deviation of the simulated aberration is approximately 0.6 radian.

Figure 22B:
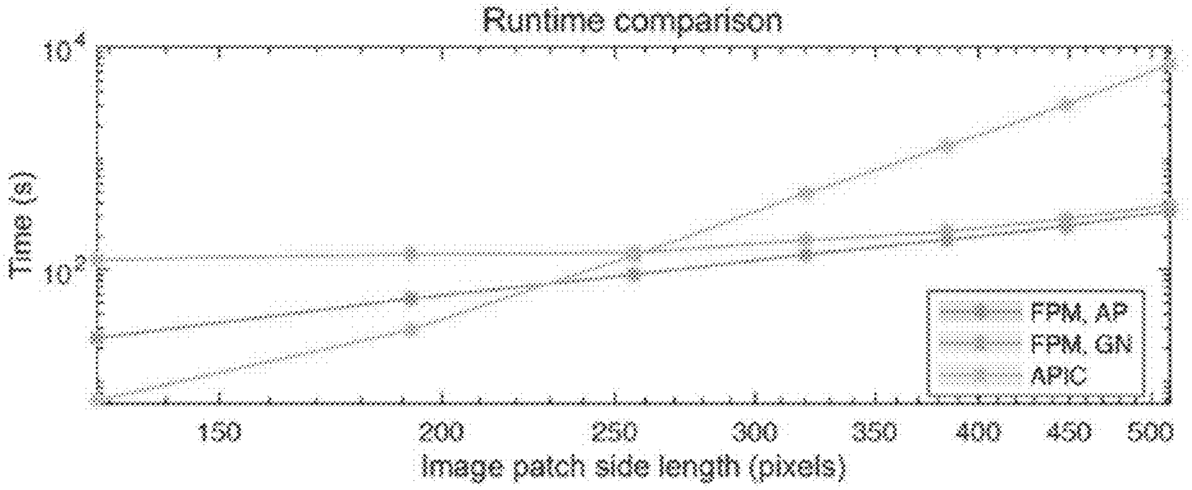
FIG. 22B depicts a plot of reconstruction runtime vs. image patch size for APIC imaging method according to embodiments and FPM for comparison.

FIG. 22B is a plot of reconstruction runtime vs. image patch size length (pixels) for APIC imaging method according to embodiments and FPM for comparison. For side length of the patch equals 256, the three methods required approximately the same amount of time to complete. The computation efficiency advantage of APIC for small patch size is in line with another important computational consideration, namely parallel processing. By splitting the whole image into smaller patches, more processors can be simultaneously used for APIC reconstruction.

E. Aberration Correction

Simulations under different aberration levels were conducted and an APIC method of an embodiment (e.g., APIC method described with reference to FIG. 3) used to reconstruct the complex field. A complex USAF target was used as the specimen being imaged and different aberrations were added to the intensity measurements. It was assumed the illumination angles were known and no noise was simulated. For the NA-matching angle illumination, 16 evenly spaced LEDs were simulated. The overlap ratio of two adjacent sampled spectrums is around 60%. The ground truth was generated by cropping the complex object spectrum using the sampled region Mn(k). In other words, the ground truth was the inverse Fourier transform of the spectrum O(k)Mn (k). To visually perceive different aberration levels, the image that would be obtained by the aberrated imaging system under the normal incidence illumination was also simulated. This normal incidence measurement was just for visualization and was not used in the APIC's reconstruction process. The reconstruction results are shown in FIG. 23A.

Figure 23A:
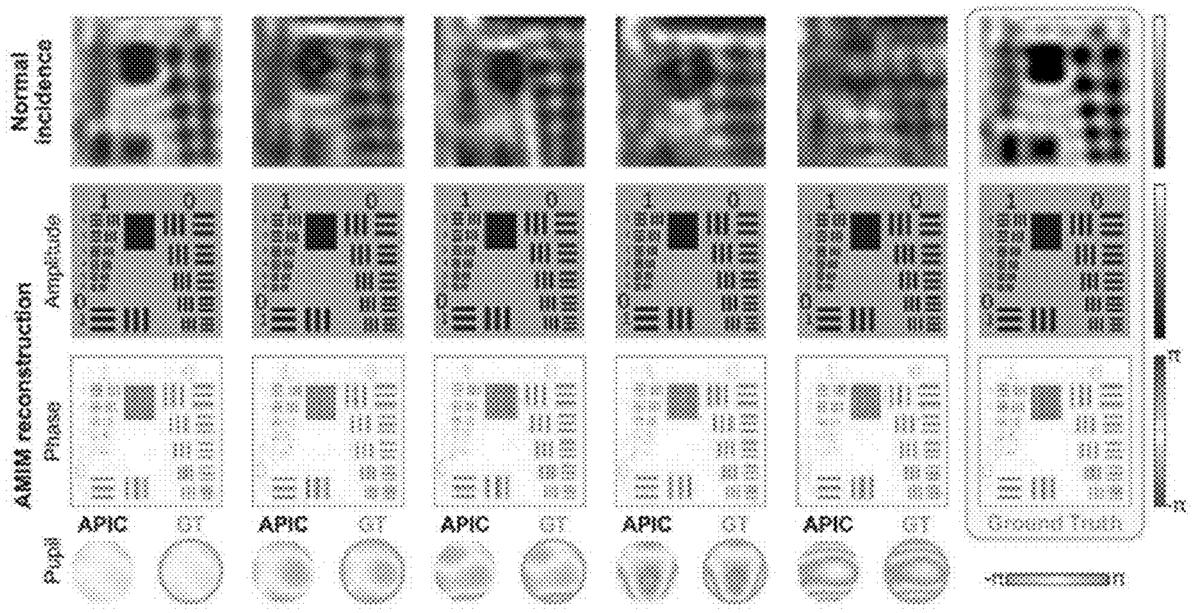
FIG. 23A depicts images reconstructed using an APIC imaging method under different levels of aberrations, according to embodiments.

FIG. 23A depicts images reconstructed using an APIC imaging method under different levels of aberrations, according to embodiments. The first row of images shows the corresponding raw intensity images under normal incidence with different levels of aberration. The second and third rows are the reconstructed amplitude and phase images, respectively. The last (bottom) row is the reconstructed aberration (pupil) and the actual (GT) simulated aberration. The last column shows the ground truth of object's amplitude and phase, as well as the image under normal incidence when captured by an aberration-free imaging system. The results shown in FIG. 23A indicate that the APIC imaging used is exceptionally tolerant against aberration and can accurately extract the aberration of the imaging system under extremely high aberration level (the largest phase standard deviation exceeds 1.5 $\pi$). The reconstructed phase and amplitude for all cases matched up with the ground truth.

For comparison, a conventional FPM imaging method was used for reconstruction with less aberration that used above. The same number of brightfield images were used for the reconstruction using the conventional FPM imaging method as were used for the APIC imaging method. The darkfield measurements were shared by FPM and APIC. Two different reconstruction algorithms were used for FPM, namely the original alternating projection algorithm (the original Gerchberg-Saxton algorithm combined with EPRY for aberration correction) and the second order Gauss-Newton method. The FPM reconstruction was conducted with 6 different sets of parameters. As the ground truth was known in our simulation, one of these parameter sets was manually selected to correspond closest to the ground truth.

Figure 23B:
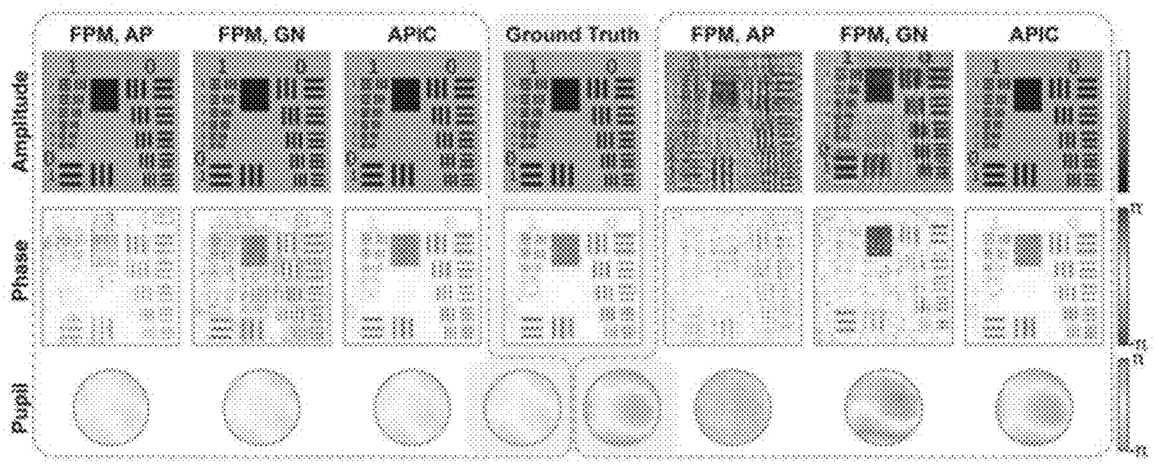
FIG. 23B depicts images reconstructed using an APIC imaging method according to embodiments and FPM imaging method for comparison.

FIG. 23B includes images reconstructed using APIC imaging method according to embodiments and FPM imaging method for comparison. AP denotes the alternating projection method (combined with EPRY) and GN denotes Gauss-Newton method. The ground truth of system's aberrations and the complex object are shown in the middle. In this simulation, two levels of moderate aberrations were applied. The results on the left correspond to the case where the gentler one among the two simulated aberration was used. The results on the right correspond to the more severe case.

From the simulation results, FPM worked well with mild aberrations. When the imaging system had a relatively small aberration (its phase standard deviation is approximately $0.15\pi$), both the original alternating projection method (implemented with EPRY for aberration correction) and the second order Gauss-Newton method successfully reconstructed the aberrations. Their amplitude reconstructions were also closely matched with the ground truth. The phase reconstruction of the second order method had better correspondence to the ground truth. When the aberration became more severe (standard deviation reaches $0.4\pi$), both FPM methods did not work. The second order FPM method worked slightly better than the first order algorithm as it partially reconstructed the high-frequency information. APIC, on the other hand, worked well at all these different levels of aberrations.

F. Comparison Under Different Signal-to-Noise Ratios

Simulations of an APIC method according to an embodiment (e.g., APIC method described with reference to FIG. 3) were run using different signal-to-noise ratios (SNRs) to see its performance under different scenarios. It was assumed the illumination angles were known and that an ideal aberration-free imaging system was used. Poisson noise was added in each measurement. The average number of photons for NA-matching measurements is shown on the top of FIG. 24. All other simulation parameters were the same.

Figure 24A:
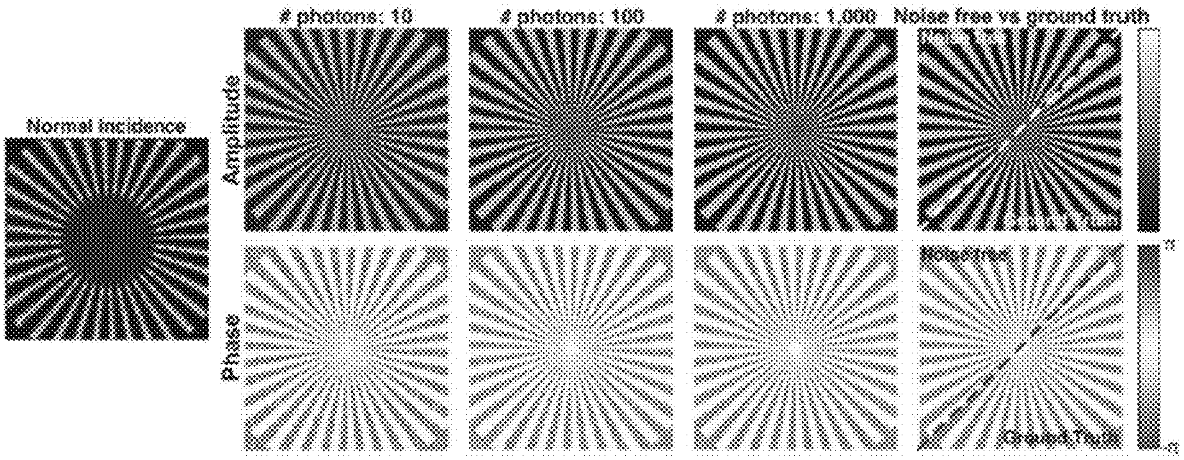
FIG. 24A depicts images reconstructed using an APIC imaging method under different signal-to-noise ratios (SNRs), according to embodiments.

FIG. 24A includes images reconstructed using an APIC imaging method under different signal-to-noise ratios (SNRs), according to embodiments. The measurement under normal incidence is shown on the far left, with no noise added. This measurement is for illustration purpose and is not used in APIC's reconstruction. Poisson noise was added to each measurement in this simulation. The numbers shown on the top are three average number of photons under NA matching angle illumination. When the average photons is 10 for the NA-matching measurements, the average number of photons for all darkfield measurements is around 0.11.

If no noise was added to the measurement, APIC method produced result that matched up with the ground truth. When the SNR was low, APIC method became more noisy and exhibited degraded resolution. Nonetheless, it preserved the high frequency details that were not captured in the normal incidence measurement.

Then another two simulations were conducted to compare APIC with FPM under different SNRs. As before, the NA-matching measurements were replaced with $n_0$ brightfield measurements to construct the dataset for FPM. All darkfield measurements were shared by APIC and FPM. For FPM, 6 different sets of parameters were chosen and the best results were selected in the simulation.

Figure 24B:
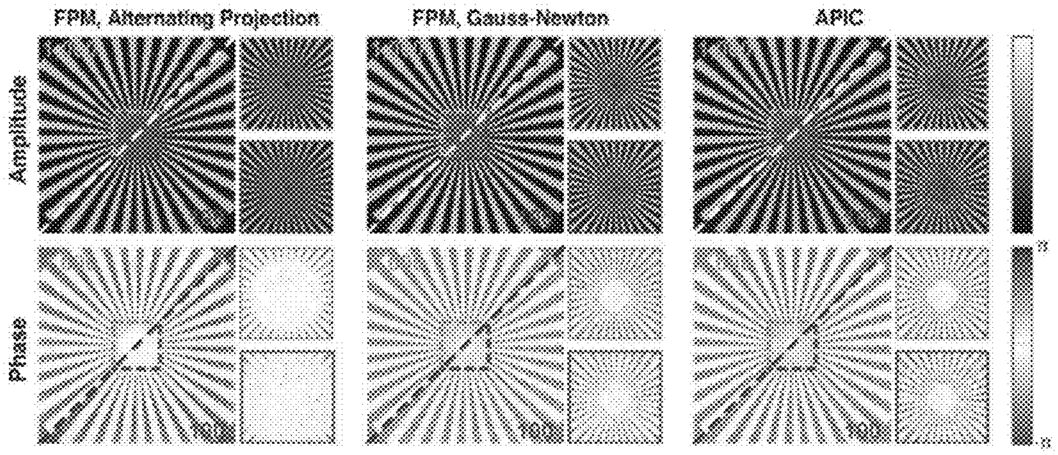
FIG. 24B depicts images reconstructed under different noise levels using APIC imaging method according to embodiments and FPM imaging method for comparison.

FIG. 24B includes images reconstructed under different noise levels using APIC imaging method according to embodiments and FPM imaging method for comparison. For each group, the upper left panel shows the reconstruction result when the average number of photons of NA-matching measurements is 1,000, and the lower right panel shows the result when the number is 100. The zoomed version of the result within the box is shown on the far right of each group. For FPM, reconstruction was performed using 6 different parameter sets and the best reconstruction result is shown.

In the first simulation, a complex Siemens star target was simulated and different levels of noise added to the simulated dataset. As shown in FIG. 24B, the second order FPM algorithm performs well under low SNR (when the average number of photons equals 100 for the NA-matching measurements). This iterative algorithm trades the reconstruction speed for the additional tolerance of noise. The first order FPM reconstruction algorithm, which was much faster than the second order algorithm, performed worse than the other two in both cases. The second order algorithm is more robust than the first order alternating projection method.

Figure 25:
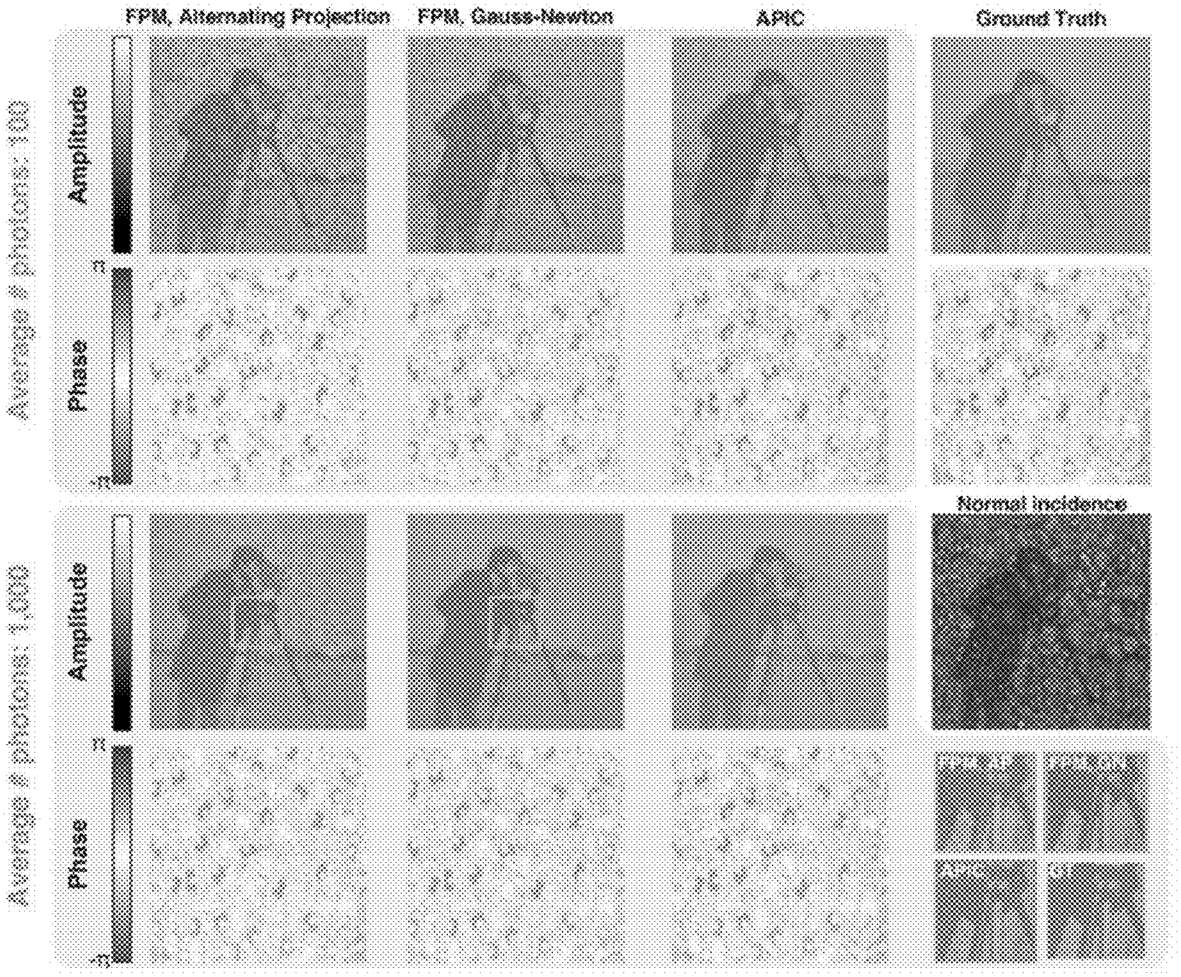
FIG. 25 depicts images of a weak absorption target reconstructed under different noise levels using APIC imaging method according to embodiments and FPM imaging method for comparison.

FIG. 25 includes images of a weak absorption target reconstructed under different noise levels using APIC imaging method according to embodiments and FPM imaging method for comparison. The numbers shown on the left are the average number of photons under the matching angle. The zoomed version of images inside the highlighted boxes, along with the zoomed ground truth, are shown on the lower right of this figure. The image under normal incidence was simulated with a noise-free imaging system. For a complex sample whose amplitude and phase are different in morphology, cross-talk between the two appears in FPM's reconstruction. APIC does not appear to suffer from such severe cross-talk.

In our second simulation, two different patterns for the amplitude and phase of the complex object were selected. This complex object was designed to have a weak amplitude variation while preserving a relatively strong phase variation based on the common property for unstained biological samples. There was cross-talks between phase and amplitude in both FPM algorithms using low SNR measurements.

When SNR increased, such cross-talk was less prominent in FPM. APIC did not suffer from such cross-talk. Although the reconstruction of APIC with low SNR was noisy, it maintained the features of the ground truth amplitude and phase and showed almost no cross-talk between the two. Also, the reconstructed phase of APIC was closer to the ground truth. For the low SNR dataset, the range of the reconstructed phase of FPM appeared to be compressed.

G. Number of NA-Matching Measurements

Simulations of different numbers of NA-matching measurements were run to determine an example of a minimum number of measurements needed for an APIC imaging method, according to certain implementation, that accurately reconstructs the imaging system's aberration. In the simulation, only aberration was introduced to the imaging system and all other parameters were assumed to be ideal. Illumination angles were assumed to be azimuthally uniformly distributed, which means their corresponding LEDs were uniformly distributed along the ring (e.g., ring 116*a* in FIGS. 1A and 1B).

Figure 26:
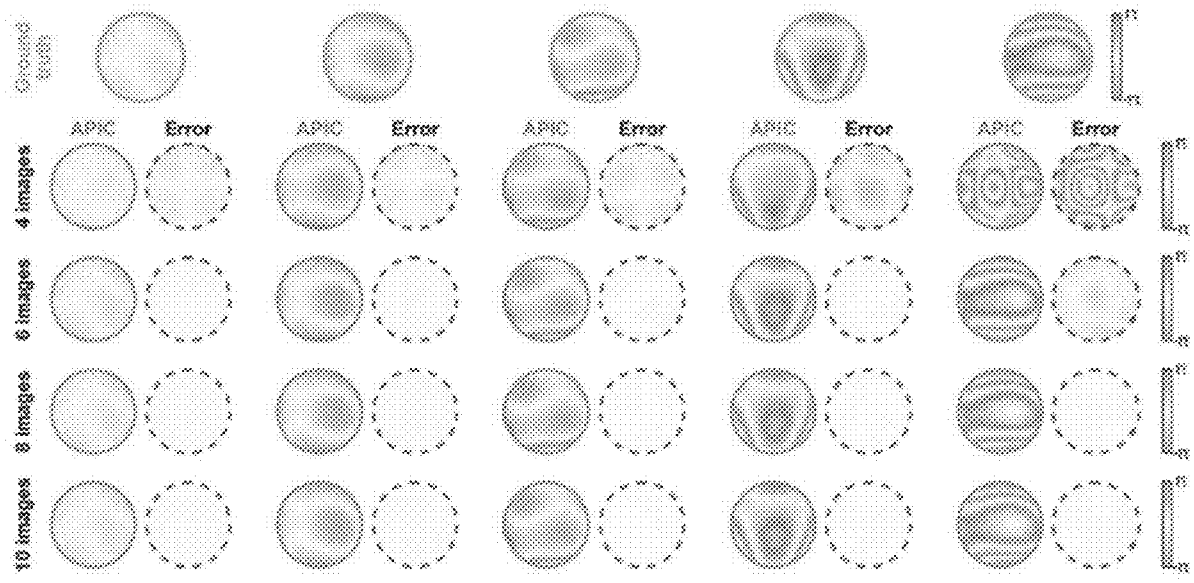
FIG. 26 depicts images of aberrations reconstructed using an APIC imaging method using different numbers of NA-matching measurements, according to embodiments.

FIG. 26 includes images of aberrations reconstructed using an APIC imaging method using different numbers of NA-matching measurements, according to embodiments. The ground truths in the simulation are shown on top of each group. The number of NA-matching measurements used in the simulation are shown on the far left side. In addition to the reconstructed aberration, an error map between the reconstructed aberration and the ground truth is shown. This error map is placed next to the APIC's reconstruction and is highlighted by a dashed circle.

When using 4 images, APIC did not obtain a good aberration estimate. However, when there were 6 NA-matching measurements, APIC successfully reconstructed mild to moderately high aberrations (their phase standard deviation is below $0.8\pi$). However, residual aberration exists in the reconstructed aberration under severe aberrations (phase standard deviation exceeds $1.5\pi$), as depicted in the corresponding error map in FIG. 26. When the number of NA-matching measurements increased to 8, there are no residual aberrations in APIC's reconstructions regardless of the severeness of the aberration. Generally speaking, 6 to 8 NA-matching measurements are sufficient for generating an accurate aberration estimation in most cases.

In some embodiments, an APIC imaging method uses at least 6 NA-matching measurements. In some embodiments, an APIC imaging method uses at least 8 NA-matching measurements. In some embodiments, an APIC imaging method uses between 6 NA-matching measurements and 8 NA-matching measurements. In some embodiments, an APIC imaging method uses at least 7 NA-matching measurements. In some embodiments, an APIC imaging method uses at least 9 NA-matching measurements. In some embodiments, an APIC imaging method uses more than 9 NA-matching measurements.

H. Illumination Angle Estimates

Simulations of errors in the angle calibration were run to see how an APIC imaging method of an embodiment performs under different levels of calibration error. Random uniformly distributed estimation error was introduced to the actual illumination angles. The simulation was based on a similar APIC system as APIC system 100 shown in FIGS. 1A and 1B but with a different number of LEDs. The maximal amount of error in our simulation was proportional to the maximal acceptance angle of the imaging system. As the illumination angle was converted to the spatial frequency vector in practice, this maximum error is denoted by the ratio of the error to the k-vector of the maximal acceptance angle. In the simulation, it was assumed that the estimate of the NA-matching angle was no larger than the acceptance angle of the imaging system.

Figure 27A:
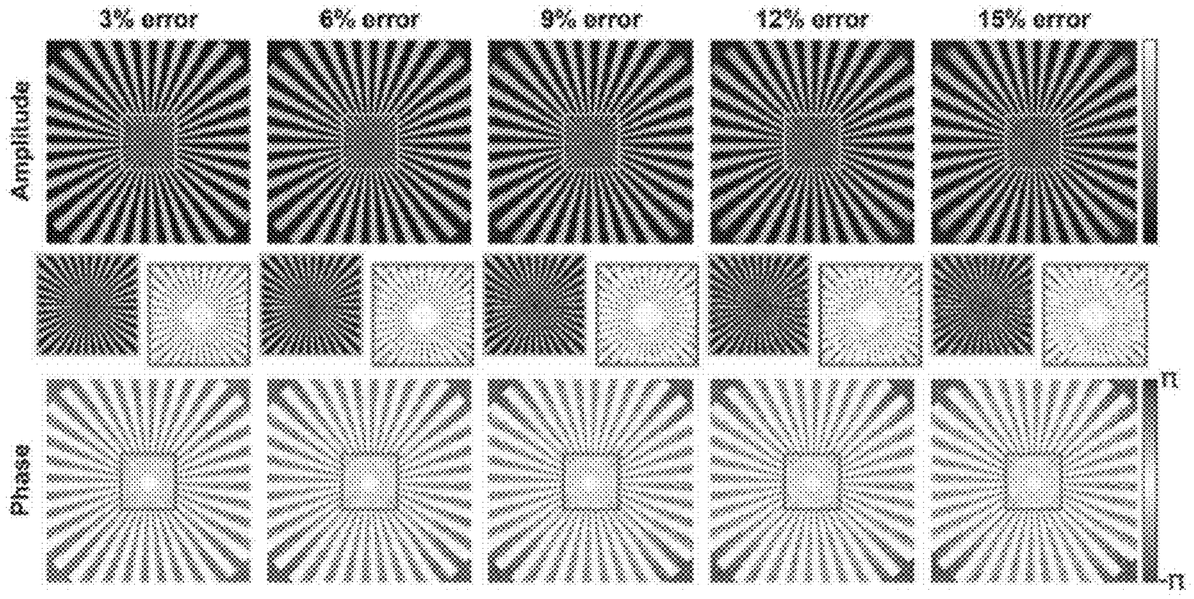
FIG. 27A includes images reconstructed using an APIC imaging method using different with different levels of illumination angle calibration error, according to embodiments.

FIG. 27A includes images reconstructed using an APIC imaging method using different with different levels of illumination angle calibration error, according to embodiments. In this simulation, randomly generated angle errors were added to the actual illumination angles and this inaccurate angle estimate was fed into the APIC imaging method when performing the reconstruction. The numbers on top of each group are the maximal possible error in the simulation. If the maximal possible error is denoted by $\gamma$, the simulated angle errors for both the horizontal and vertical direction were uniformly sampled in $[-\gamma, \gamma]$. For each NA-matching measurement, the corresponding angle estimate was forced to be smaller than the acceptance angle of the system by tuning the sign of this randomly generated error.

From the simulation results, APIC performance was well-maintained until the error reached 9%. Beyond that, the reconstructions showed obvious artifacts. This suggests that the alignment requirement of the proposed APIC imaging system (e.g., imaging system 100 in FIGS. 1A, 1B, and 3)

is fairly relaxed. In other words, APIC imaging is somewhat tolerant to LED position errors.

I. Kramers-Kronig Method and APIC

Using APIC system 100 shown in FIGS. 1A and 1B for data acquisition and a computing device (e.g., computing device 780 in FIG. 7 or computing device 1280 in FIG. 12) for executing instructions for performing operations of an APIC method of an embodiment, a complex field was reconstructed. A USAF target was used for simulation. It was assumed that the LED illumination angles were known and an aberration-free imaging system was used. Aberration was not considered in the reconstruction. For comparison, the spatial Kramers-Kronig method was also used to reconstruct a complex field. As the spatial Kramers-Kronig method cannot perform reconstruction with darkfield measurements, its resolution was limited. APIC advantageously employs complex field reconstruction using darkfield measurements.

Figure 27B:
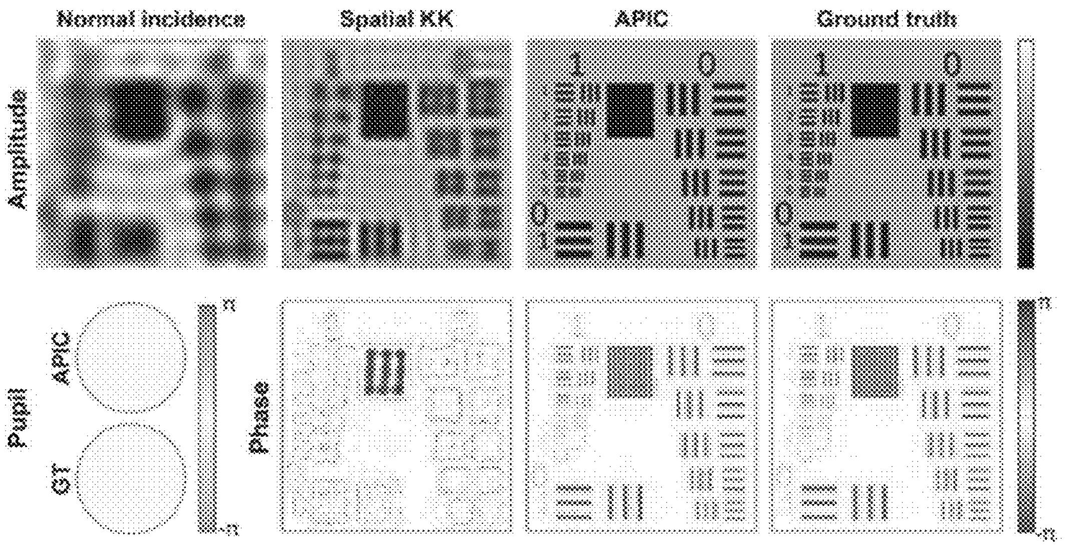
FIG. 27B depicts amplitude and phase images generated by a spatial Kramers-Kronig imaging method and amplitude and phase images generated an APIC imaging method of certain embodiments, according to embodiments.

FIG. 27B depicts (i) raw amplitude images of an USAF target under normal incidence, (ii) amplitude and phase images of an USAF target generated by a spatial Kramers-Kronig (spatial KK) imaging method, (iii) amplitude and phase images of an USAF target generated an APIC imaging method of certain embodiments, and (iv) ground truth amplitude and phase images of an USAF target. In this simulation, no aberration was introduced. By comparing the images from Kramers-Kronig method with the images from the APIC method, is seen that the resolution of the images generated by the APIC method is much enhanced as compared with the resolution of the images generated by the spatial Kramers-Kronig method.

Many types of computing devices having any of various computer architectures may be employed as the disclosed systems for implementing algorithms. For example, the computing devices may include software components executing on one or more general purpose processors or specially designed processors such as Application Specific Integrated Circuits (ASICs) or programmable logic devices (e.g., Field Programmable Gate Arrays (FPGAs)). Further, the systems may be implemented on a single device or distributed across multiple devices. The functions of the computational elements may be merged into one another or further split into multiple sub-modules.

At one level a software element is implemented as a set of commands prepared by the programmer/developer. However, the module software that can be executed by the computer hardware is executable code committed to memory using "machine codes" selected from the specific machine language instruction set, or "native instructions," designed into the hardware processor. The machine language instruction set, or native instruction set, is known to, and essentially built into, the hardware processor(s). This is the "language" by which the system and application software communicates with the hardware processors. Each native instruction is a discrete code that is recognized by the processing architecture and that can specify particular registers for arithmetic, addressing, or control functions; particular memory locations or offsets; and particular addressing modes used to interpret operands. More complex operations are built up by combining these simple native instructions, which are executed sequentially, or as otherwise directed by control flow instructions.

The inter-relationship between the executable software instructions and the hardware processor is structural. In other words, the instructions per se are a series of symbols or numeric values. They do not intrinsically convey any information. It is the processor, which by design was preconfigured to interpret the symbols/numeric values, which imparts meaning to the instructions.

The algorithms used herein may be configured to execute on a single machine at a single location, on multiple machines at a single location, or on multiple machines at multiple locations. When multiple machines are employed, the individual machines may be tailored for their particular tasks. For example, operations requiring large blocks of code and/or significant processing capacity may be implemented on large and/or stationary machines.

In addition, certain embodiments relate to tangible and/or non-transitory computer readable media or computer program products that include program instructions and/or data (including data structures) for performing various computer-implemented operations. Examples of computer-readable media include, but are not limited to, memory devices, phase-change devices, magnetic media such as disk drives, magnetic tape, optical media such as CDs, magneto-optical media, and hardware devices that are specially configured to store and perform program instructions, such as read-only memory devices (ROM) and random access memory (RAM). The computer readable media may be directly controlled by an end user or the media may be indirectly controlled by the end user. Examples of directly controlled media include the media located at a user facility and/or media that are not shared with other entities. Examples of indirectly controlled media include media that is indirectly accessible to the user via an external network and/or via a service providing shared resources such as the "cloud." Examples of program instructions include both machine code, such as produced by a compiler, and files containing higher level code that may be executed by the computer using an interpreter.

In some embodiments, code executed during generation or execution of various models on an appropriately programmed system can be embodied in the form of software elements which can be stored in a nonvolatile storage medium (such as optical disk, flash storage device, mobile hard disk, etc.), including a number of instructions for making a computing device (such as personal computers, servers, network equipment, etc.).

In various embodiments, the data or information employed in the disclosed methods and apparatus is provided in an electronic format. Such data or information may include design layouts, fixed parameter values, floated parameter values, feature profiles, metrology results, and the like. As used herein, data or other information provided in electronic format is available for storage on a machine and transmission between machines. Conventionally, data in electronic format is provided digitally and may be stored as bits and/or bytes in various data structures, lists, databases, etc. The data may be embodied electronically, optically, etc.

Modifications, additions, or omissions may be made to any of the above-described embodiments without departing from the scope of the disclosure. Any of the embodiments described above may include more, fewer, or other features without departing from the scope of the disclosure. Additionally, the steps of described features may be performed in any suitable order without departing from the scope of the disclosure. Also, one or more features from any embodiment may be combined with one or more features of any other embodiment without departing from the scope of the disclosure. The components of any embodiment may be integrated or separated according to particular needs without departing from the scope of the disclosure.

It should be understood that certain aspects described above can be implemented in the form of logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code using any suitable computer language and/or computational software such as, for example, Java, C, C #, C++ or Python, LabVIEW, Mathematica, or other suitable language/computational software, including low level code, including code written for field programmable gate arrays, for example in VHDL. The code may include software libraries for functions like data acquisition and control, motion control, image acquisition and display, etc. Some or all of the code may also run on a personal computer, single board computer, embedded controller, microcontroller, digital signal processor, field programmable gate array and/or any combination thereof or any similar computation device and/or logic device(s). The software code may be stored as a series of instructions, or commands on a CRM such as a random access memory (RAM), a read only memory (ROM), a magnetic media such as a hard-drive or a floppy disk, or an optical media such as a CD-ROM, or solid stage storage such as a solid state hard drive or removable flash memory device or any suitable storage device. Any such CRM may reside on or within a single computational apparatus, and may be present on or within different computational apparatuses within a system or network. Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

What is claimed is:

1. An imaging method comprising:

(a) reconstructing a plurality of complex field spectrums from a respective plurality of NA-matching intensity measurements;

(b) combining the complex field spectrums to determine a reconstructed sample spectrum; and (c) using a plurality of darkfield intensity measurements to extend the reconstructed sample spectrum to obtain an image with higher resolution than the NA-matching intensity measurements.

2. The method of claim 1, wherein:

the NA-matching measurements are acquired for incident illumination angles equal, or nearly equal, to a maximum acceptance angle of collection optics of an imaging system configured to acquire the NA-matching intensity measurements and the darkfield intensity measurements; and the darkfield intensity measurements are acquired for incident illumination angles greater than the maximum acceptance angle of the collection optics of the imaging system.

3. The method of claim 1, further comprising:

(i) extracting a system aberration from the plurality of complex field spectrums; and (ii) removing the system aberration from each of the complex field spectrums prior to (b).

4. The method of claim 3, wherein (i) comprises:

determining a phase difference in each overlapping portion of the complex field spectrums; and determining the system aberration from the phase differences.

5. The method of claim 4, further comprising applying a weighting factor to one or more frequencies of each of the complex field spectrums.

6. The method of claim 1, wherein (c) comprises, for each darkfield measurement, calculate an auto-correlation part of the reconstructed sample spectrum;

subtract the auto-correlation part from a spectrum of the darkfield measurement;

extract a non-overlapping portion of a first cross-correlation part, wherein the non-overlapping portion does not overlap with the auto-correlation part or with a second cross correlation part;

construct a correlation operator from the non-overlapping portion;

apply the correlation operator to the spectrum of the darkfield measurement to determine an unknown part; and fill in the reconstructed sample spectrum with the unknown part.

7. A computer program product, comprising a non-transitory computer readable medium having computer-executable instructions for performing:

(a) reconstructing a plurality of complex field spectrums from a respective plurality of NA-matching intensity measurements;

(b) combining the complex field spectrums to determine a reconstructed sample spectrum; and (c) using a plurality of darkfield intensity measurements to extend the reconstructed sample spectrum to obtain an image with higher resolution than the NA-matching intensity measurements.

8. The computer program product of claim 7, wherein:

the NA-matching measurements are acquired for incident illumination angles equal, or nearly equal, to a maximum acceptance angle of collection optics of an imaging system configured to acquire the NA-matching intensity measurements and the darkfield intensity measurements; and the darkfield intensity measurements are acquired for incident illumination angles greater than the maximum acceptance angle of the collection optics of the imaging system.

9. The computer program product of claim 7, further comprising additional computer-executable instructions for:

(i) extracting a system aberration from the plurality of complex field spectrums; and (ii) removing the system aberration from each of the complex field spectrums prior to (b).

10. The computer program product of claim 9, wherein (i) comprises:

determining a phase difference in each overlapping portion of the complex field spectrums; and determining the system aberration from the phase differences.

11. The computer program product of claim 10, further comprising additional computer-executable instructions for applying a weighting factor to one or more frequencies of each of the complex field spectrums.

12. The computer program product of claim 7, wherein (c) comprises, for each darkfield measurement, calculate an auto-correlation part of the reconstructed sample spectrum;

subtract the auto-correlation part from a spectrum of the darkfield measurement;

extract a non-overlapping portion of a first cross-correlation part, wherein the non-overlapping portion does not overlap with the auto-correlation part or with a second cross correlation part;

construct a correlation operator from the non-overlapping portion;

apply the correlation operator to the spectrum of the darkfield measurement to determine an unknown part; and fill in the reconstructed sample spectrum with the unknown part.

13. An imaging system, comprising:

an optical system having collection optics;

an illumination device configured to provide illumination at a plurality of NA-matching illumination angles at a first sequence of image acquisition times and provide illumination at a plurality of darkfield illumination angles at a second sequence of image acquisition times;

at least one radiation detector configured to receive light from the optical system and acquire a plurality of NA-matching intensity measurements and a plurality of darkfield intensity measurements; and a computing device configured to:

(a) reconstruct a plurality of complex field spectrums from the plurality of NA-matching intensity measurements;

(b) combine the complex field spectrums to determine a reconstructed sample spectrum; and (c) use the plurality of darkfield intensity measurements to extend the reconstructed sample spectrum to obtain an image with higher resolution than the NA-matching intensity measurements.

14. The imaging system of claim 13, wherein:

the NA-matching illumination angles are equal, or nearly equal, to a maximum acceptance angle of the collection optics; and the darkfield illumination angles are greater than the maximum acceptance angle of the collection optics of the imaging system.

15. The imaging system of claim 13, further comprising a galvo motor configured to direct a laser beam from one or more lasers to each of a plurality of mirrors to reflect the laser beam to the plurality of NA-matching illumination angles and the plurality of darkfield illumination angles.

16. The imaging system of claim 13, wherein:

the illumination device includes a single illumination source; and the at least one radiation detector comprises a plurality of cameras, each camera having a different detection plane.

17. The imaging system of claim 13, wherein the computing device is further configured to:

(i) extract a system aberration from the plurality of complex field spectrums; and (ii) remove the system aberration from each of the complex field spectrums prior to (b).

* * * * *